US009788488B2

(12) United States Patent
Bertino

(10) Patent No.: US 9,788,488 B2
(45) Date of Patent: Oct. 17, 2017

(54) HARVESTER AND PROCESSOR FOR PEANUTS

(71) Applicant: Indústrias Reunidas Colombo Ltda., Pindorama (BR)

(72) Inventor: Luiz Henrique Bertino, Pindorama (BR)

(73) Assignee: INDÚSTRIAS REUNIDAS COLOMBO LTDA., Pindorama (BR)

( * ) Notice: Subject to any disclaimer, the term of this patent is extended or adjusted under 35 U.S.C. 154(b) by 2 days.

(21) Appl. No.: 15/085,482

(22) Filed: Mar. 30, 2016

(65) Prior Publication Data

US 2016/0316626 A1   Nov. 3, 2016

(30) Foreign Application Priority Data

Mar. 30, 2015 (BR) ...................... 10 2015 007088 8

(51) Int. Cl.
*A01D 29/00* (2006.01)
*A01D 51/00* (2006.01)
(Continued)

(52) U.S. Cl.
CPC ........... *A01D 51/002* (2013.01); *A01D 29/00* (2013.01); *A01F 7/06* (2013.01); *A01F 12/184* (2013.01)

(58) Field of Classification Search
CPC ........ A01D 29/00; A01D 51/00; A01D 51/02; A01D 45/22; A01F 11/00; A01F 7/06; A01F 12/184; A23N 12/005
(Continued)

(56) References Cited

U.S. PATENT DOCUMENTS 2,507,635 A   5/1950 James
2,999,547 A   9/1961 Long
(Continued)

FOREIGN PATENT DOCUMENTS

BR   8305764   5/1985
BR   8704119   2/1989
(Continued)

*Primary Examiner* — Robert Pezzuto
(74) *Attorney, Agent, or Firm* — B. Aaron Schulman, Esq.; Stites & Harbison, PLLC

(57) ABSTRACT

A harvester and processor for peanuts that comprises a drag type machine to be towed and actuated by a conventional tractor, which has various double assemblies to harvest lined up peanuts and process them through various steps of cleaning, up to the separation of the cleaned grains that are stored in an embedded tipper bucket, and to perform all this, the machine contains a chassis (1), that on its bottom side is supported by wheels (3), while on its top side is integrated with a plate body (4) forming a mono block structure for the assembling of all the embedded assemblies, starting with the frontal hitch pole (5) integrated with the transmission assembly (6) which is responsible for the actuation of various parts of the machine, specially two harvesting conveyor belts (8), anti-jamming receptive boxes (9), threshing cylinders (10), and in these cylinders starts the cleaning process together with the vibrating sieves (11) and the ventilation assembly (12), being that the cleaned fruits are delivered to a receptive chute (13), where they are collected by a bucket elevator (14) and dropped inside of a tipper bucket (15).

24 Claims, 64 Drawing Sheets

(51) Int. Cl.
*A01F 7/06* (2006.01)
*A01F 12/18* (2006.01)

(58) Field of Classification Search
USPC ......... 56/14.6, 13.5, 130, 16.6, 364; 171/26,
171/27, 101, 171; 460/16, 126–129, 141,
460/142, 145
See application file for complete search history.

(56) References Cited

U.S. PATENT DOCUMENTS

| | | | |
|---|---|---|---|
| 3,241,619 A | 3/1966 | Morrow | |
| 3,260,314 A | 7/1966 | Edwards | |
| 3,381,455 A | 5/1968 | Mitchell | |
| 3,565,178 A | 2/1971 | Whitfield | |
| 3,613,797 A | 10/1971 | Whitfield et al. | |
| 3,726,345 A * | 4/1973 | Harrell | A01D 29/00 171/101 |
| 3,734,194 A | 5/1973 | Whitfield | |
| 4,136,507 A * | 1/1979 | Hobbs | A01D 29/00 460/128 |
| 4,184,314 A | 1/1980 | Hobbs | |
| 4,227,538 A * | 10/1980 | Long | A01D 29/00 171/119 |
| 4,230,188 A | 10/1980 | Paulk | |
| 4,232,744 A | 11/1980 | Thompson | |
| 4,257,486 A | 3/1981 | Hobbs | |
| 4,607,703 A | 8/1986 | Wang | |
| 5,138,826 A * | 8/1992 | Hobbs | A01F 11/00 460/126 |
| 5,468,187 A * | 11/1995 | Edwards, Jr. | A23N 12/005 171/DIG. 1 |
| 5,980,382 A * | 11/1999 | Brantley | A01F 11/00 171/26 |

FOREIGN PATENT DOCUMENTS

| | | |
|---|---|---|
| BR | 9102501 | 1/1993 |
| BR | PI0901370 | 1/2011 |
| CN | 201004807 | 1/2008 |
| CN | 203206730 | 9/2013 |
| CN | 103355051 | 10/2013 |
| CN | 103371017 | 10/2013 |
| CN | 103371018 | 10/2013 |
| CN | 203226028 | 10/2013 |
| CN | 203261721 | 11/2013 |
| CN | 103430683 | 12/2013 |
| CN | 103430684 | 12/2013 |
| CN | 103444347 | 12/2013 |
| CN | 103460884 | 12/2013 |
| CN | 103460885 | 12/2013 |
| CN | 103460886 | 12/2013 |
| CN | 103460887 | 12/2013 |
| CN | 203313669 | 12/2013 |
| CN | 203353141 | 12/2013 |
| CN | 203353142 | 12/2013 |
| CN | 203353143 | 12/2013 |
| CN | 203353202 | 12/2013 |
| MU | 6600133 | 6/1986 |
| MU | 8400507 | 10/2005 |
| MU | 8403436 | 8/2006 |
| MU | 8502220 | 1/2007 |
| MU | 8502092 | 5/2007 |
| MU | 8701571 | 5/2007 |

* cited by examiner

B-B

C-C

E-E

F-F

G-G

H-H

I-I

J-J

K-K

HARVESTER AND PROCESSOR FOR PEANUTS

FIELD OF THE INVENTION

The present invention specifically refers to an agricultural machine that works coupled to a conventional tractor, and therefore, is to be towed and powered by the electrical outlet of said tractor. This type of equipment is used for harvesting peanuts that have been previously lined up in rows, and then, it process the fruits separating them of the other disposable parts of the plants, as the fruits are also cleaned and stored in a tipper bucket set up on top of the machine.

ESTATE OF THE ART

As it is known, there exist today a great number of equipment and machines to reap, line up, harvest and clean peanuts, as for example, the ones taught by the following documents: BR6600133, BR8305764, BR8704119, BR9102501, BRMU8400507, BRMU8403436, BRMU8502220, BRMU8701571, BRPI0901370, CN103355051, CN103371017, CN103371018, CN103430683, CN103430684, CN103444347, CN103460884, CN103460885, CN103460886, CN103460887, CN201004807, CN203206730, CN203226028, CN203261721, CN203313669, CN203353141, CN203353142, CN203353143, CN203353202, BRMU8502092, U.S. Pat. No. 2,999,547, U.S. Pat. No. 3,260,314, U.S. Pat. No. 3,565,178, U.S. Pat. No. 3,613,797, U.S. Pat. No. 3,734,194, U.S. Pat. No. 4,184,314, U.S. Pat. No. 4,230,188, U.S. Pat. No. 2,507,635, U.S. Pat. No. 3,241,619, U.S. Pat. No. 3,381,455, U.S. Pat. No. 4,230,188, U.S. Pat. No. 4,232,744 e U.S. Pat. No. 4,257,486, U.S. Pat. No. 4,607,703.

There is no doubt that the equipment known present the means necessary for the processing of peanuts, however, it was noted that these could receive slight alterations to improve certain functional aspects, because, in the majority of cases, aside from being oversized equipment, the productivity is limited on account of the mechanical arrangements not being built with specific details to increase processing productivity.

SUMMARY OF THE INVENTION

The first objective of the invention is to plan a machine that accommodates a double system of harvesting and processing, that is, has a double work front, having two harvesting conveyor belts, both of the type with belts and claws, one for each row of peanut. Both conveyor belts are equally inclined, in a way that its front extremities, along with a set of wheels, may slide over the ground, and that way, the peanut is collected and transferred to the inside of the machine. The upper extremities of both conveyor belts end in two box shaped mouths, where can be found the extremities of two threshing cylinders, both longitudinal, each set up in a true plate tunnel, that in turn, is a first sieve, being under this assembly another pair of vibrating sieves in the form of trays, one for each cylinder. At the end of the threshing cylinders there are exits for the disposable material, while the sorted fruits are trimmed at the vibrating sieves and continue to the rear part of the machine, where there is a forced ventilation assembly that creates a continuous air flow that passes through the final region of said vibrating sieves, which enables a final cleaning for light particles, then, inversed threads set up transversally collect the fruits placing them in the rear center of the machine where they are collected by a bucket elevator and taken to a bulk carrying tipper bucket for posterior processing.

In different strategic points, the machine includes anti-jamming means to prevent the accumulation or tangling of materials in the different parts of processing. The first anti-jam assembly is planned between the end of the harvesting conveyor belts and the beginning of the threshing rolls, allowing a uniform transition of the material from the harvesting phase to the entrance of the first cleaning phase. Another anti-jam assembly is planned at the end of the vibrating sieves, logically to have the same advantageous effect of uniform flow for all the material during the processing phase.

Therefore, it can be seen that the machine in question was designed to characterize a compact processing system, advantageously defined by the double details of harvesting and cleaning, which reduce greatly the dimensions of the machine and, at the same time, makes it a versatile machine with high performance, appropriate for small, medium and large producers, not only for its excellent cost and benefit, but also because it adds agility to corrective and preventive repairs, and also for movement in the field.

DETAILED DESCRIPTION OF THE INVENTION

Figure 1:
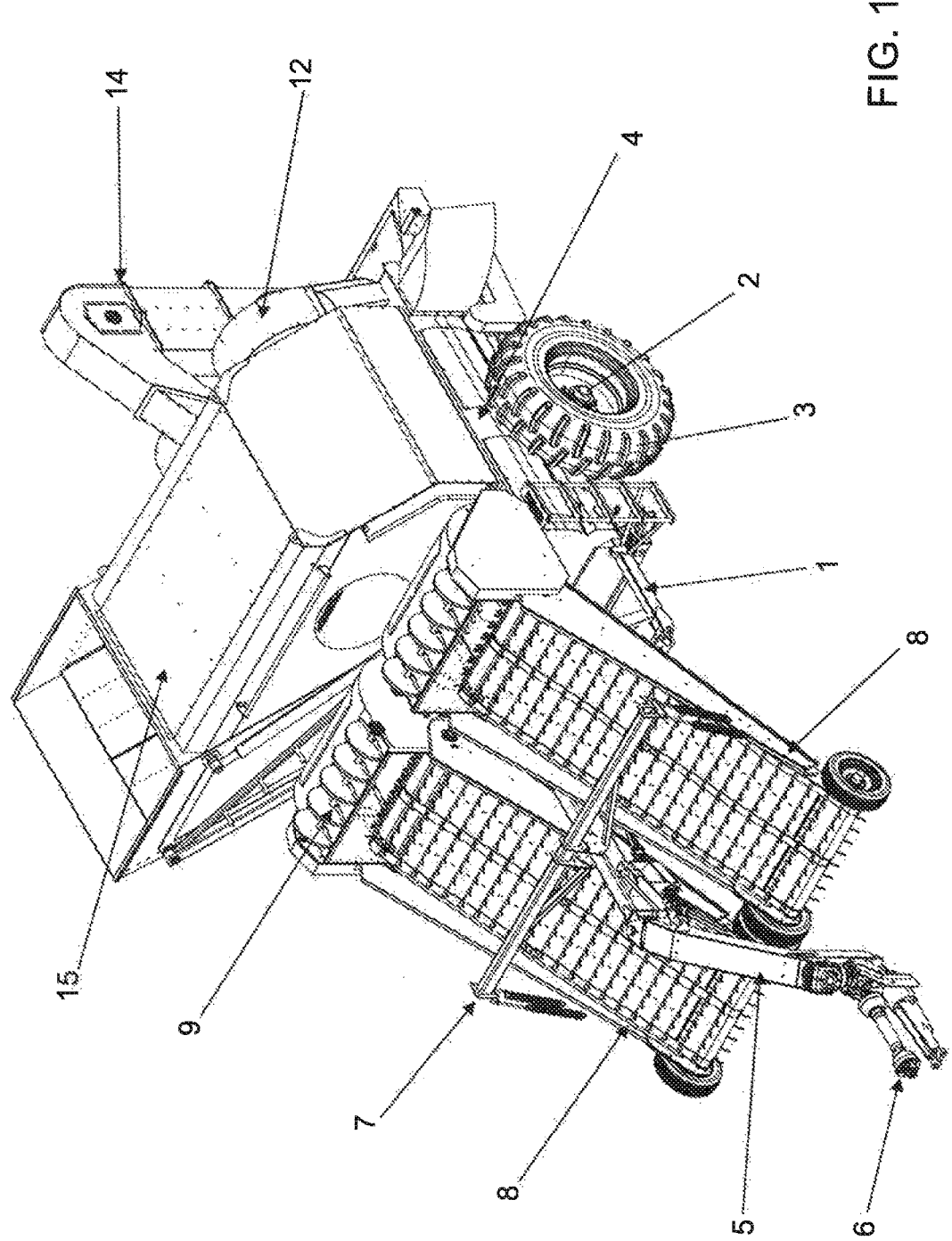
FIG. 1 represents a high frontal angled perspective from the left, showing outer details of the machine.
Figure 2:
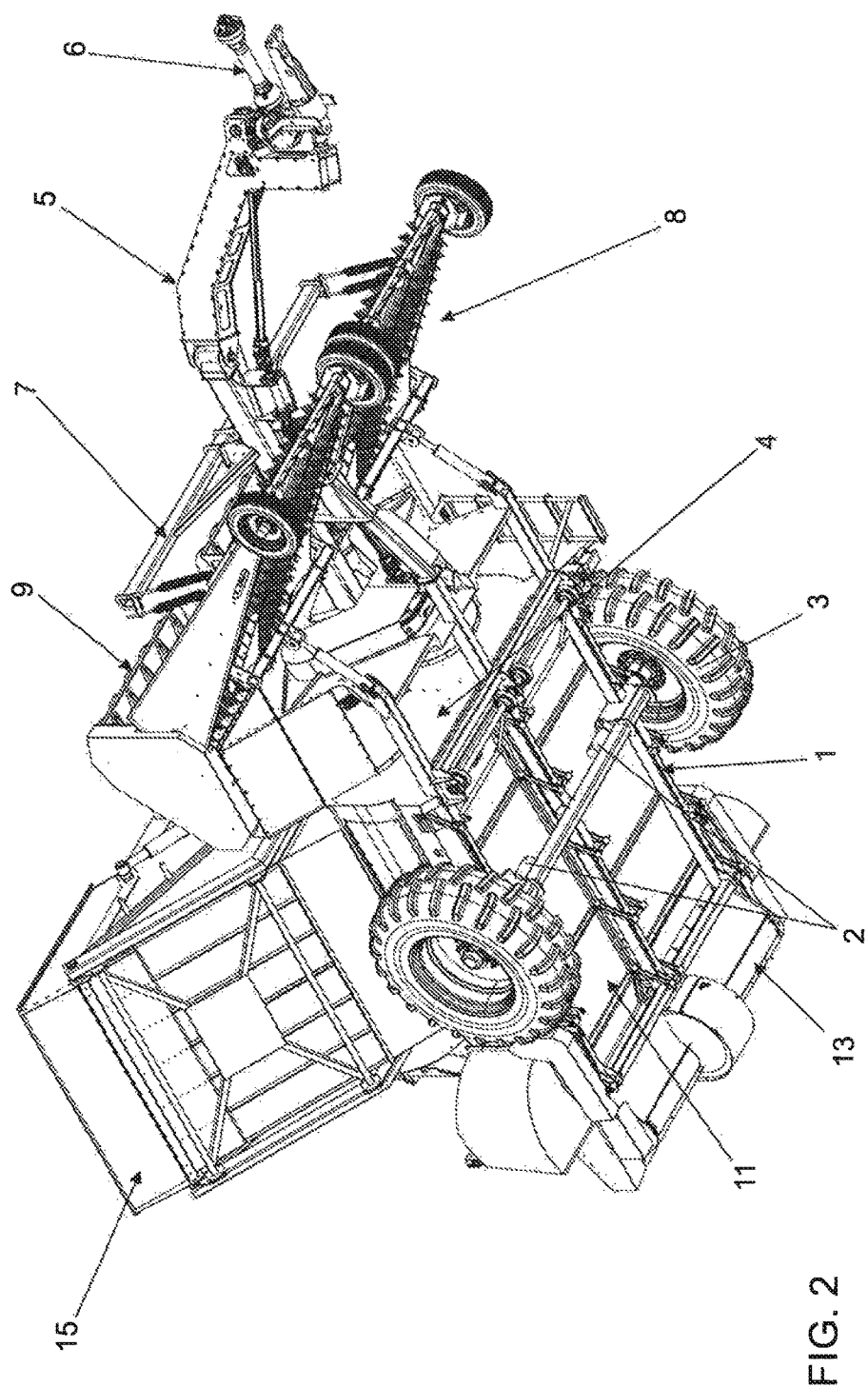
FIG. 2 shows another view in perspective, however, a lower front view from the right, showing other outer details of the machine.
Figure 3:
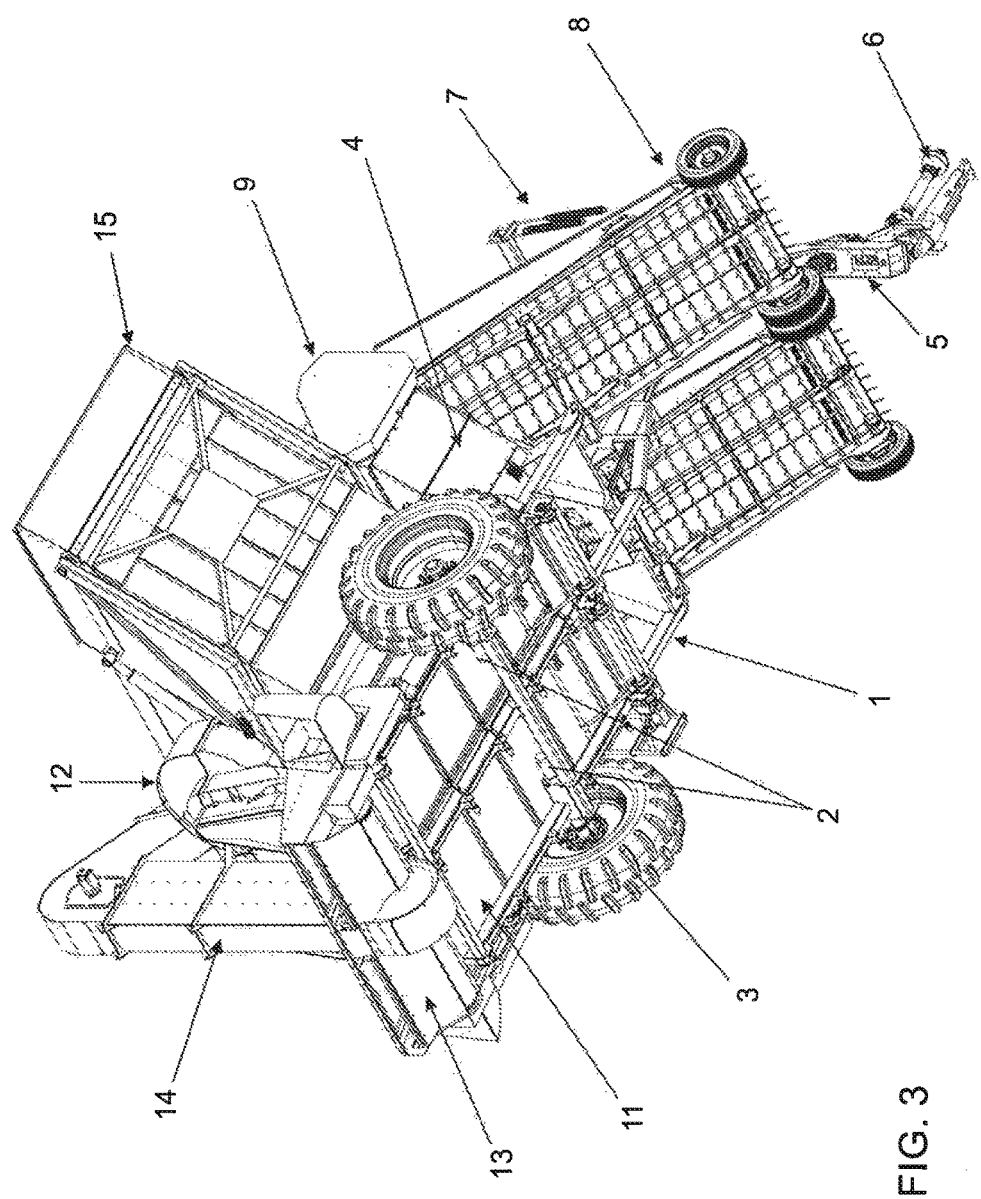
FIG. 3 illustrates another view in perspective, however, in a lower rear angle from the right showing other outer details of the machine.
Figure 4:
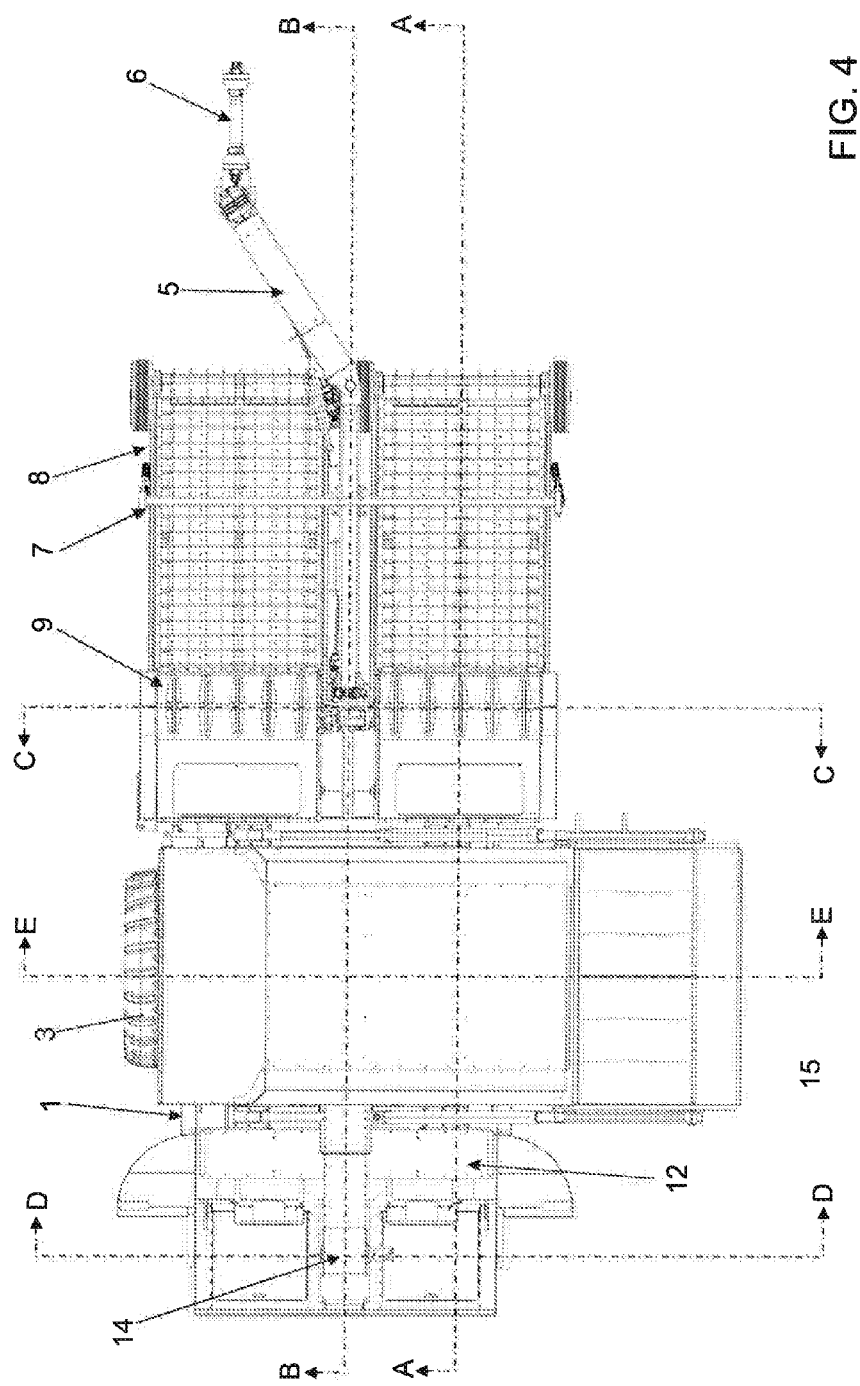
FIG. 4 is a map view showing the top of the machine and indicating the cuts A-A, B-B, C-C, D-D e E-E.

Chassis (1) that, on its bottom side, is supported on semi-axles (2) and respective wheels (3), while on its top side, it receives a complement in the form of a structured plate body (4) that composes, along with the chassis (1), a mono block support for the assembling and sustention of all the embedded assemblies;

Angular hitch pole (5), prolonged longitudinally forward, having its rear end fixed in the front of the chassis (1) and of the mono block body (4), as also this assembly contains a transmission (6), is a way that said hitch pole may be coupled to a conventional tractor and its power outlet may be connected to the transmission system (6) responsible for the actuation of some of the assemblies that compose the machine in question;

on the first rear segment of the articulated hitch pole (5) is set up a transversal support in the form of a beam (7);

In each side of the referred articulated hitch pole (5) is assembled an inclined harvesting conveyor belt (8) that are interconnected through its upper side by a spring to the support beam (7), as also the front extremities of the two conveyor belts are guided to slide flush with the ground and capture the lined up plants and move them up and backwards to the inside of the machine;

two entrance mouths in the forms of anti-jam receptive boxes for the material to be processed that comes from the harvesting conveyor belts (8) both set up equally over the front extremity of the mono block plate body (4), where said boxes (9) receive articulately the higher rear extremities of the two harvesting conveyor belts (8), one beside the other;

Two sets of threshing cylinders (10), longitudinal, set up inside of the mono block body (4), that compose two sorting and cleaning tunnels for the collected plants from each of the conveyor belts (8) and, for such, the front extremities of the threshing cylinders (10) are positioned equally over each receptive anti-jam box (9), where the material collected is transferred to the beginning of the threshing cylinders (10), through these cylinders is executed a first step of cleaning and sorting of the peanut fruits and of the disposable parts of the plant;

a double set of vibrating sieves (11) that compose a receiving platform and second cleaning phase for the fruits (pods) of the peanuts and smaller disposable parts of the plants that come from both the threshing cylinders (10);

a double assembly of ventilation (12), vertical, is assembled in the rear part of the mono block body (4), assembly in whose bottom parts end both the set of cylinders (10) and the vibrating sieves (11), and in this point where they all meet, is formed a ventilation chamber with an ascending air flow that passes through the processed fruits and is the third and last phase of cleaning that removes the smaller and lighter disposable parts of the plant;

a collecting chute (13) for clean grains assembled transversally in the rear part of the chassis (1) that makes up a double transversal transporter for clean grains; in this transporter end equally both vibrating sieves (11), each occupying equally each half of the transporter, halves that move the clean fruit in a converging manner to the central part of the chute (13);

a vertical bucket transporter (14) assembled vertically in the rear part of the chassis (1), where said vertical bucket transporter (14) has its bottom extremity positioned on the interior median, or convergence point of the chute (13), where it forms a point of accumulation of clean grains to be transported;

a tipper bucket (15) assembled on the mono block body (4), as also in its upper part is positioned the upper extremity of the exit of said vertical bucket transporter (14), in a way that the clean grains may be stored in said tipper bucket (15), tipping is in the transversal orientation, that facilitates its unloading in the desired moment.

Figure 10:
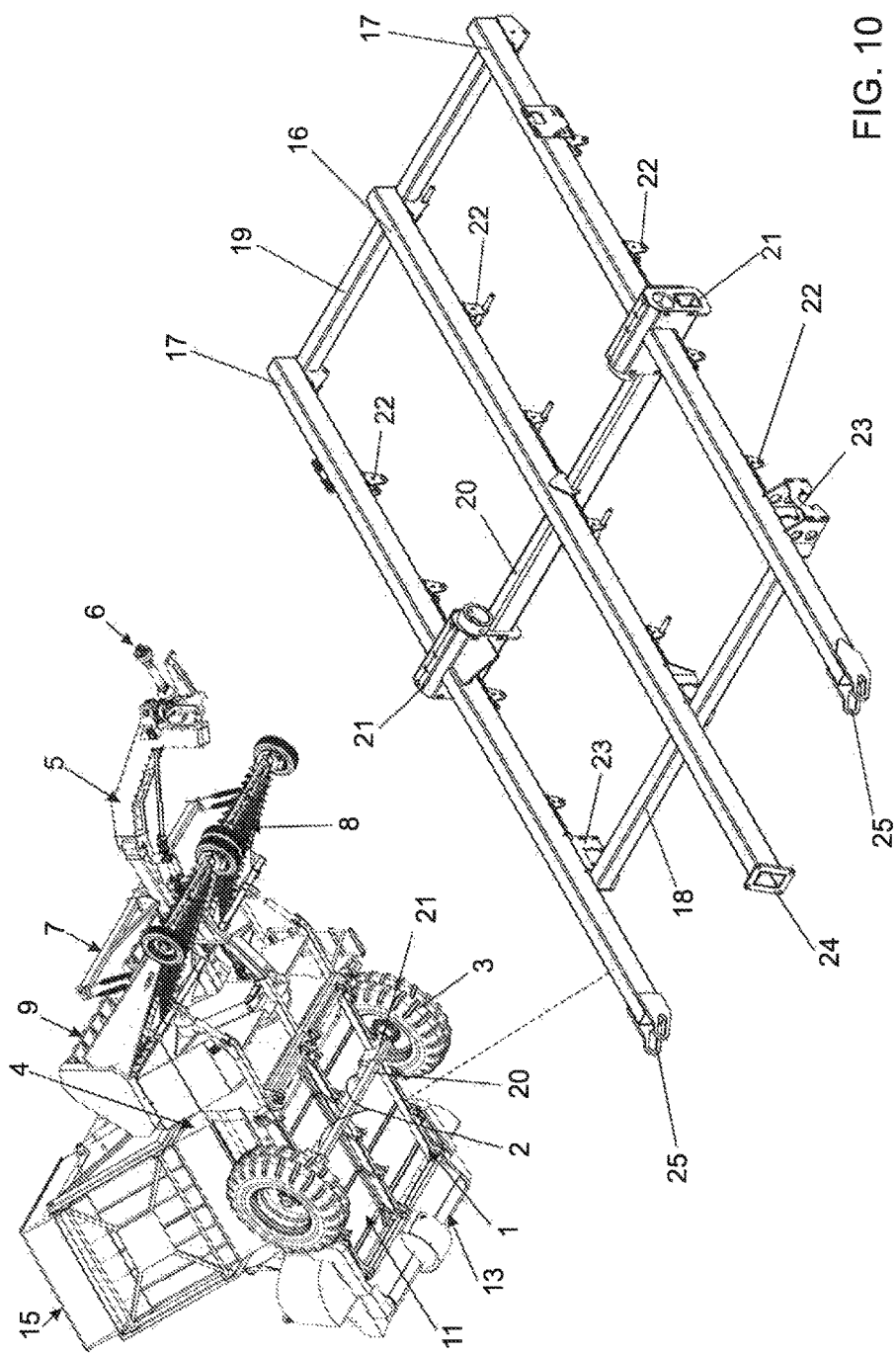
FIG. 10 are two perspectives showing in details of the machine's chassis.
Figure 11:
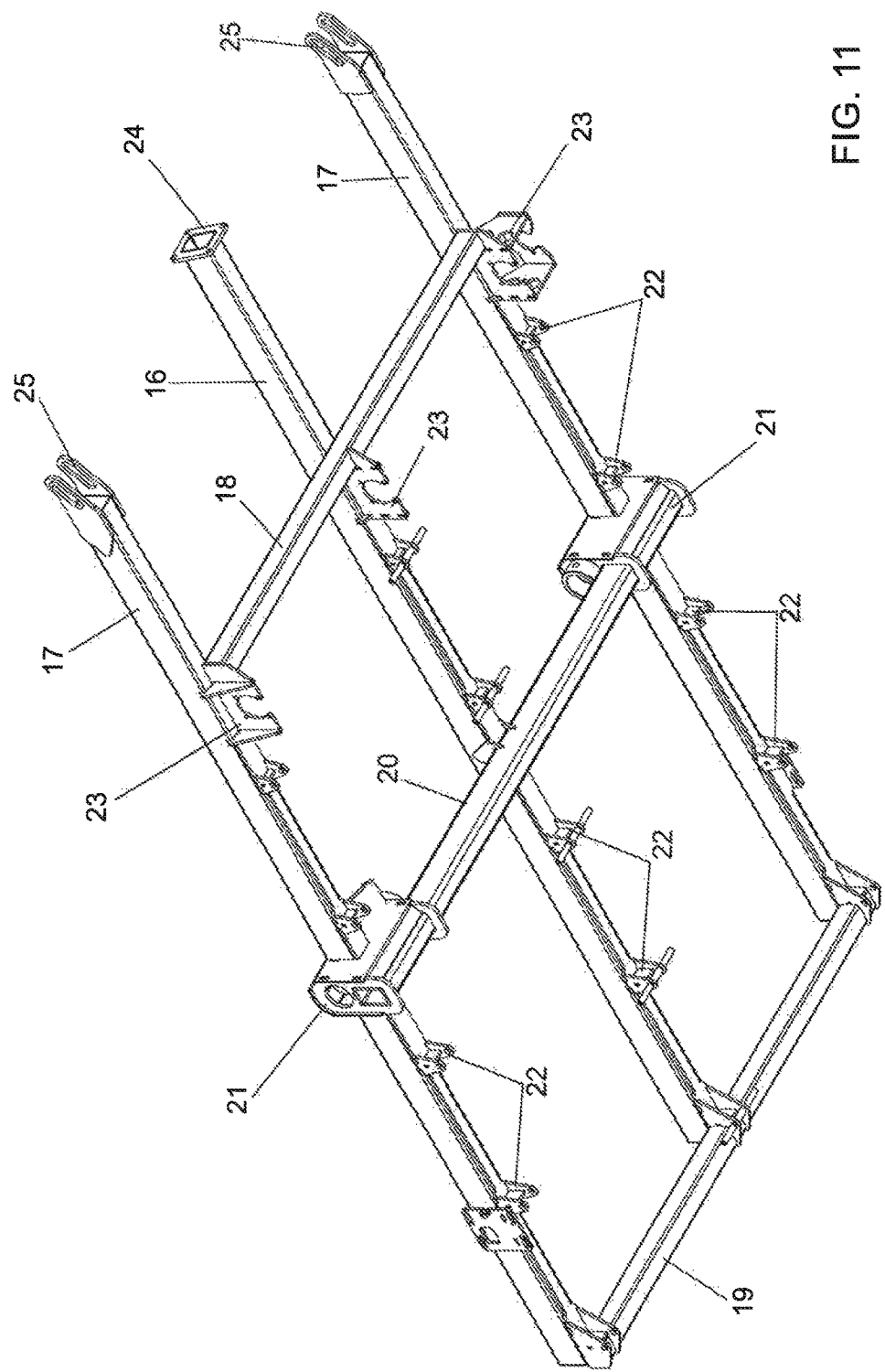
FIG. 11 illustrates a lower angle perspective showing other details of the machine's chassis.

The chassis (1), illustrates in details in FIGS. 10 and 11, comprises three longitudinal long plate pieces, one middle (16) and two side ones (17), all interconnected by crossbars, a frontal one (18), a rear one (19) and a middle one (20); this last one has bearings in both its ends, that serve as supports for the semi axles (2) of the wheels (3), as also the longitudinal long plate pieces have in their bottom side, a distribution of various inverted "U" shaped bearings (22) and frontal bearings (23), all of them serve as support for the corresponding parts of the double set of vibrating sieves (11) and, also, the frontal extremity of the middle long plate piece (16) has a coupling terminal (24) for the angular hitch pole (5), while the rear terminals of the side long plate pieces (17) have fork shaped terminals (25) for articulated coupling and that serve as support for the corresponding parts of the inclined harvesting conveyor belts (8).

Figure 12:
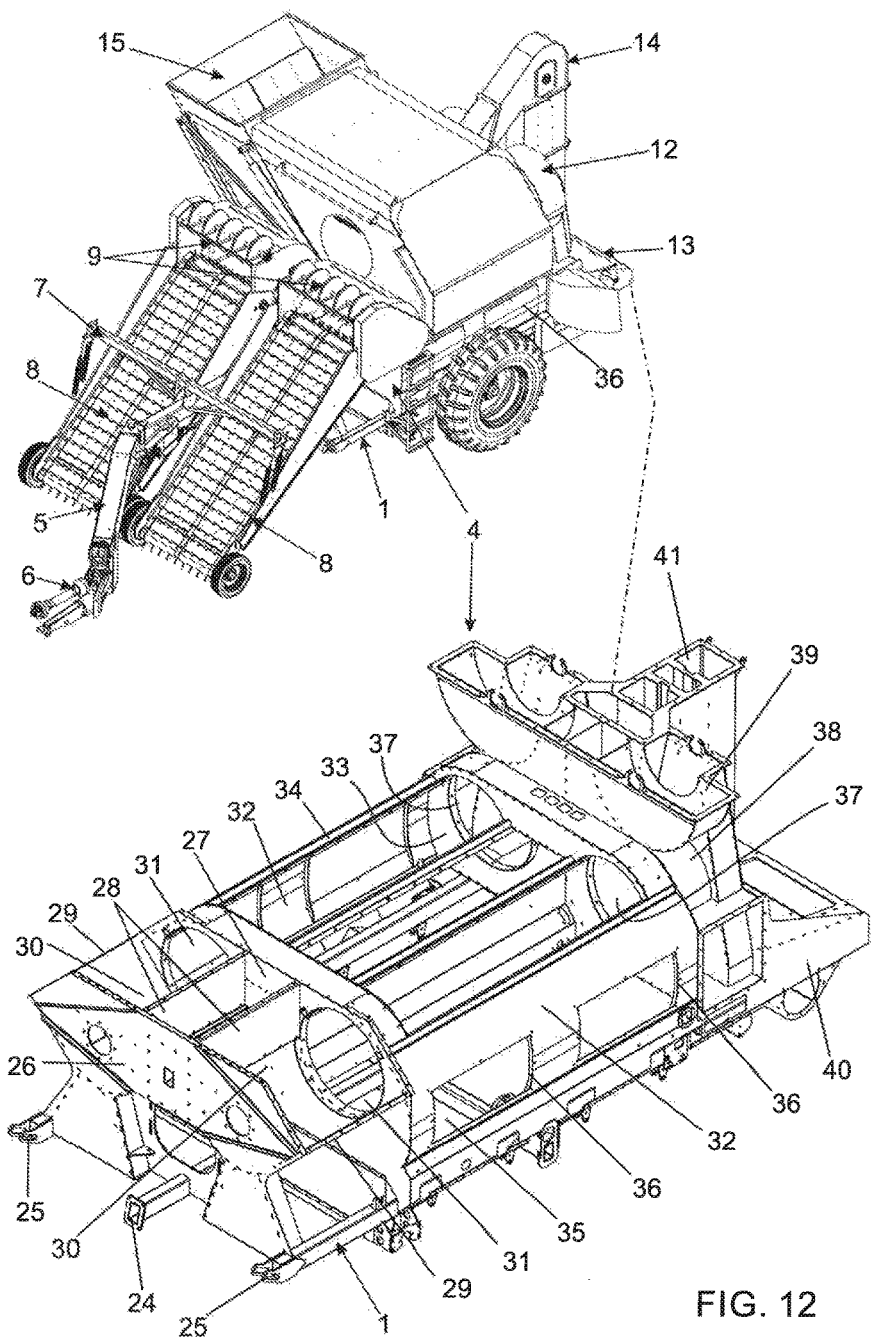
FIG. 12 is a perspective of the machine and an amplified perspective of only the mono block body that makes up the main structure for assembling all the other assemblies.
Figure 13:
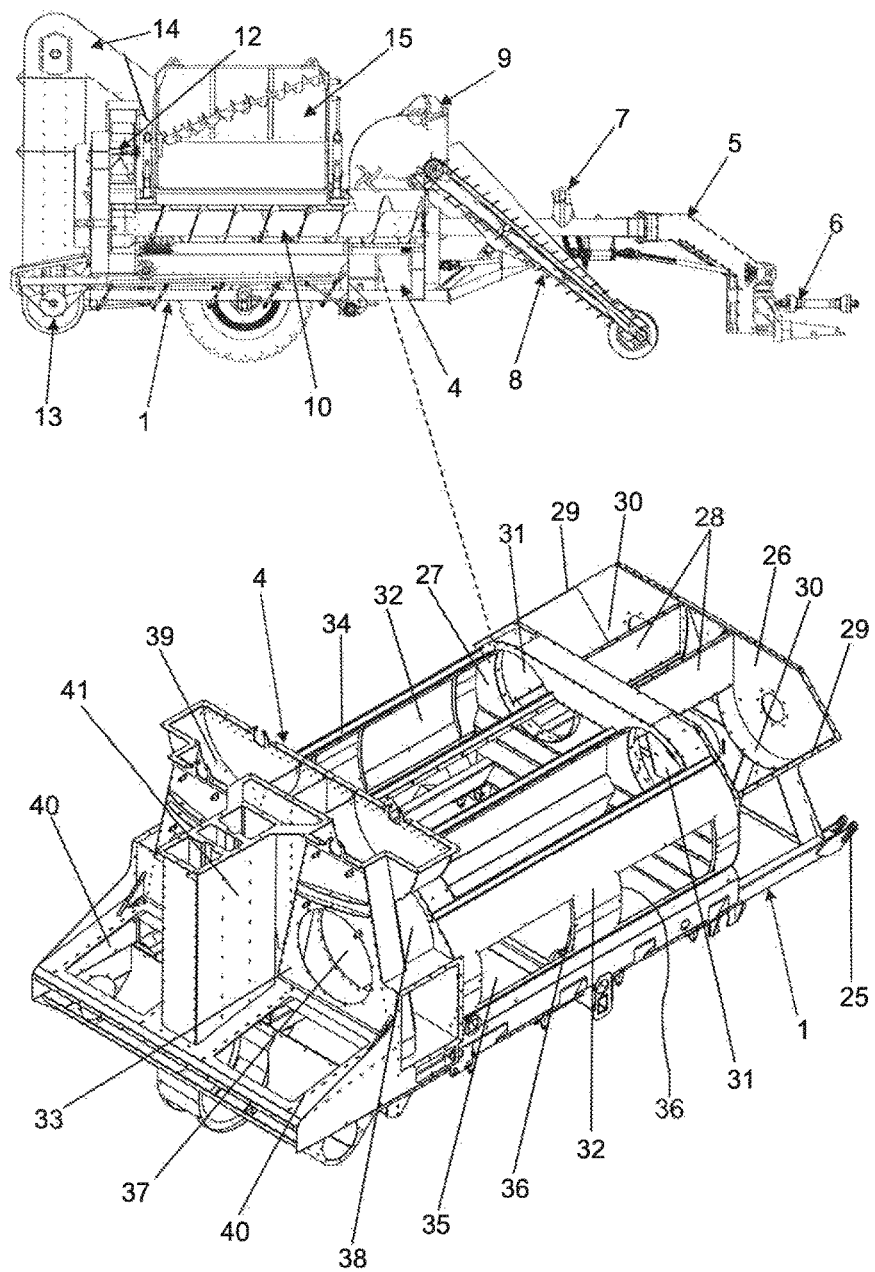
FIG. 13 exposes a side sectional view of the machine, and a rear angled amplified perspective.

The plate-structured body (4) is illustrated in detail in FIGS. 12 and 13, where it can be seen that it is assembled on the chassis (1) and forms with it a mono block structure. The body (4) is formed by a set of double housings, in which the first is set up in the frontal region and is composed by two transversal plate panels, a front one (26) and a rear one (27), spaced by intermediate and longitudinal plates (28) combined with inclined side closings (29), forming two receptive boxes (30) for materials to be processed, both equal with circular openings made in the rear panel (27), behind which are formed two other ordinarily cylindrical and longitudinal boxes (32), limited in length by the front panel (26) and another rear panel (33), between which is formed an open horizontal support plane (34) for the tipper bucket (15), being that, also, said cylindrical boxes have different openings, being the bottom ones for the exit of the processed material (35), side ones for inspections (36) and respective lids and rear passage openings for the disposable material (37); these last ones are circular and are positioned in alignment with those other ones (31) between which are set up the assembling compartment of the set of threshing cylinders (10).

Behind the circular openings (37) is formed a double box (38) prolonged upwards in a semi-circular way (39) forming an assembling structure for the double set of ventilation (12). After this there are two other boxes, one lower transversal one (40) and, above this one, a vertical one (41), both form the assembling structure for the receptive chute (13) and of the vertical bucket transporter (14).

Figure 14:
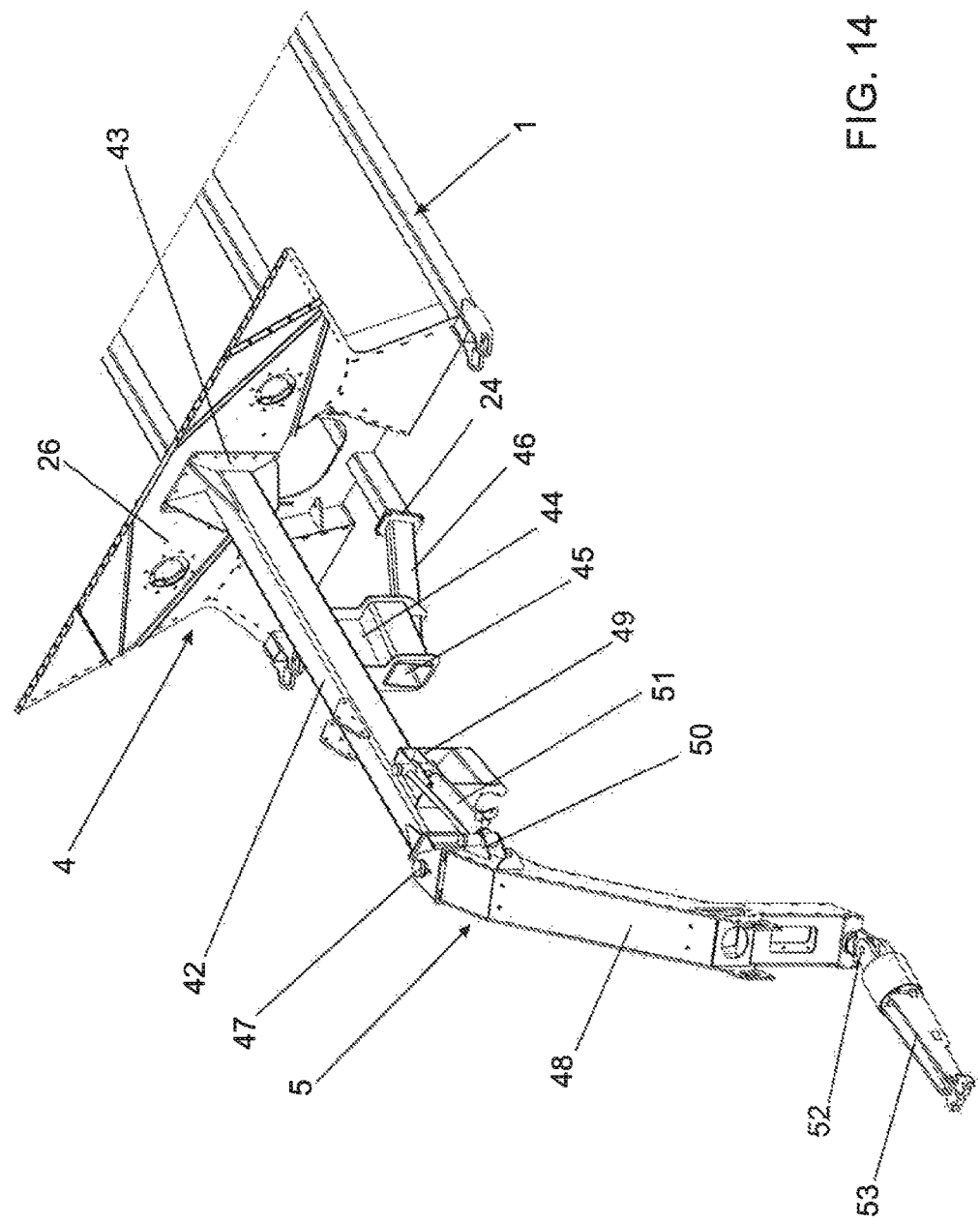
FIGS. 14 and 15 produce amplified details showing in perspective the hitch pole.
Figure 15:
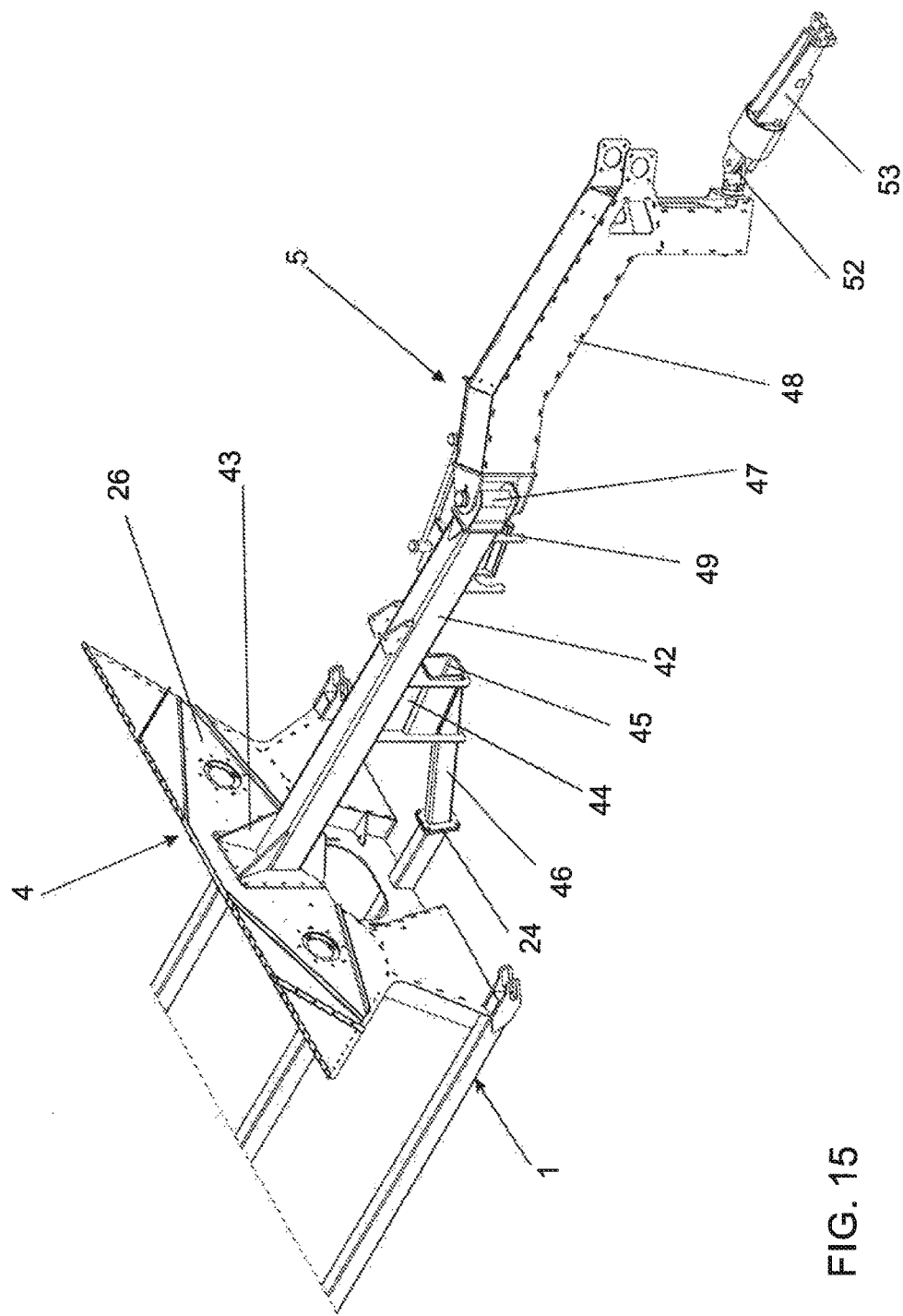

The angular hitch pole (5) is illustrated in detail in FIGS. 14 and 15, where it can be seen that it is formed by a first horizontal and longitudinal tube (42), whose rear extremity in the form of a socket (43) is attached in the frontal panel (26) of the plate body (4). At this point, it is planned another lower fixation point, and for that, said tube (42) has a support (44) with a passage tube (45), and under this last one, another inclined tube (46) that extends to have its extremity fixed in the terminal (24) of the chassis (1), while by the opposite extremity, the tube (42) is articulately (47) coupled in an L-shaped prolonging directed downwards (48), where is planned between these two parts, two supports (49) and (50) interconnected by a hydraulic piston (51) for angle adjusting, being that, also, the distal terminal of the L-shaped piece (48) contains another articulation directed frontward (52) that receives a prolonging in the form of a hitch tip (53), for coupling to a conventional tractor, in a way that the entire machine may be easily moved.

Figure 16:
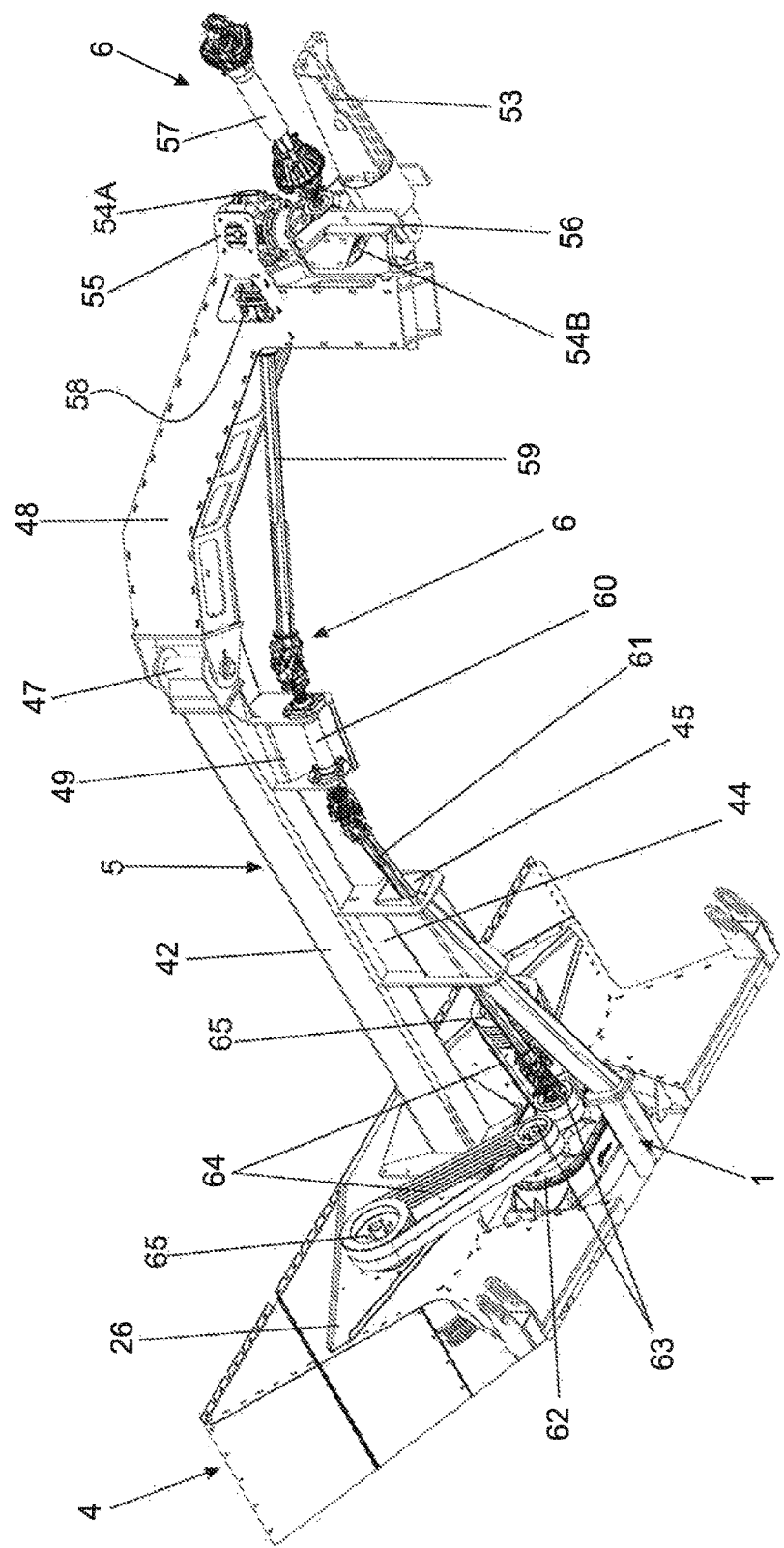
FIGS. 16 to 18 show, respectively, amplified details in isometric views in different angles and an elevated side view, focusing of the transmission assembly.
Figure 17:
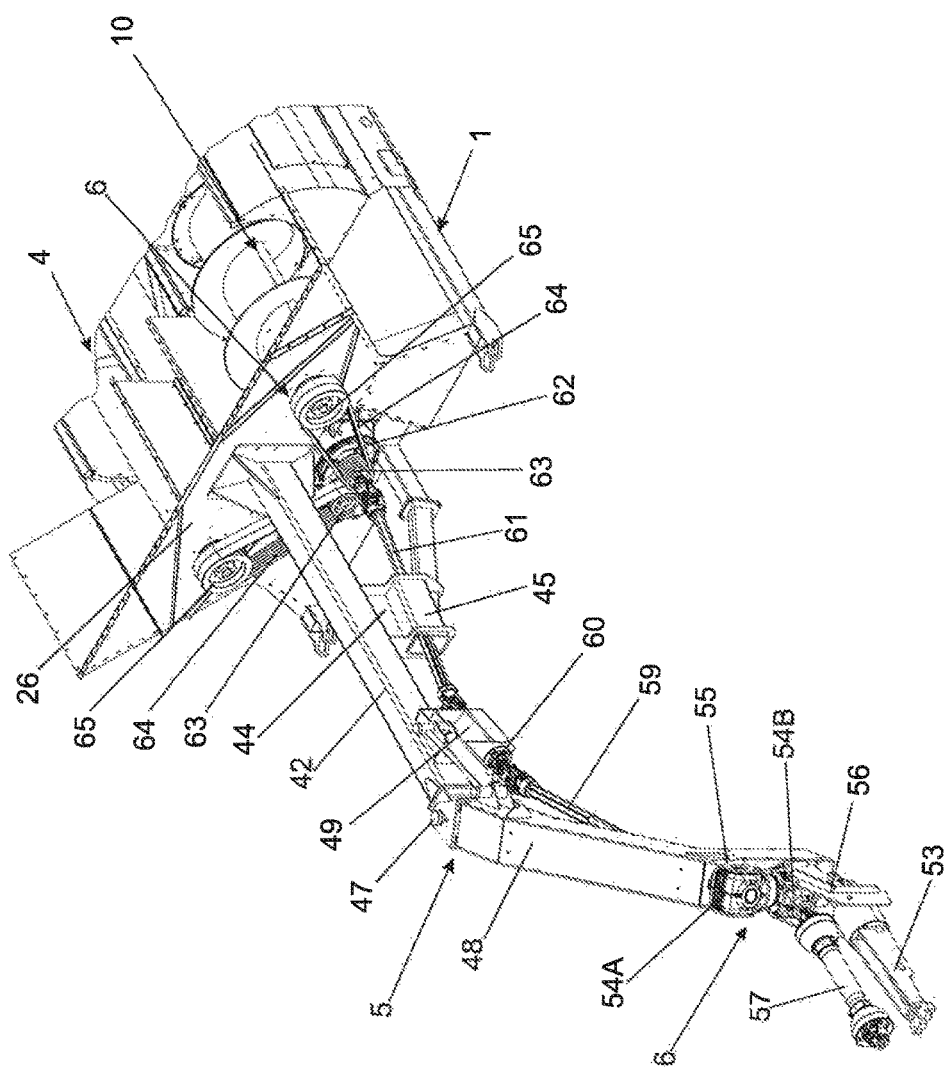
Figure 18:
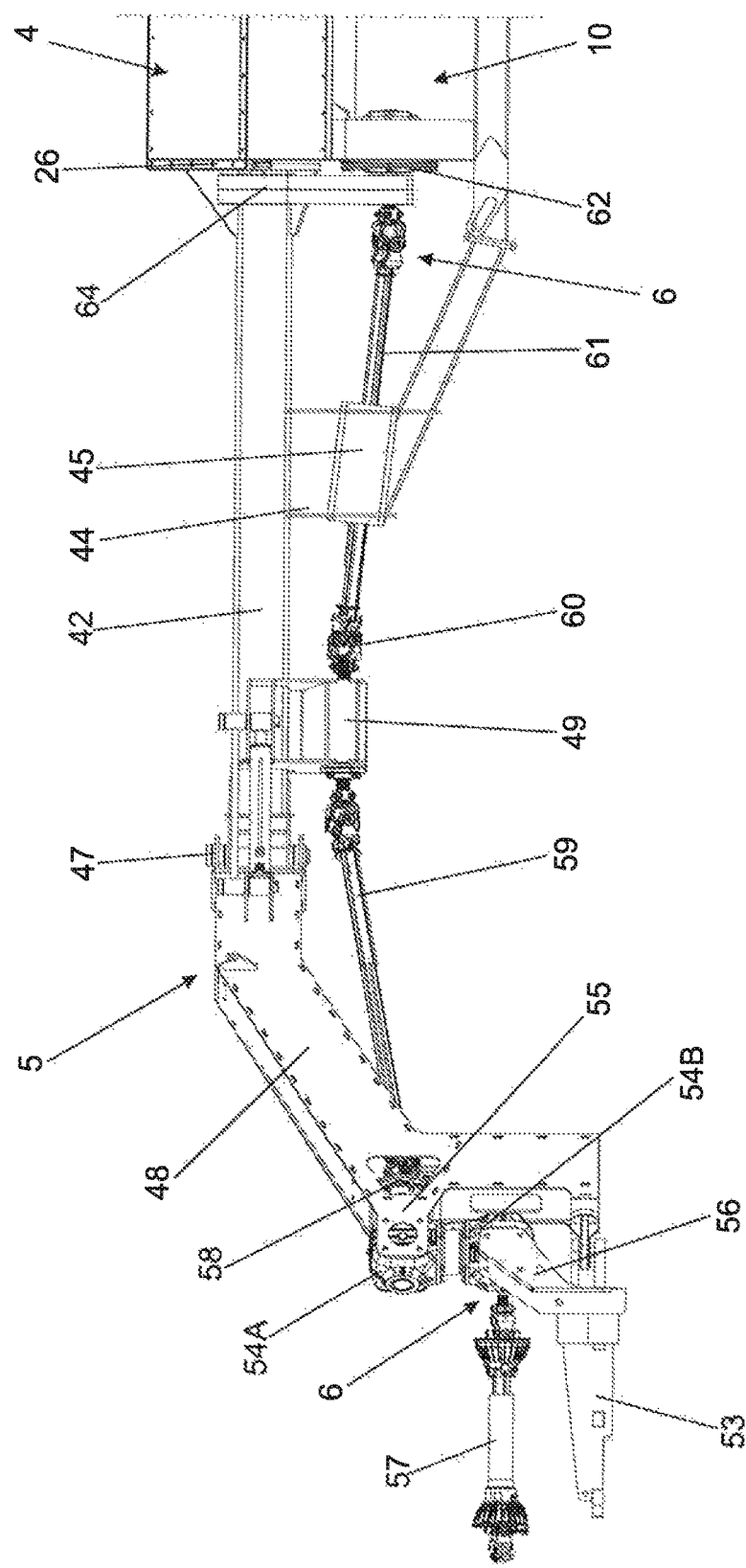

The transmission (6) is illustrated in detail in FIGS. 16 to 18, where it can be seen that it has a set of a double box of articulated transmission (54A and 54B). The top one (54A) is solidly fixed between flaps (55) featured in the hitch pole (5), while the bottom one (54B) is free to spin both ways, and therefore, contains a fork (56) turned downwards and by which passes the tip (53) of the pole (5), in a way that the said lower box may copy the movements of said tip (53), and also, in the entrance axle of said box is coupled a first cardan axle (57), side by side positioned above the tip (53) of the hitch pole (5), having its free extremity turned frontwards and planned to be coupled to the power outlet of a conventional tractor and transmit the rotation to the bottom box (54B), and from this one to the top box (54A), whose exit axle with elastic coupling (58) is coupled in a second telescopic cardan axle (59) that extends under the "L" shaped piece (48) of the hitch pole (5), and in the straight stretch (42), this second cardan axle is coupled in a third intermediate cardan axle (60) assembled in the support (49) that, finally, is coupled in a fourth telescopic cardan axle (61) that passes freely through the inside of the tube (45) of the support (44) and extends up to the frontal panel (26) of the body (4), where it is coupled to a transmission box (62) with axles equally equipped with pulleys (63) that, through belts (64), are connected to other pulleys (65), that in turn, are coupled to the set of threshing cylinders (10).

Figure 19:
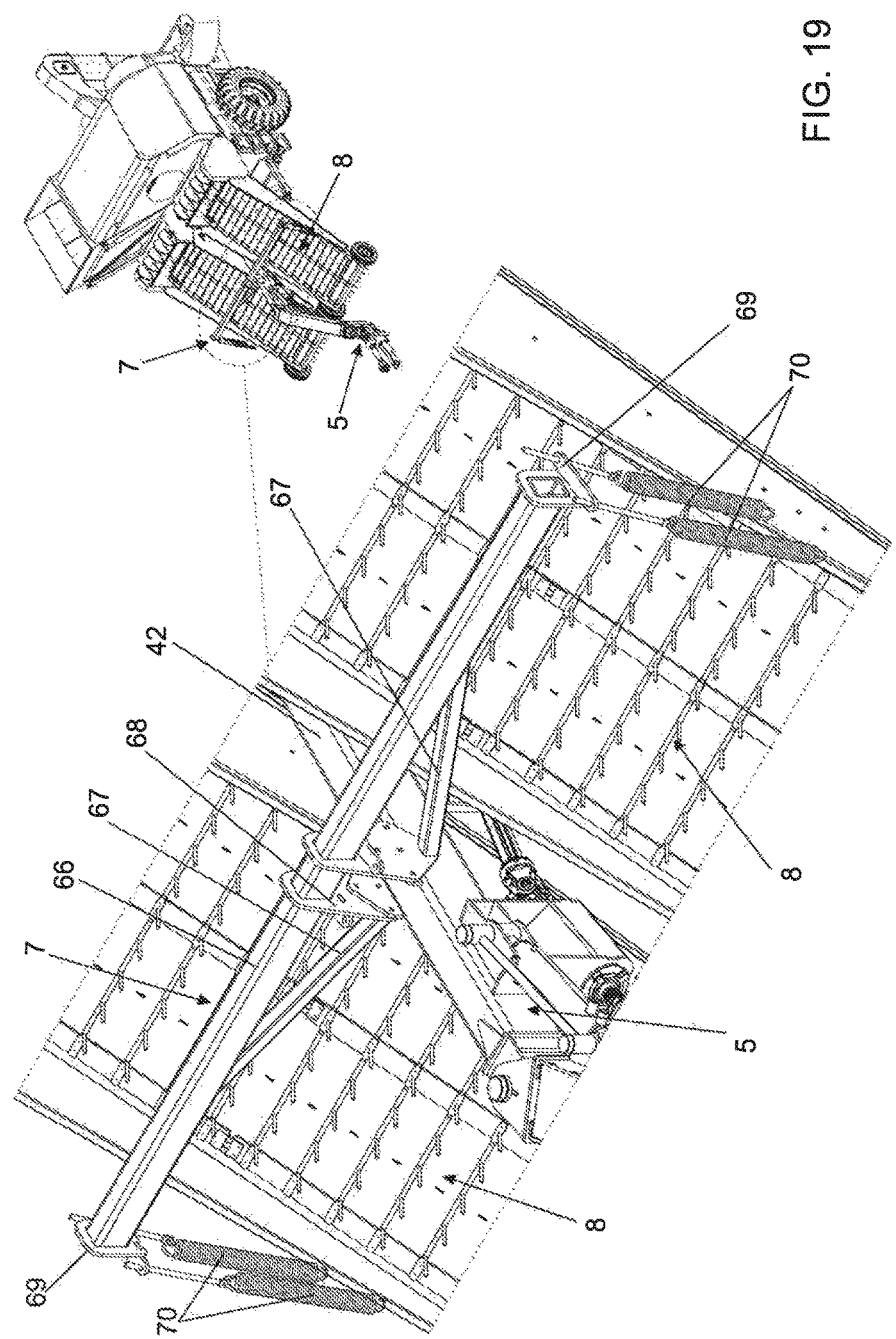
FIG. 19 represents a perspective and an amplified detail focusing on the spring transversal support of the harvesting conveyor belts.

FIG. 19 shows with detail the sustention beam (7), where it can be seen that it comprises a tubular bar (66) with middle reinforcements (67) and a support (68) fixed on top of the straight part (42) of the hitch pole (5), as also the extremities of the said tubular bar (66) have terminals (69) where are attached the upper ends of helical springs (70), whose lower ends are coupled to the corresponding edges of the inclined harvesting conveyor belts (8), providing a type of suspension to alleviate the irregularities of the ground when the conveyor belt assembly is functioning.

Figure 20:
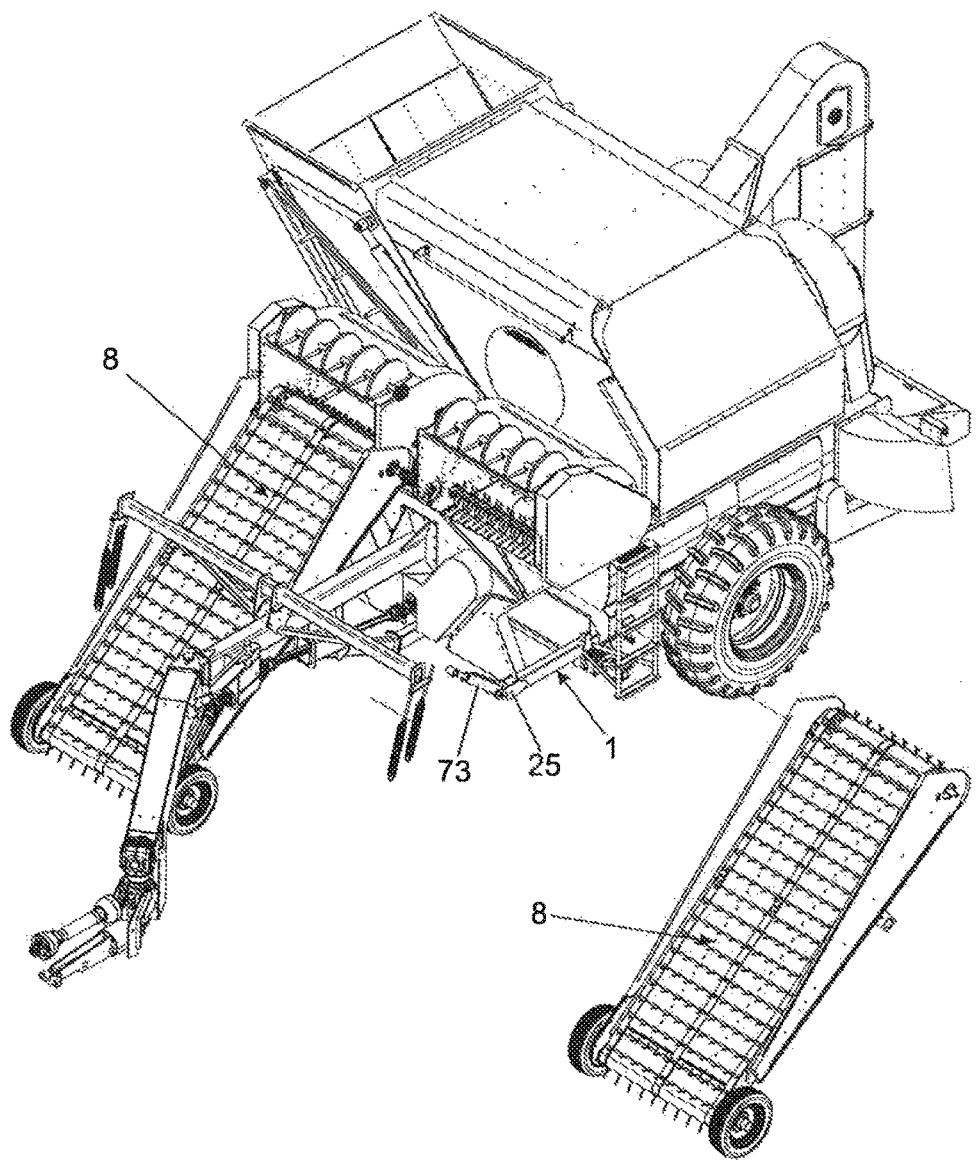
FIG. 20 shows an isometric view of the machine with only one of the harvesting conveyor belts in an exploded view focusing on the constructive details.
Figure 21:
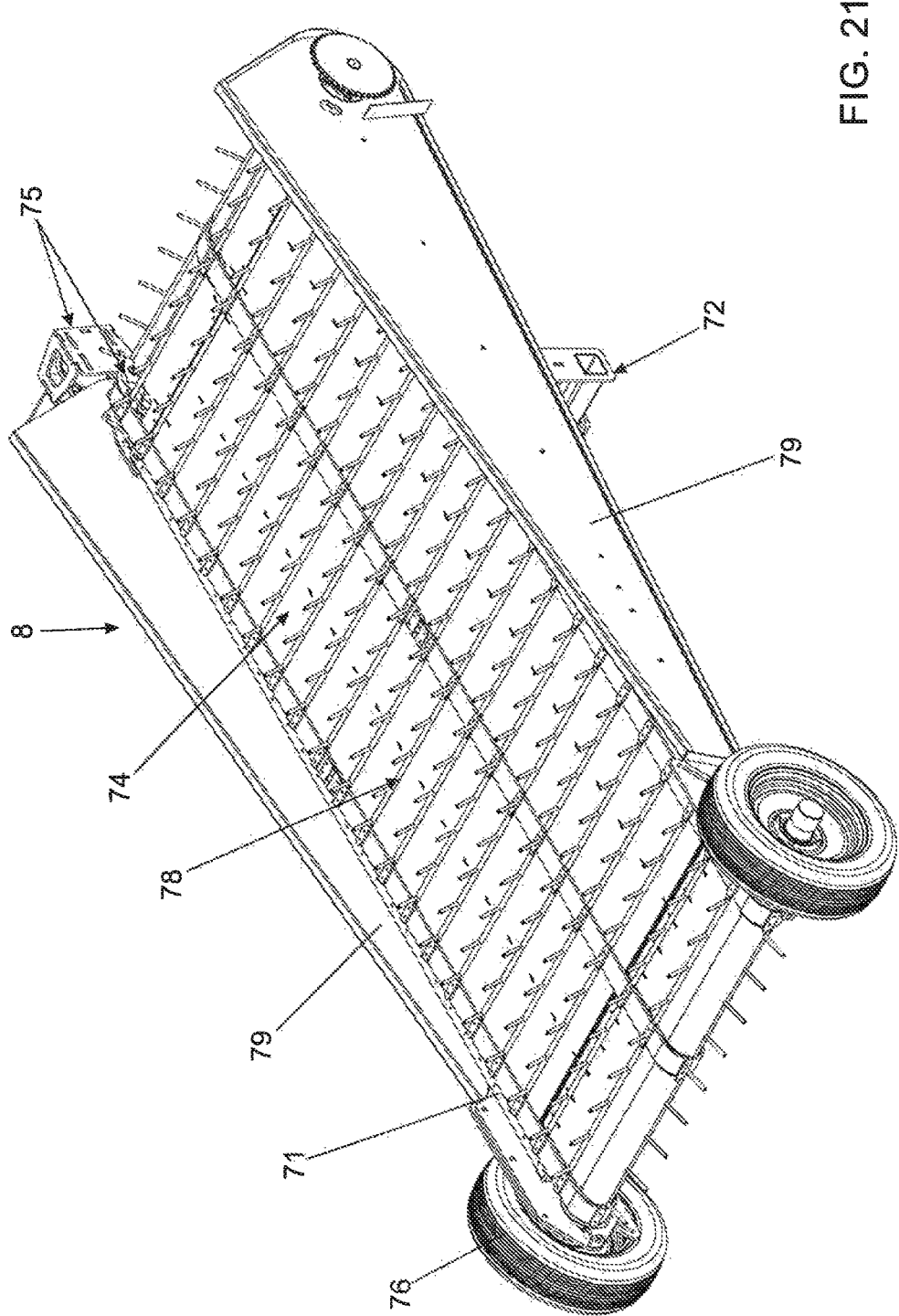
FIGS. 21 and 22 illustrate perspectives in different angles showing the top and bottom of one of the harvesting conveyor belts.
Figure 22:
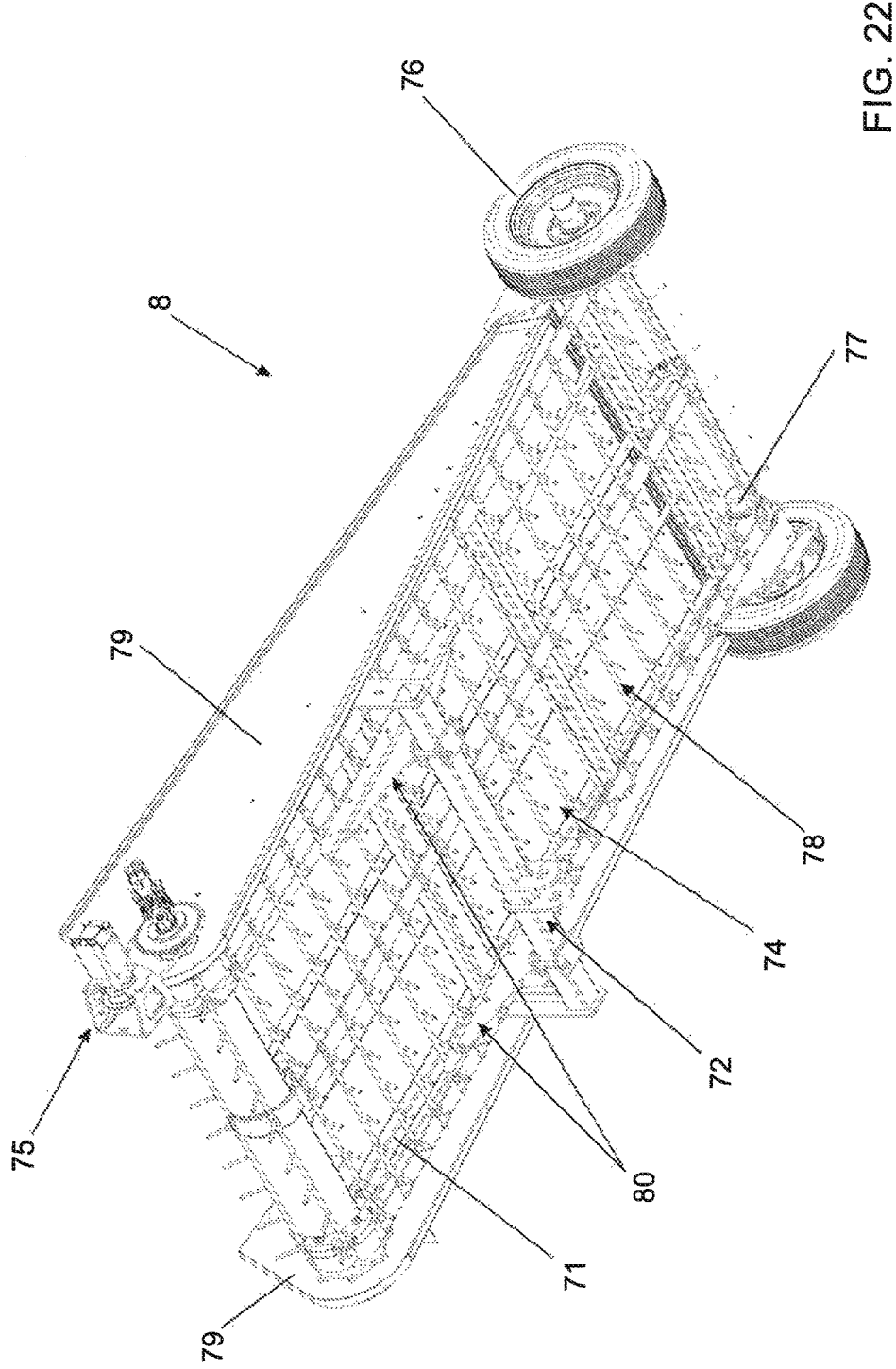

FIGS. 20, 21 and 22 illustrate with detail one of the inclined harvesting conveyor belts (8), where it can be seen that it comprises a rectangular structure (71), with its lower side integrated with a median transversal support (72) for articulated coupling to the upper extremity of a hydraulic cylinder (73), whose lower extremity is equally articulated in the correspondent fork (25) of the chassis (1). This cylinder is responsible for the hinged movement and angle adjustment of each harvesting conveyor belt (8), in a way that they can be positioned to work or be lifted up when the machine is moving but is not in use.

By the upper side of said structure (71), it receives a plate closing in the form of a sieve (74), as also its extremities receive an assembly of upper traction (75) and a lower wheel assembly (76), being in between these said wheels a set of free rollers (77), that along with the upper traction assembly (75), compose a point of assembling for the conveyor belt itself (78), having its upper part moving upwards over the sieve (74) and in between the side walls (79), while the bottom moves downwards over the structure (71) and is guided by being over a pair of skis (80).

Figure 23:
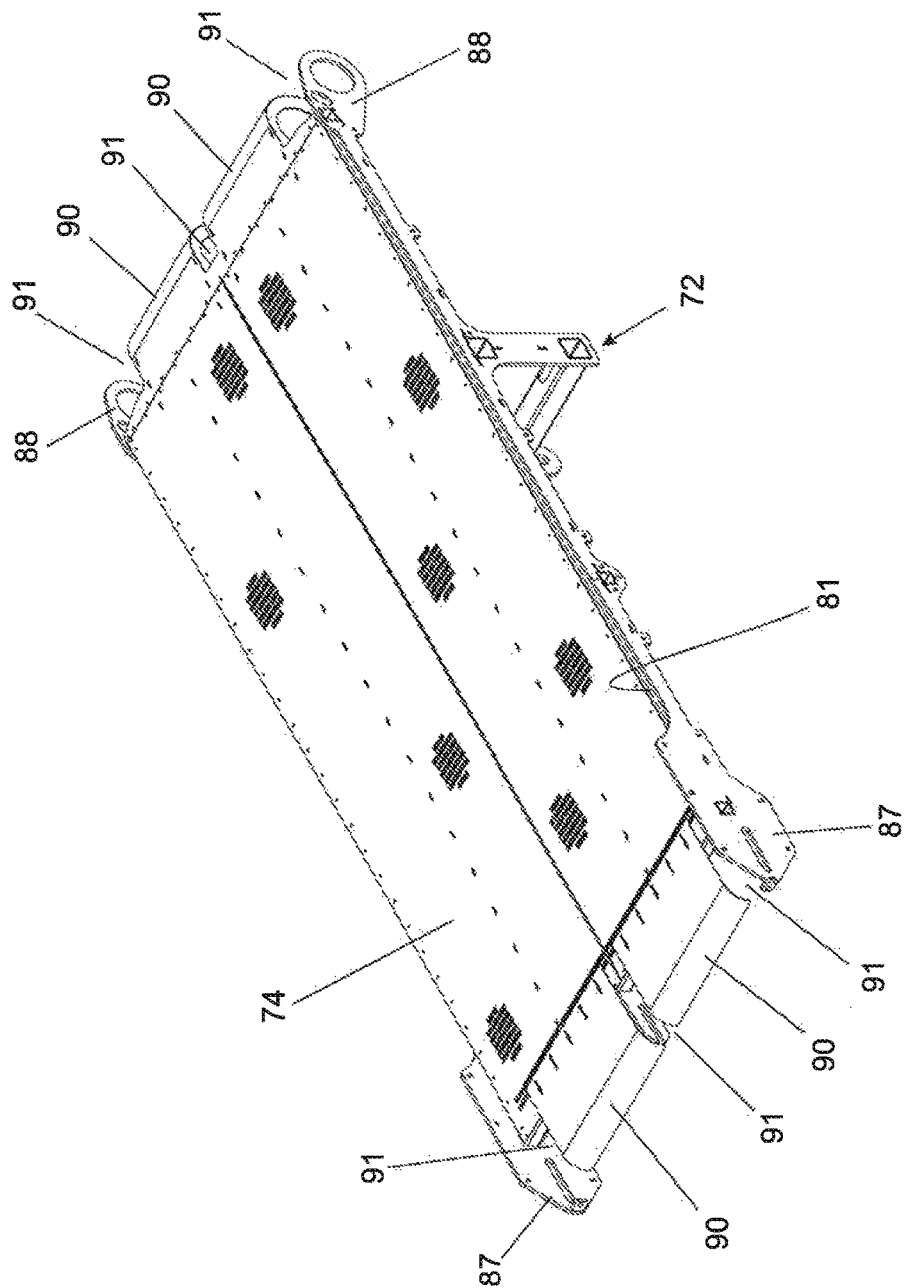
FIGS. 23 and 24 are perspectives in different angles showing the main structure of a harvesting conveyor belt.
Figure 24:
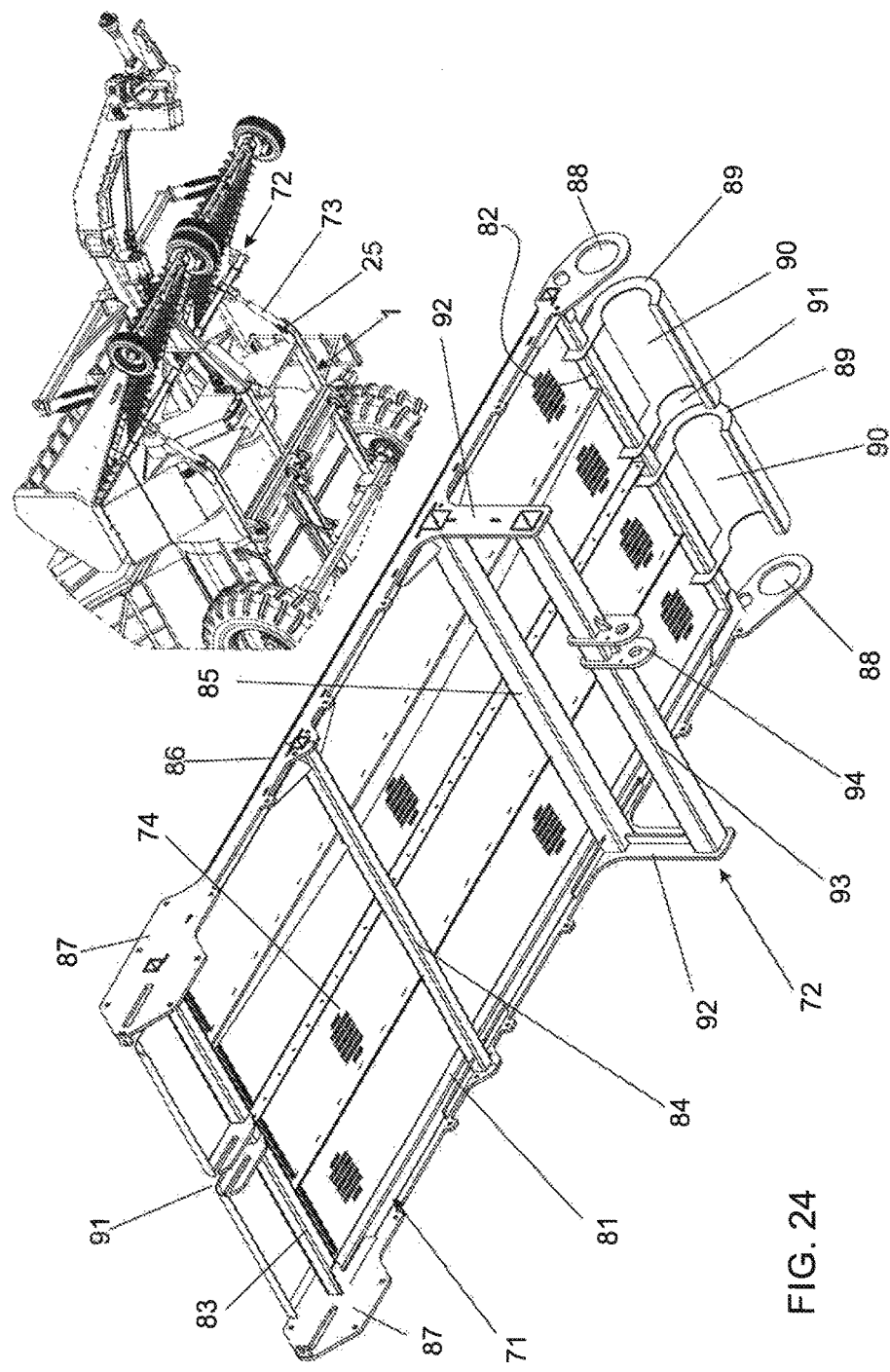

Also illustrated by FIGS. 23 and 24, the structure (71) is formed by long plate pieces (81) interconnected by outer crossbars (82-83) and intermediate crossbars (84) e (85), all of them with their extremities integrated in plate strips (86) fixed against the side faces of the said long plate pieces (81), as also the lower extremities of the plate strips present widened stretches (87) for fixation of the wheels (76), while the upper extremities are also widened, however, with a circular shape (88), axially aligned with other two pairs of semi-circular pieces (89) positioned in the outer crossbars (82), forming a set of passage and bearing pieces of the upper traction assembly (75).

Still in relation to the FIGS. 23 to 24, the sieve (74) is present in two longitudinal segments whose upper and lower extremities extend forming two downward curved stretches (90) with spacing (91), between which are positioned, respectively, parts of the traction assembly (75) and set of rollers (77).

The transversal and median support (72), seen in detail in FIG. 24, Is formed by two projections (92) that develop perpendicularly downward, one on each side of the plate strip (86), where said projections receive the extremities of a tube (93) with a middle point for articulated coupling (94) to the corresponding extremity of the hydraulic cylinder (73), whose lower extremity is equally articulated to the corresponding fork (25) of the chassis (1). This cylinder is responsible for the hinged movement and angle adjustment of each harvesting conveyor belt (8), in a way that they can be positioned to work or be lifted up when the machine is moving but is not in use.

Figure 25:
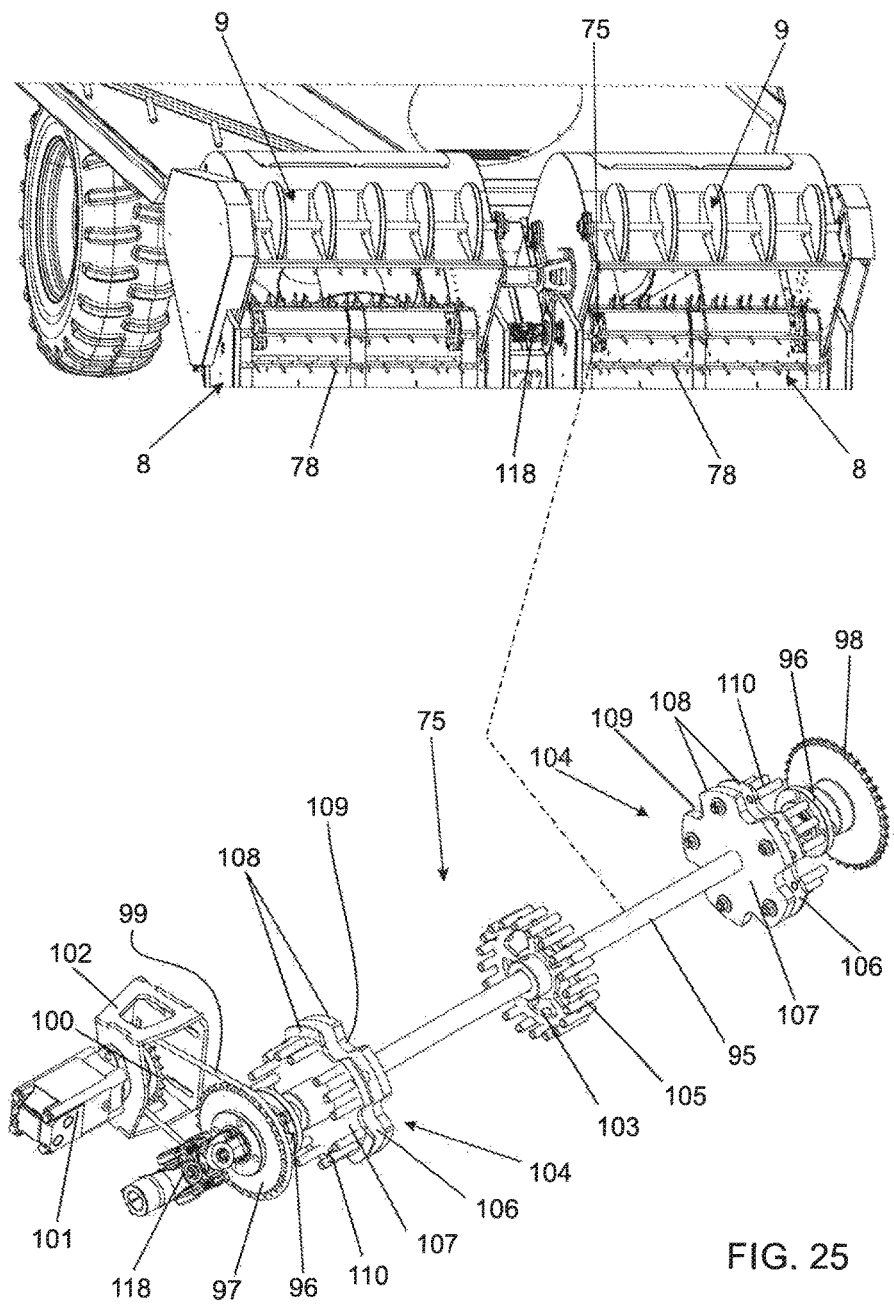
FIG. 25 exposes two amplified details in perspective, focusing on the top traction assembly and of a harvesting conveyor belt.
Figure 26:
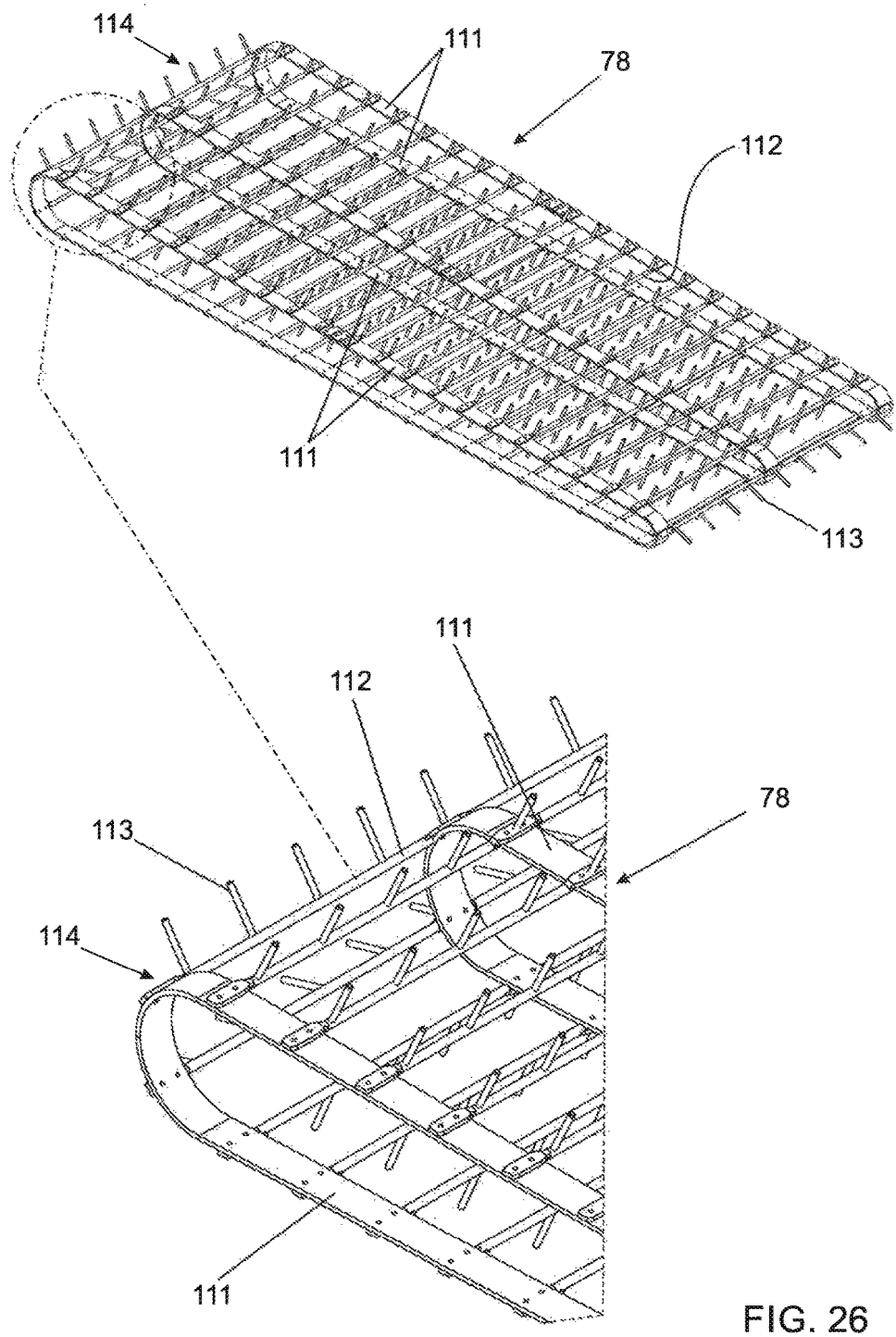
FIG. 26 produces an isometric view and an amplified detail, showing details of the conveyor belt itself.
Figure 27:
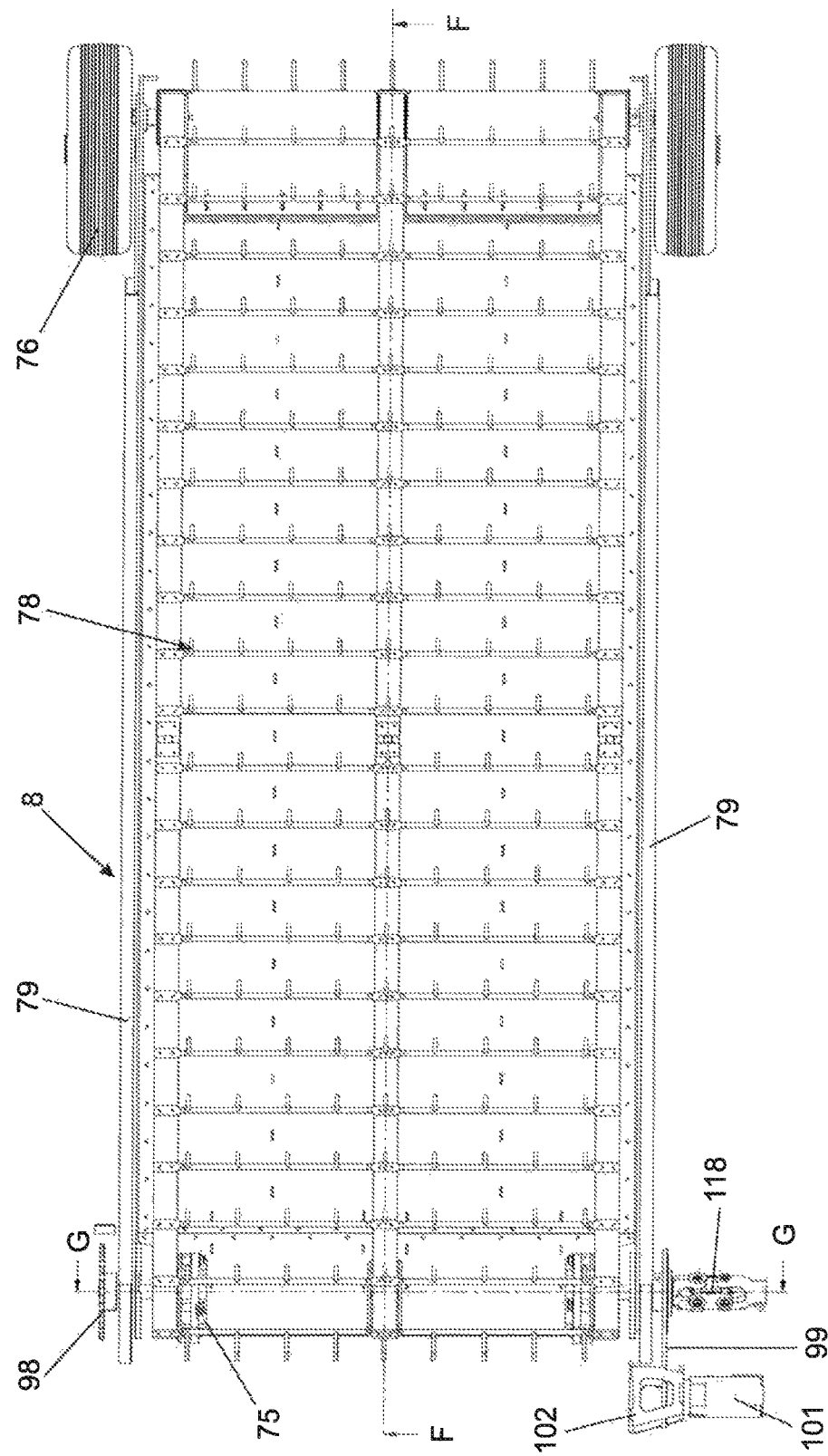
FIGS. 27 to 30 are top and side views, also views of various indicated cuts in each figure, showing in details the assembling of a harvesting conveyor belt.
Figure 28:
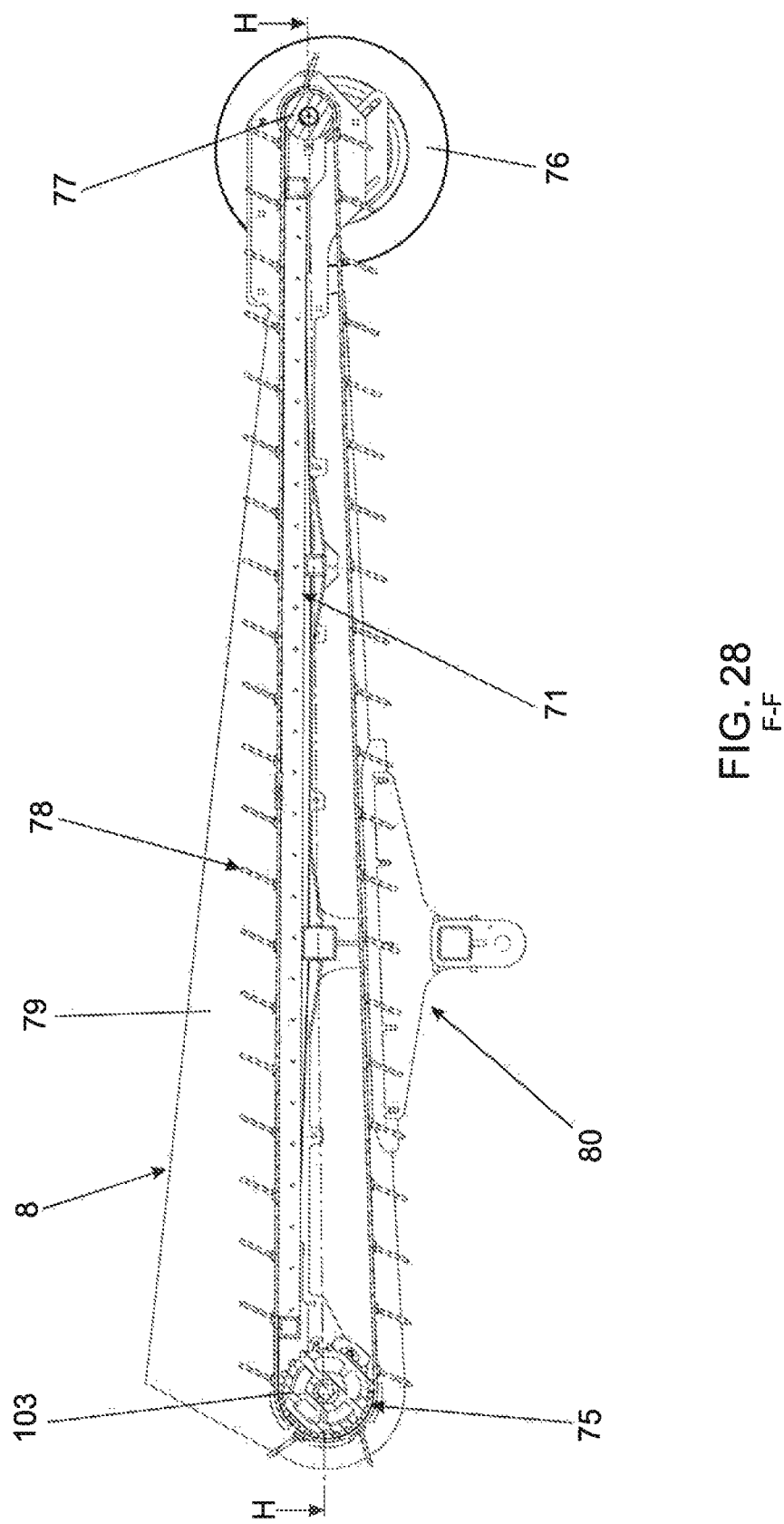
Figure 29:
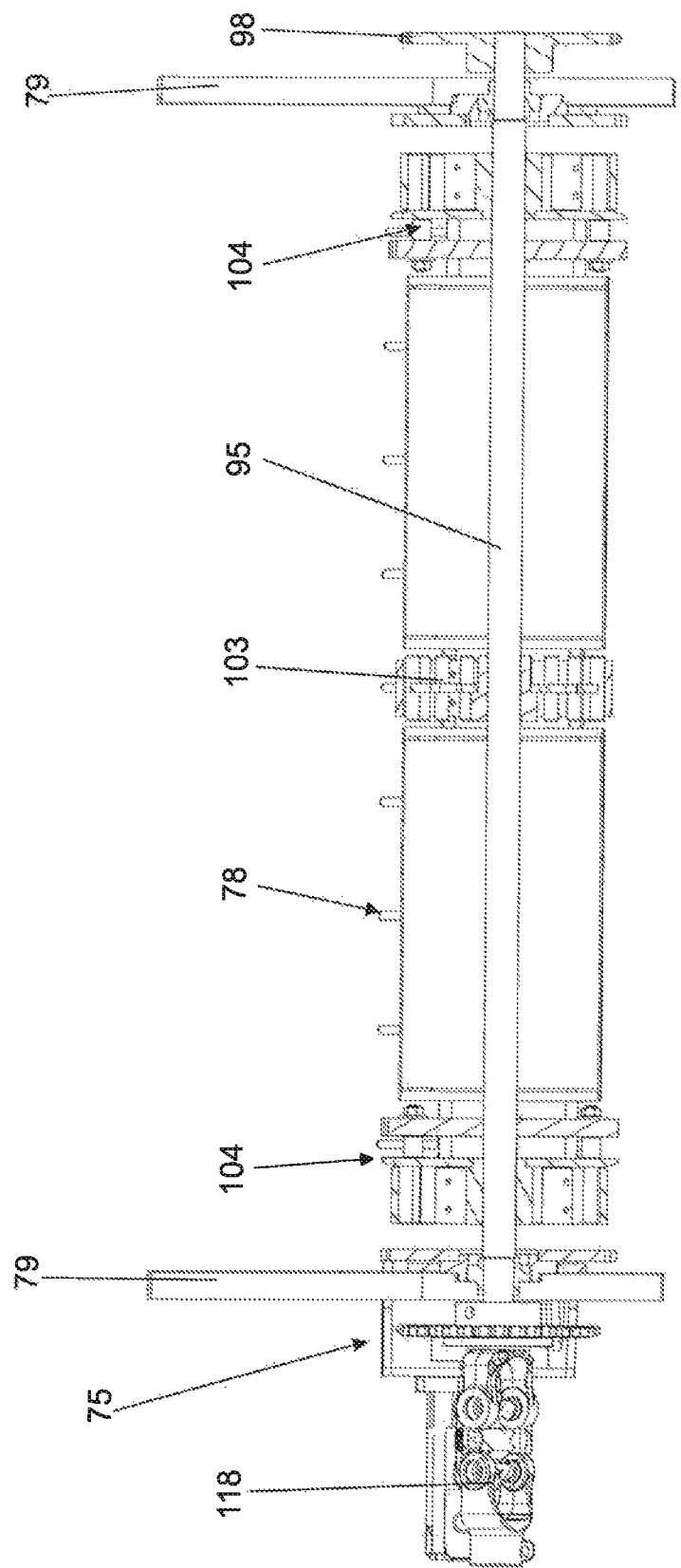
Figure 30:
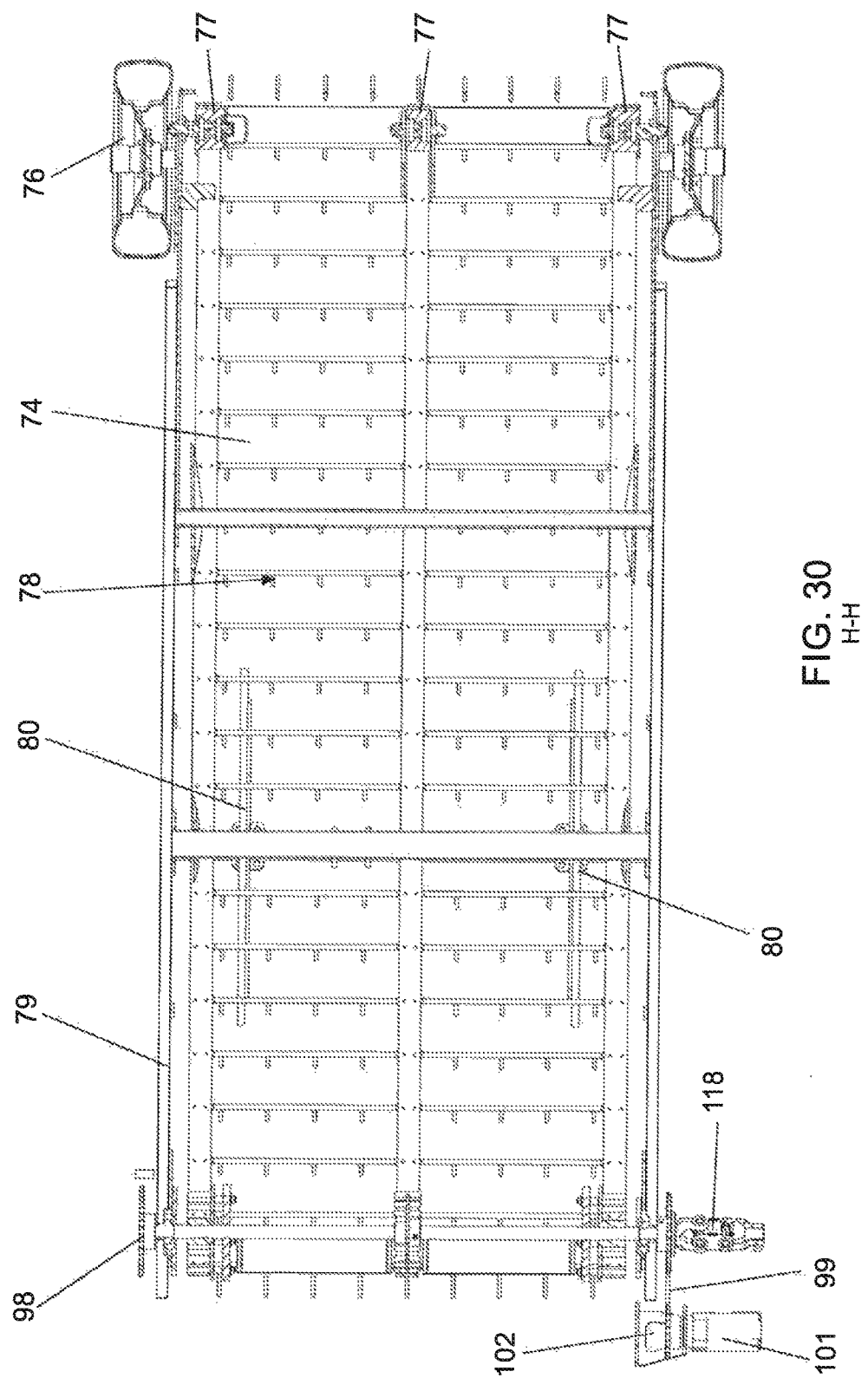

FIG. 25 shows the upper traction assembly (75), where it can be seen that it comprises an axle (95), whose extremities have bearings (96) and pass through the side walls of the corresponding anti-jam receptive box (9), after which said extremities receive gears (97) and (98), in which the first is pulled by a chain (99) coupled to another gear (100) assembled in the axle of a hydraulic engine (101), that in turn, is assembled in a cage type support (102) fixed on one of the corresponding side walls of the anti-jam receptive box (9), while the other gear (98) is planned for the continuity of the traction force of said hydraulic engine (101).

Still in relation to FIG. 25, said axle (95) distributes three gears, being one in the middle (103), and two outer ones (104), in which the first has its outer diameter set by a chain of cylindrical pins (105) equally distant from each other, while the two other are each formed by two spaced discs (106) e (107), equally with teeth (108) and hollowed parts (109), aligned side by side, in that each tooth (108) of the disc (106) has three axial pins (110) forming a uniform circular sequence of pins that, along with those others (105), form support of the traction for the conveyor belt itself (78).

As illustrated by FIGS. 26 to 30, the harvesting conveyor belt itself (78) comprises three parallel belts (111), substantially separated, interconnected by a plurality of transversal bars (112) all of each equal with various radial rods (113) with which are formed various transversal combs (114) that are meshed in the recess (109) of the gears (104), while the belts (111) are supported o the chain of pins (105) and (110), as also in the bottom part of the machine, the belts (111) are supported by the rollers (77) that provide the necessary means for the traction of said belts (78) that moves over the sieve (74) and on the ski (80).

Figure 31:
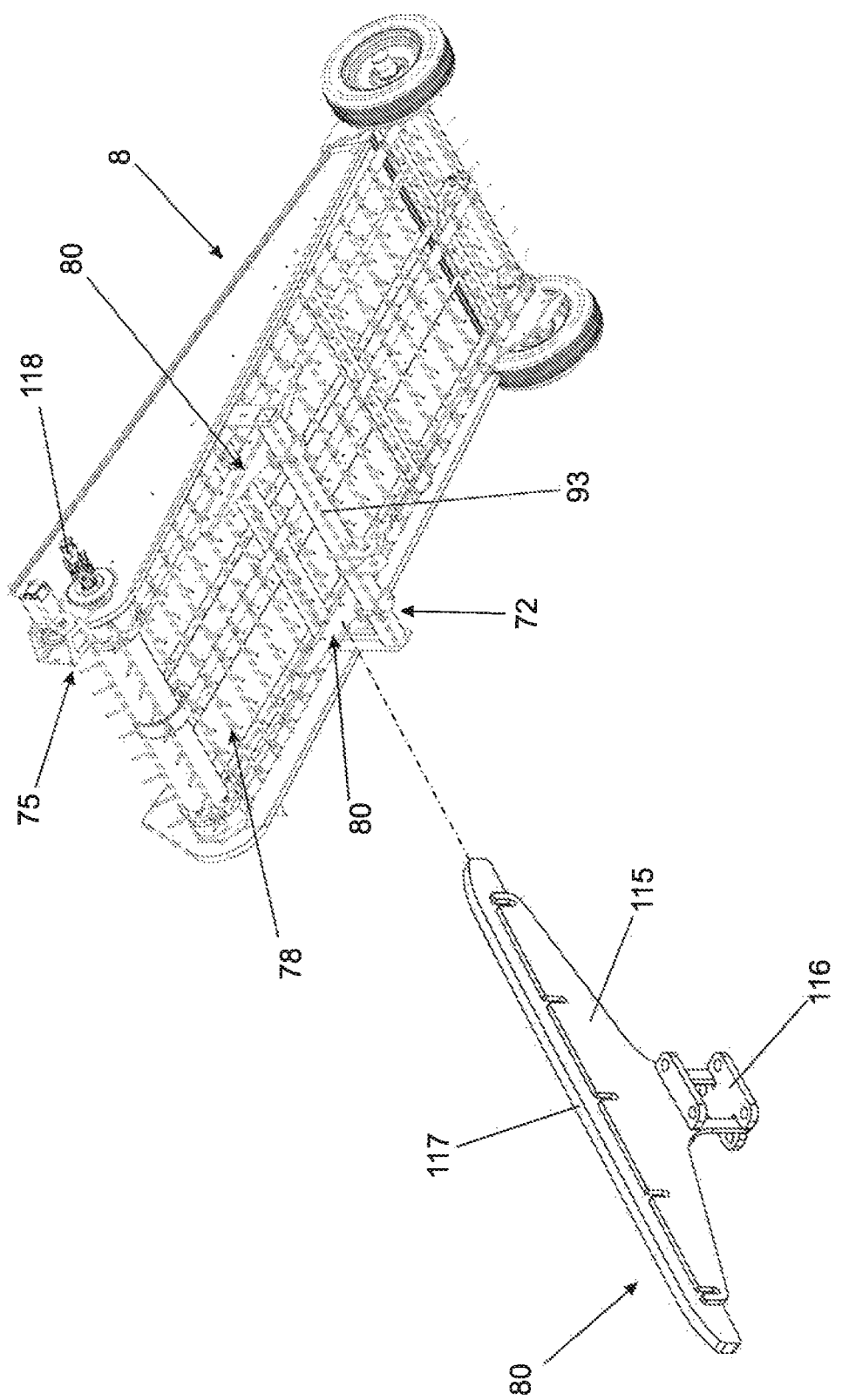
FIG. 31 shows an isometric view in a low angle and an amplified detail focusing on the sliding skis of the belt itself.

FIG. 31 illustrates one of the skis (80), where it can be seen that it comprises a T-shaped plate body (115), having in its lower extremity a fixation brace (116) to the tube (93) of the transversal support (72), while by its upper extremity it has a contact plate (117) made of a material appropriate for the sliding of the said belt (78).

Figure 32:
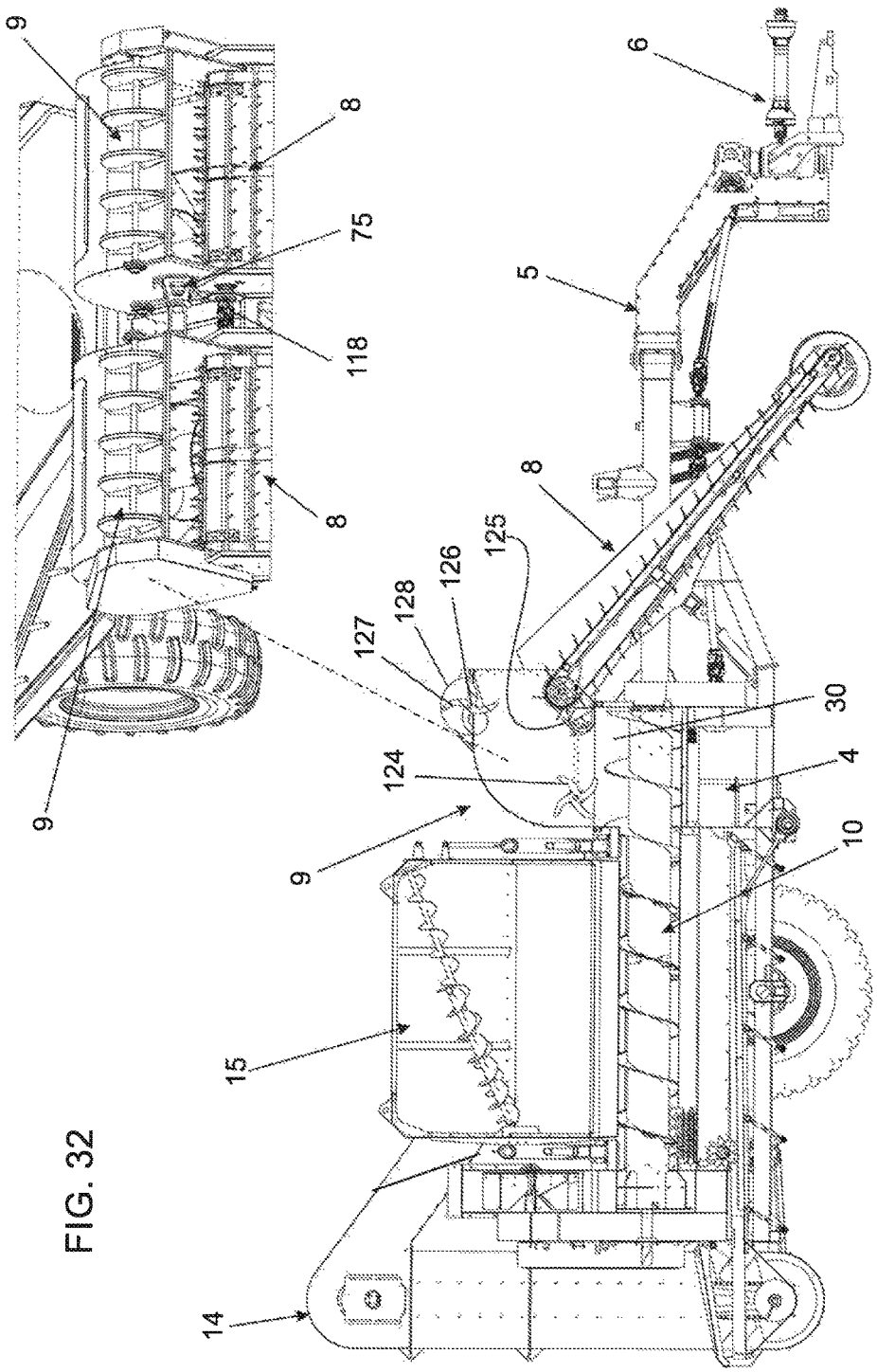
FIG. 32 represents a side sectional view and an amplified detail, showing the receptive anti-jam boxes.
Figure 33:
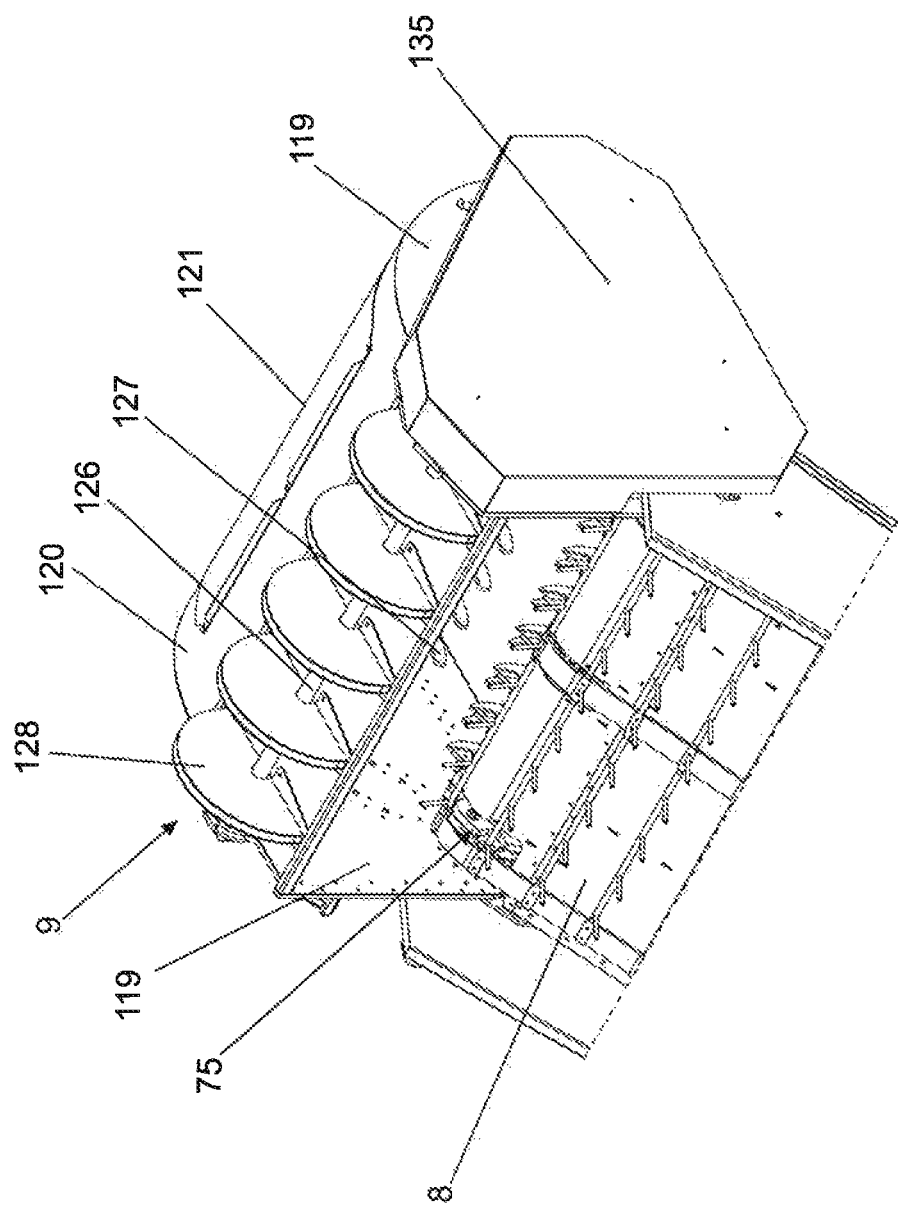
FIGS. 33 to 36 show various isometric views in different angles focusing on the constructive details of one of the receptive anti-jam boxes.
Figure 34:
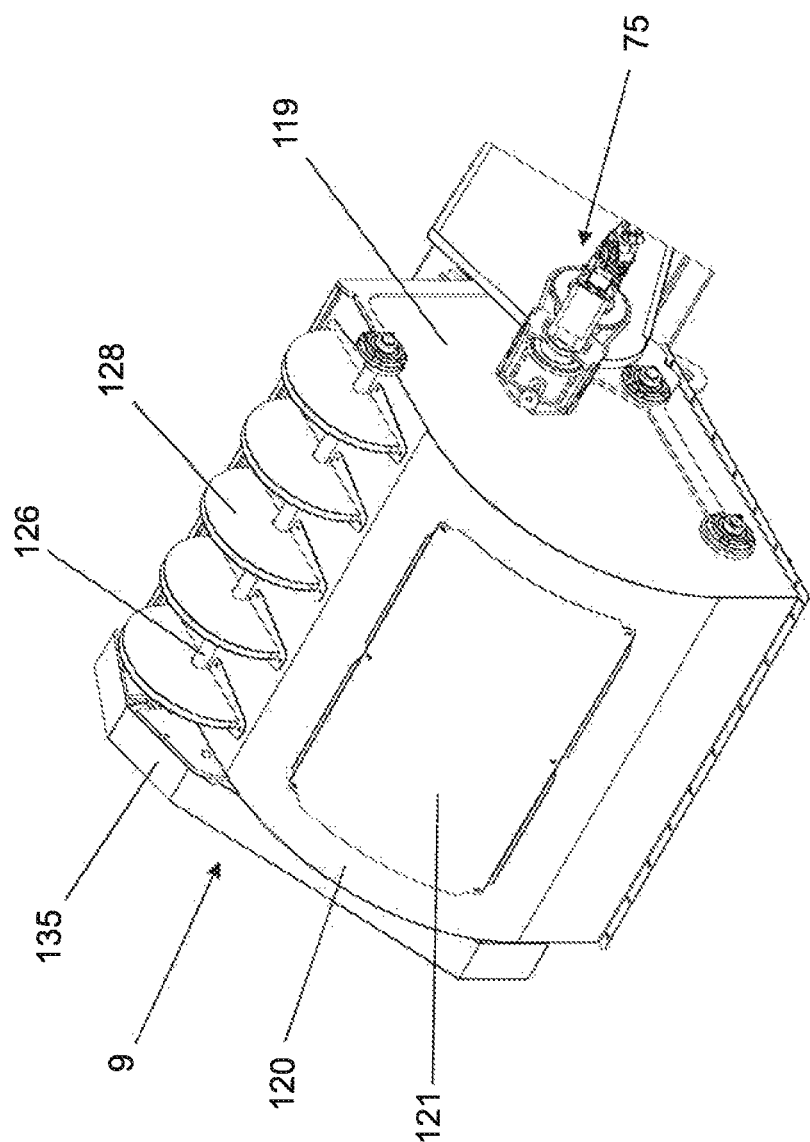
Figure 35:
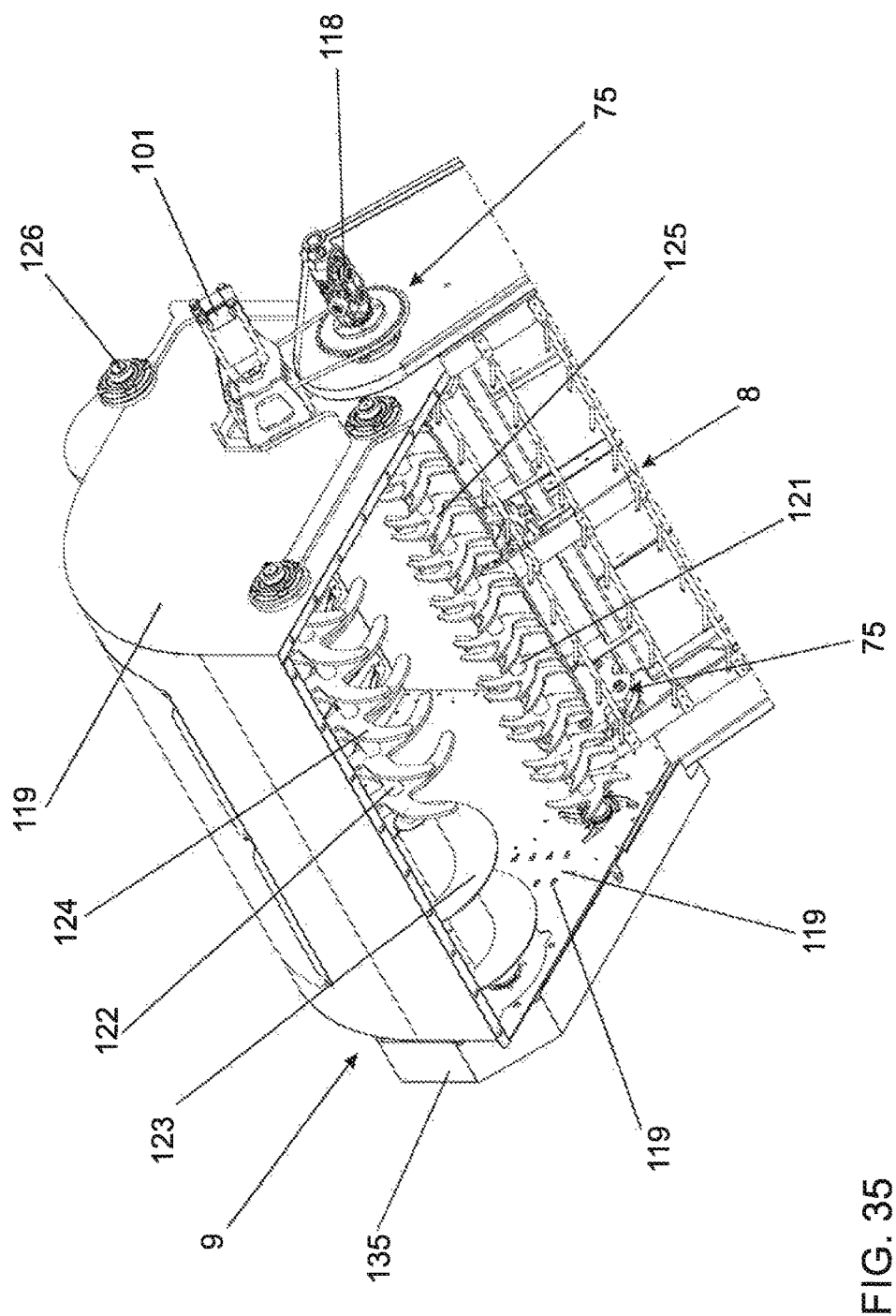
Figure 36:
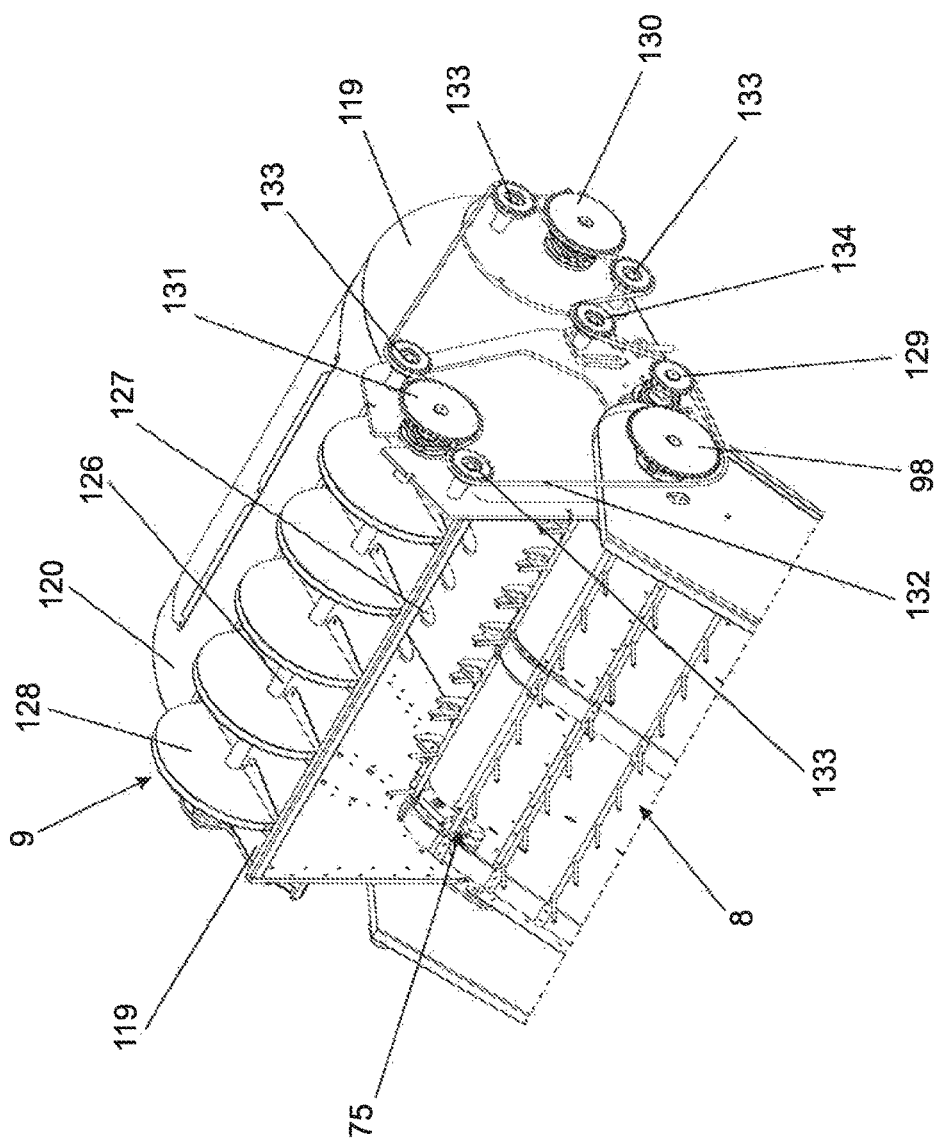
Figure 37:
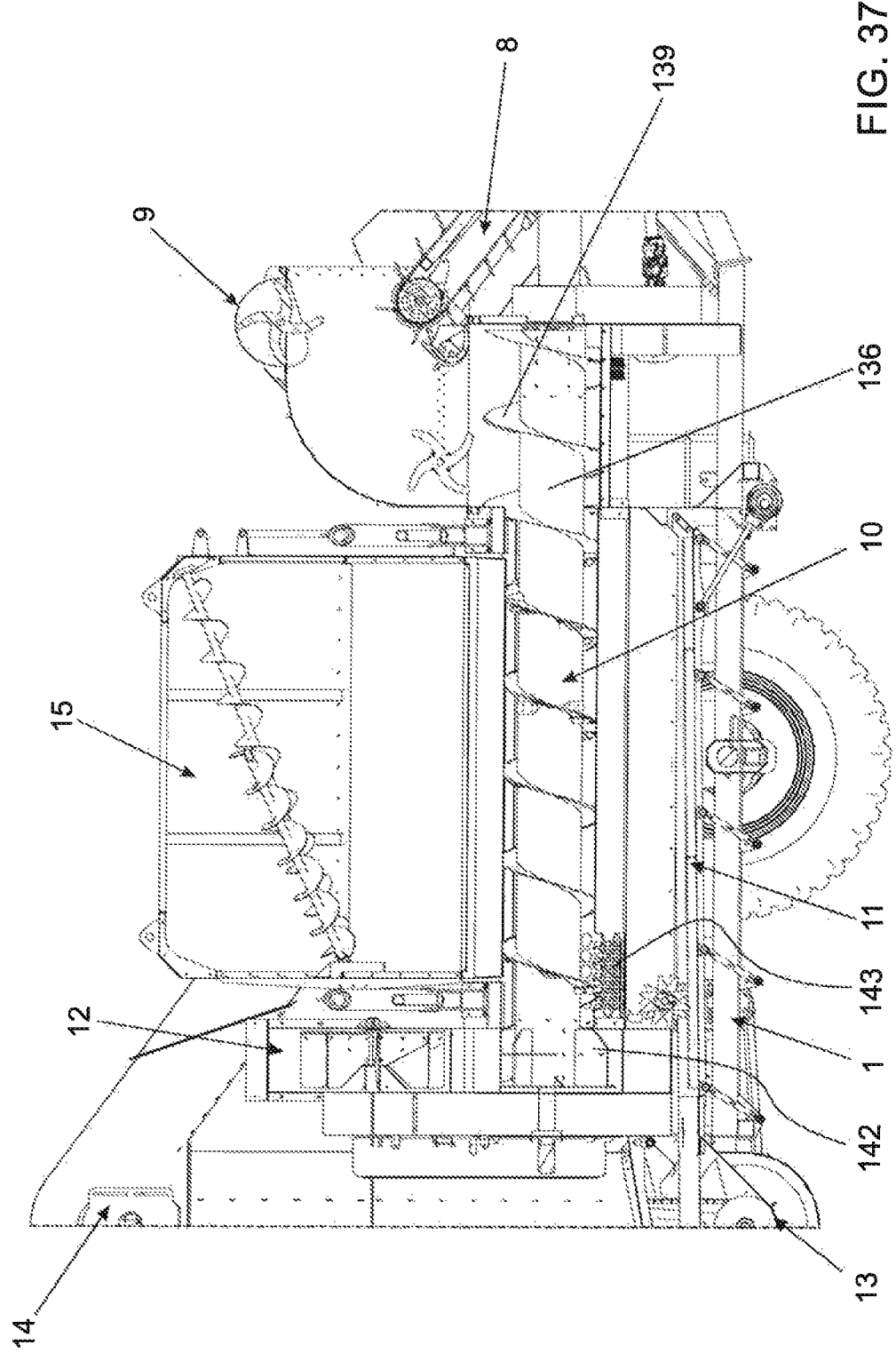
FIG. 37 illustrates an amplified detail in sectional view focusing on the set of threshing rolls.
Figure 38:
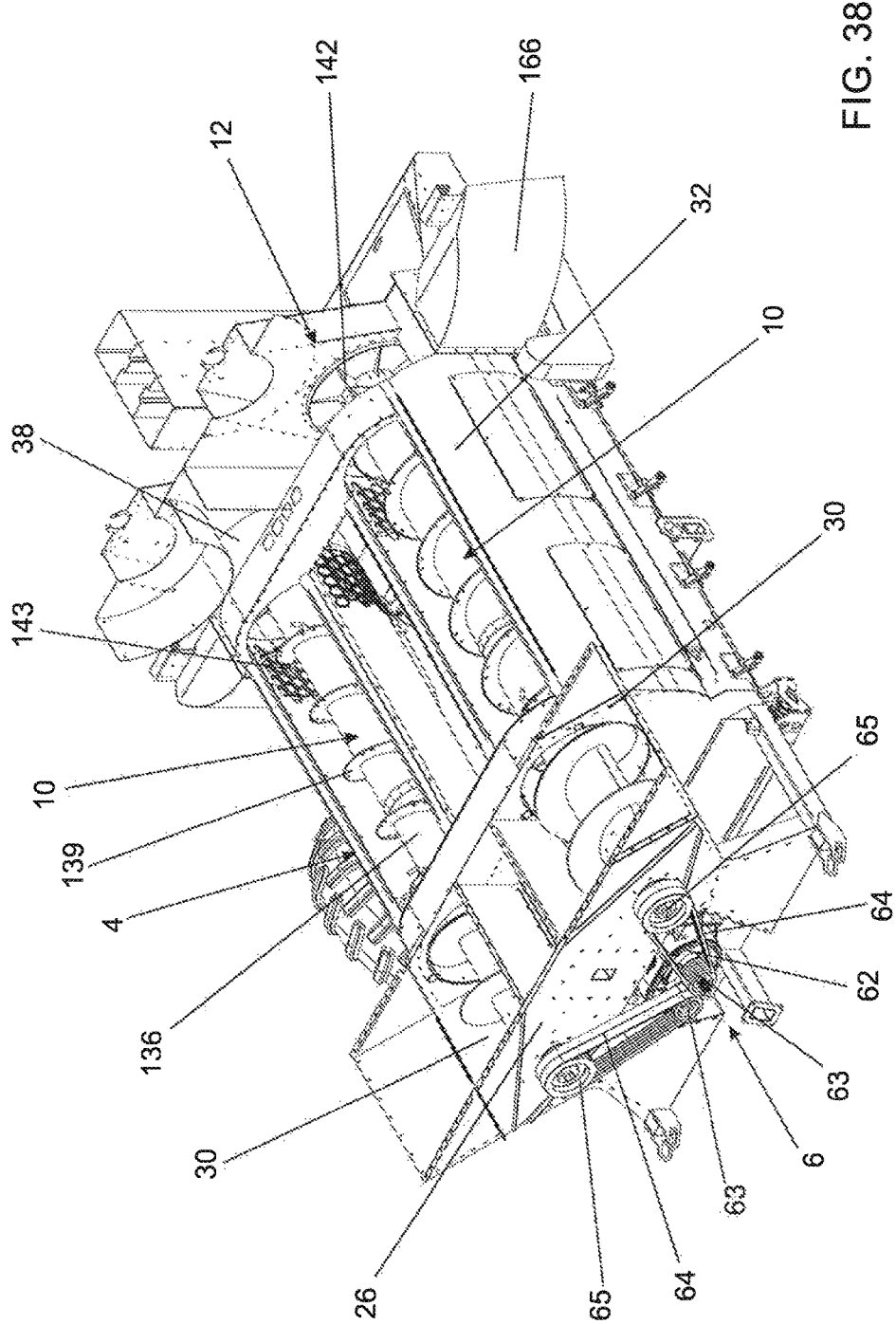
FIGS. 38 to 41 are various amplified parts in perspective showing in detail the threshing rolls.
Figure 39:
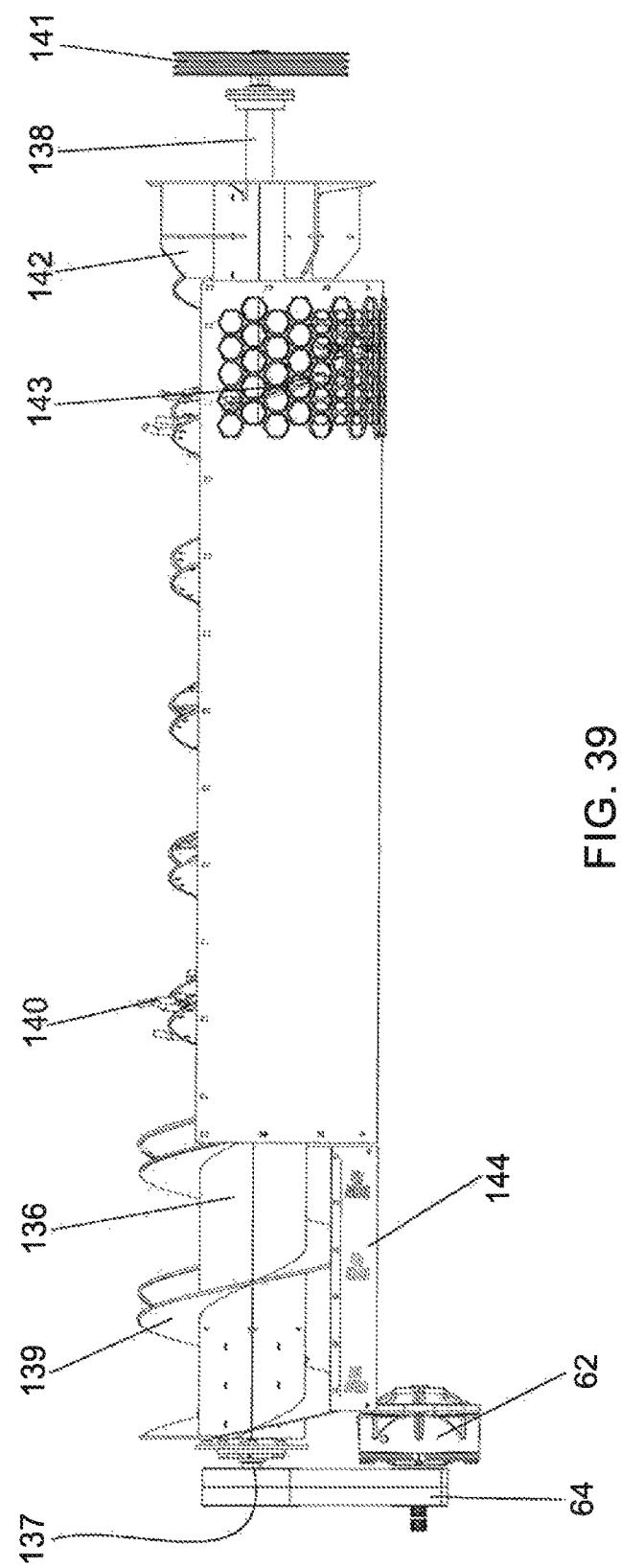
Figure 40:
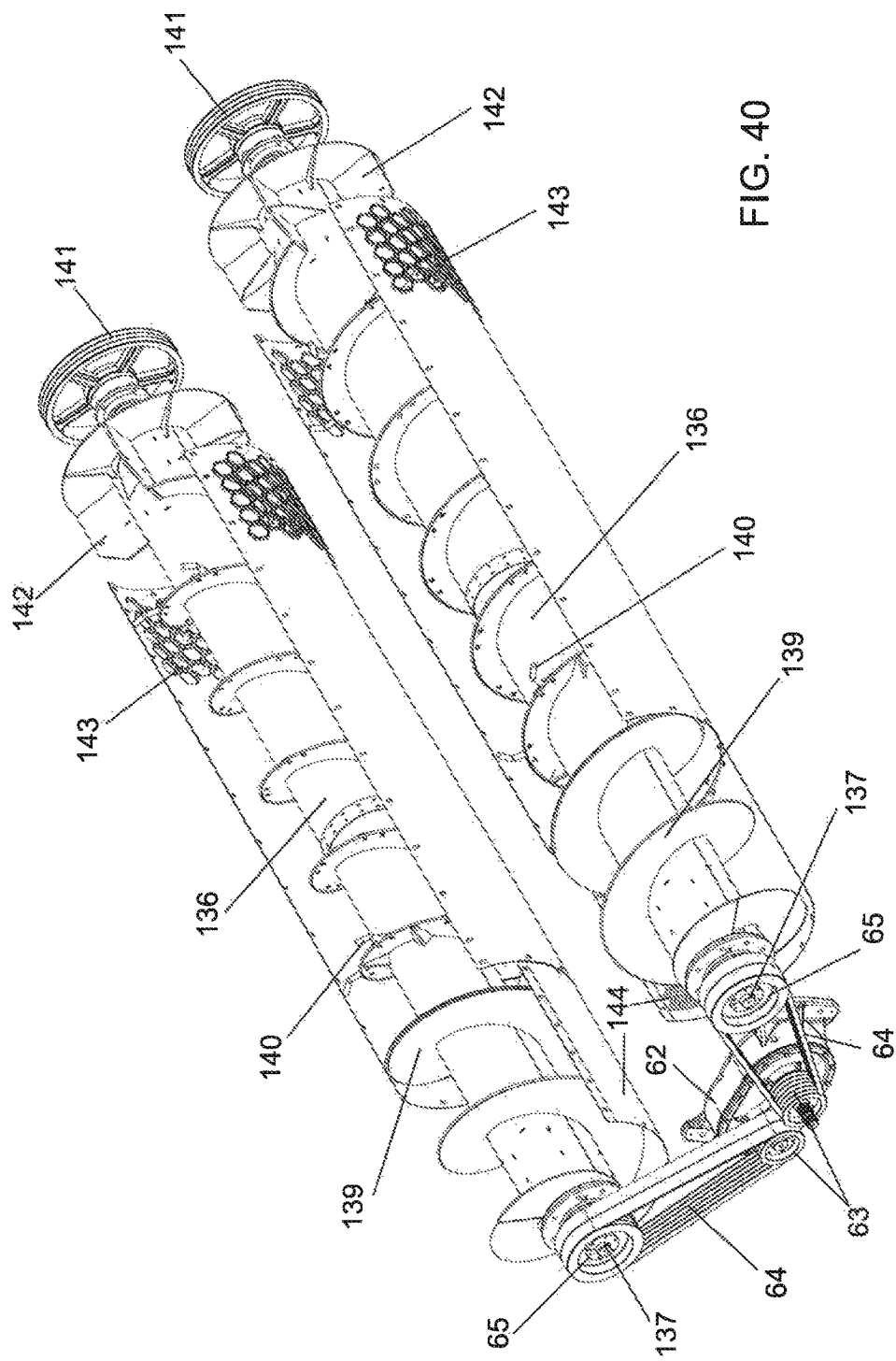
Figure 41:
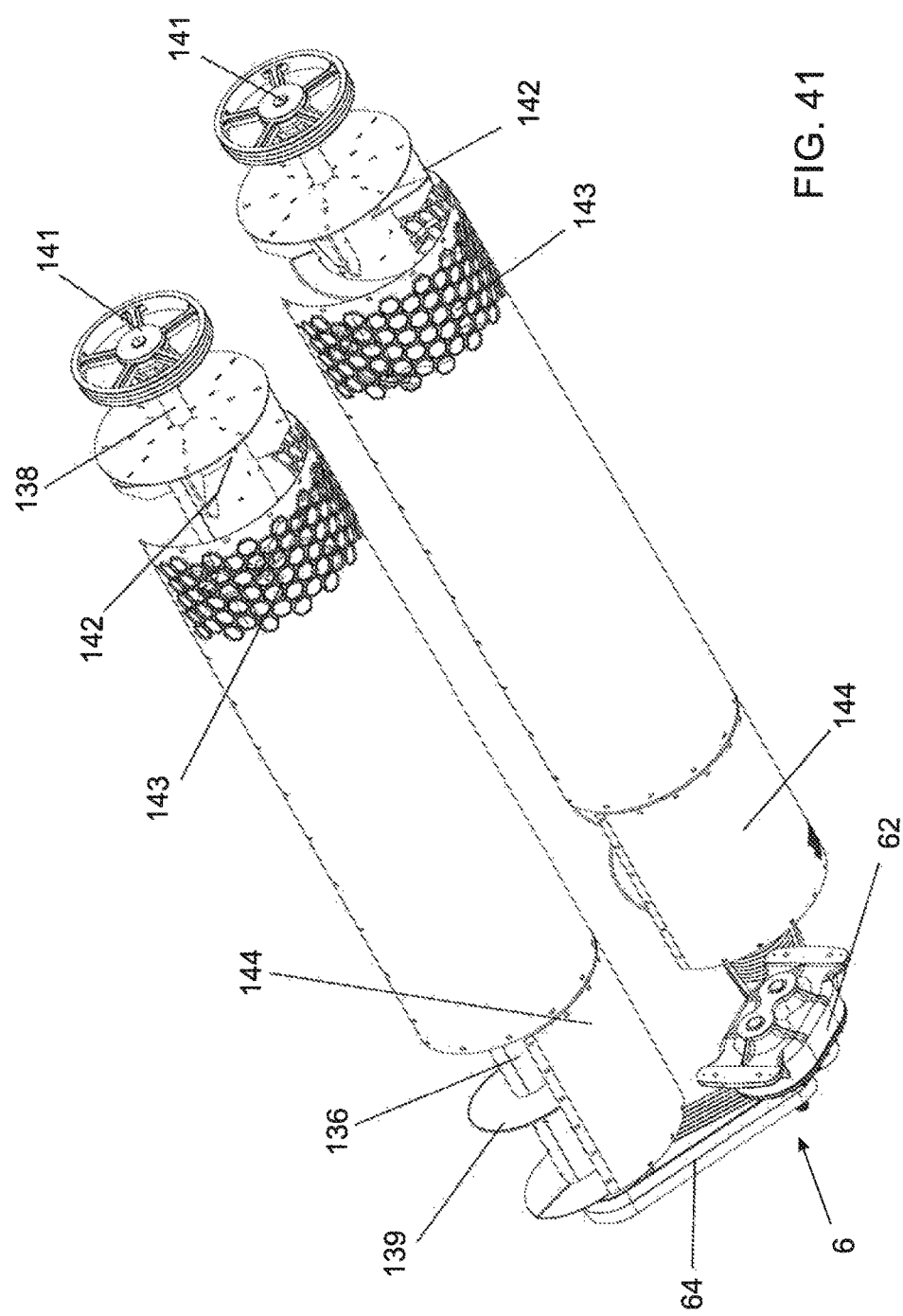
Figure 42:
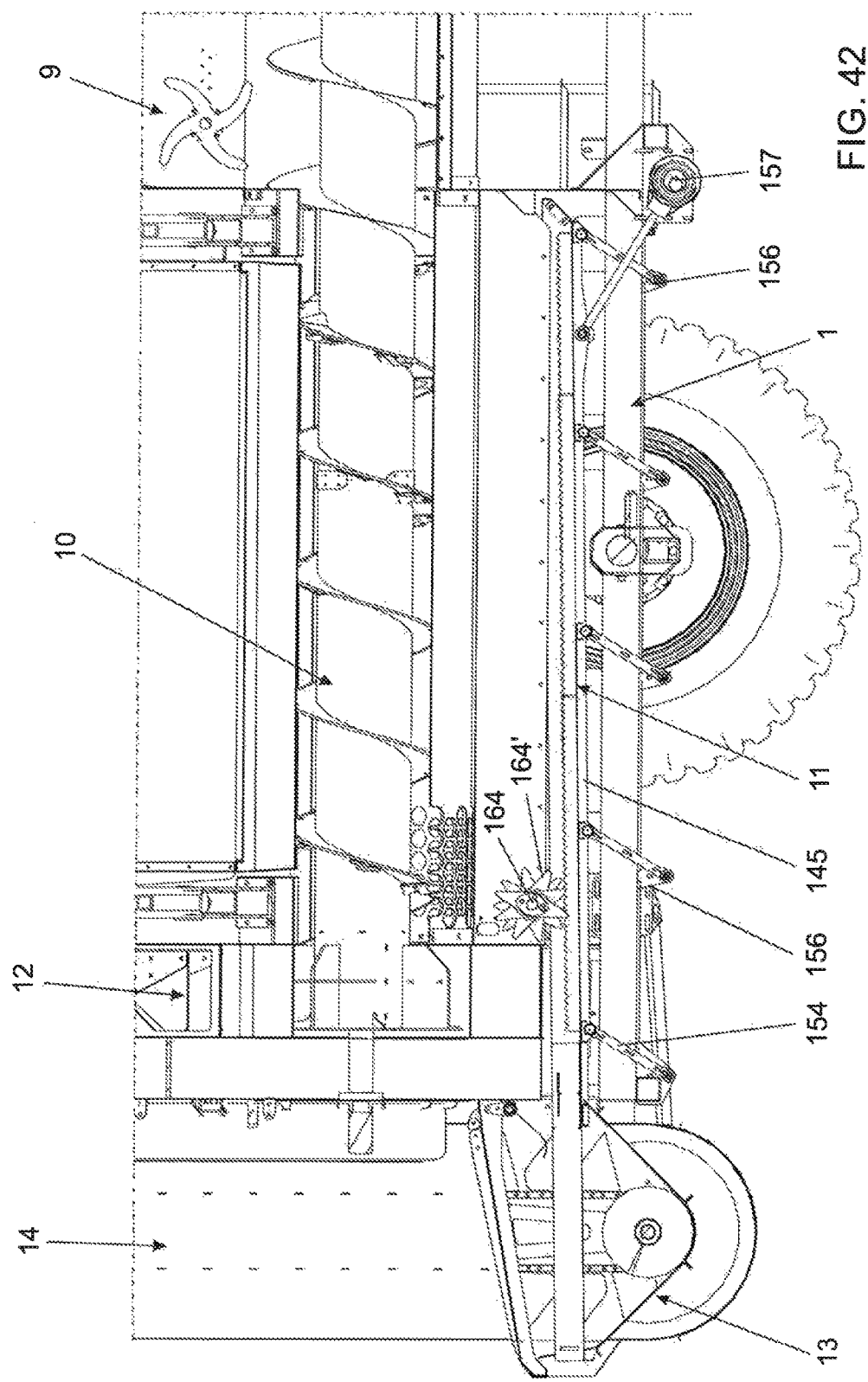
FIG. 42 exposes an amplified detail in sectional view focusing on the vibrating sieves assembly.
Figure 43:
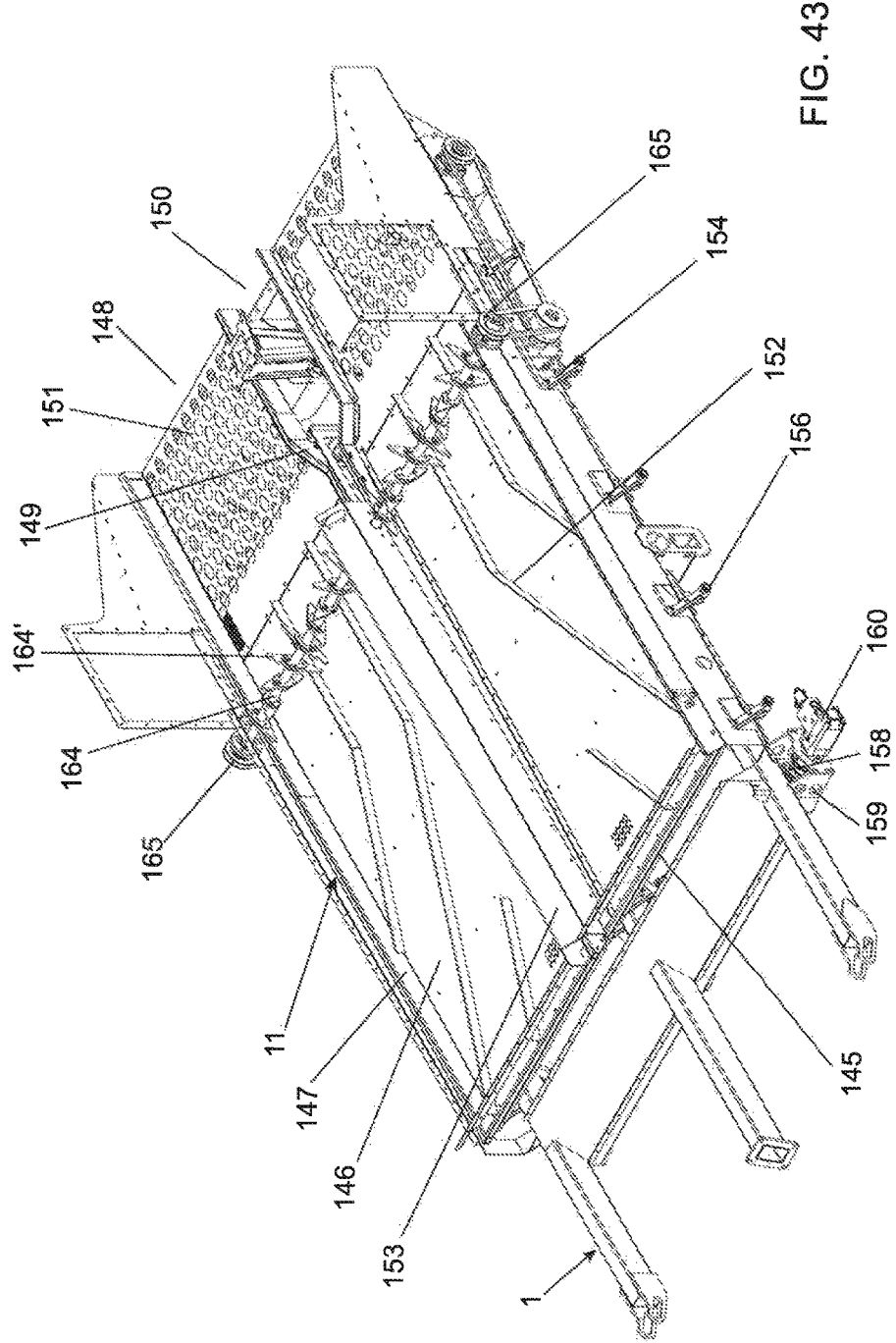
FIGS. 43 to 46 produce amplified perspective in different angles showing constructive details of the vibrating sieves.
Figure 44:
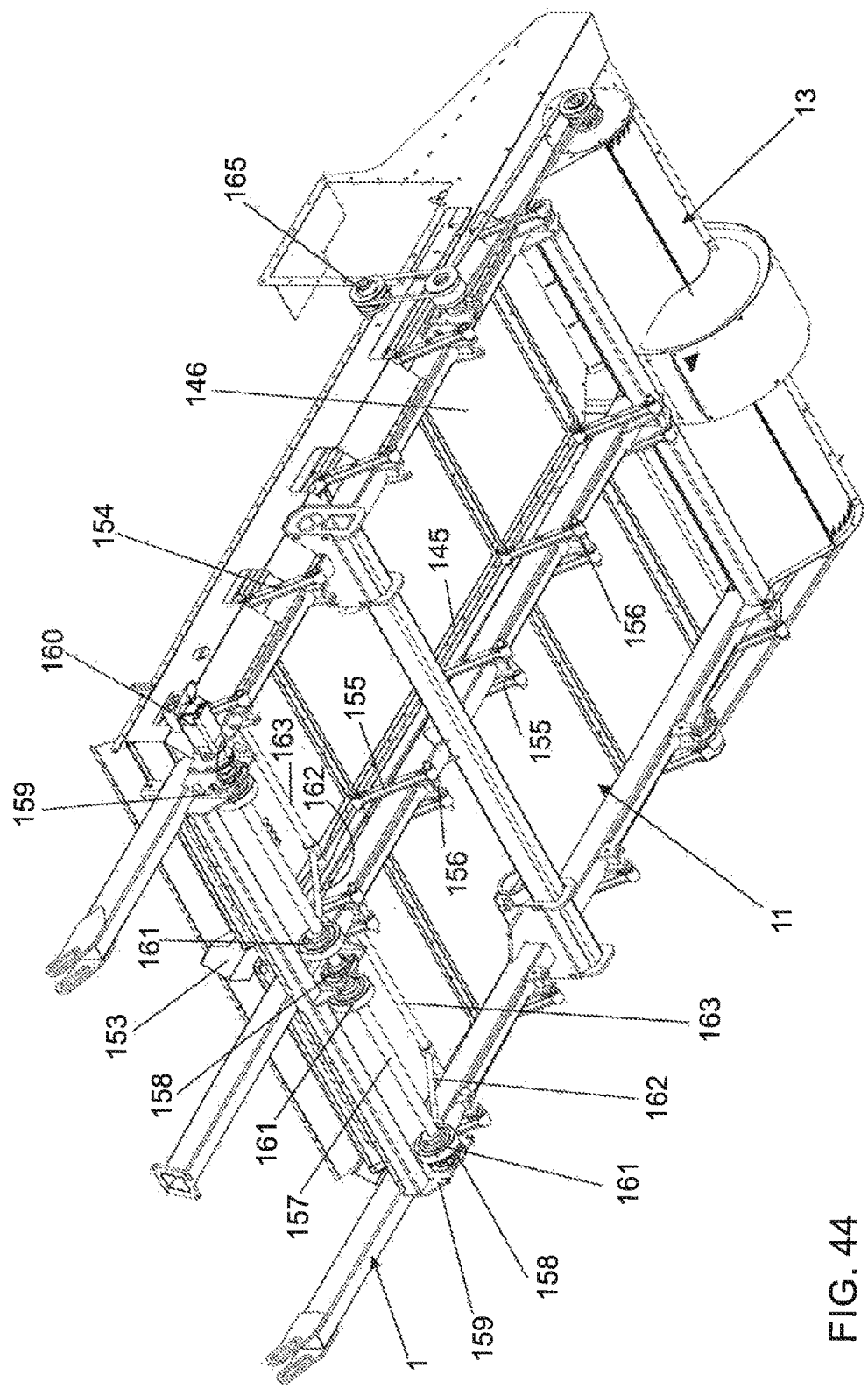
Figure 45:
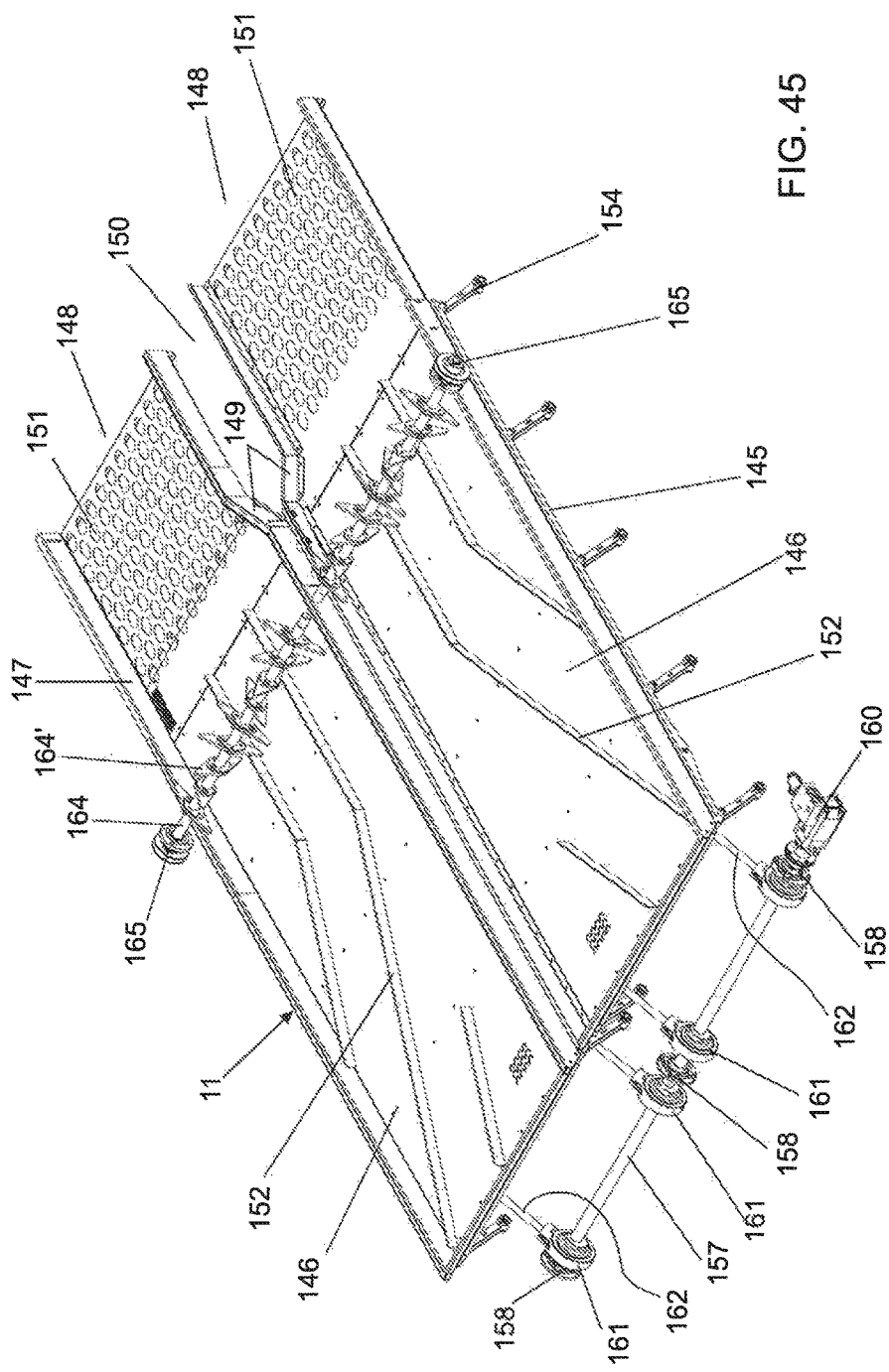
Figure 46:
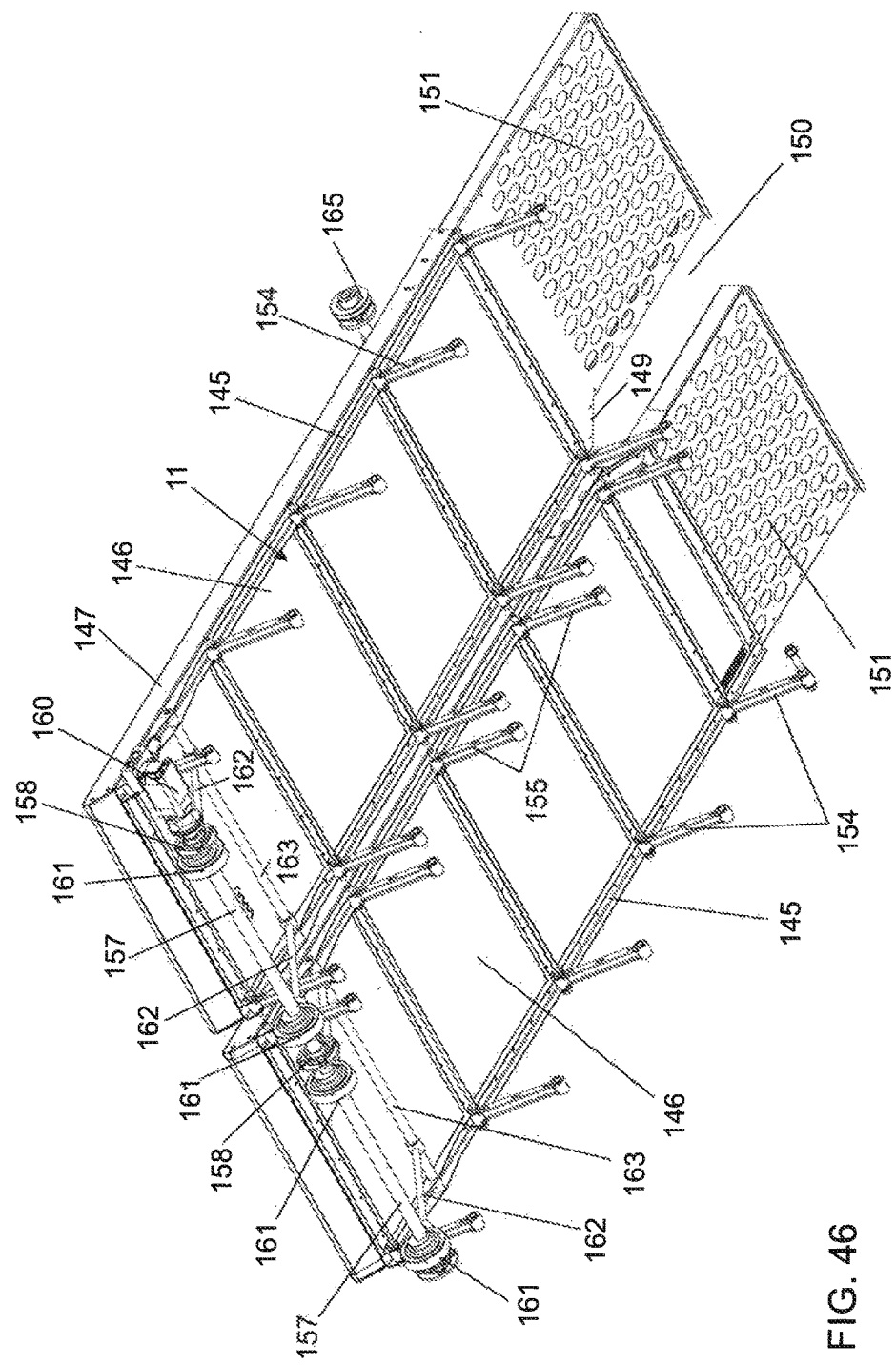

As illustrated by FIG. 32, for the simultaneous actuation of the two harvesting conveyor belts (8), its two traction assemblies (75) are interconnected by a universal joint (118) positioned in between said boxes (9).

The FIGS. 32 to 36 show with detail one of the receptive anti-jam boxes (9), where it can be seen that it is formed by two side walls (119) and a closing curved wall (120), that besides including a removable window for inspection and repair (121), also extends to close the upper side and the rear side, forming an open box on the front and on bottom side; this last one adjusted over the corresponding reception box (30) of the body (4) and above the beginning of the threshing cylinders (10), while in the frontal opening and along its lower corners is coupled by a bearing support the upper extremity of the corresponding harvesting conveyor belt (8) through its traction assembly (75), after which in its same plane there are two axles, a frontal (121) and a rear (122) one; the first positioned very close to the traction assembly (75) and the other very close to the bottom rear corners of the side plates (119), this last one featuring a part of its length with a threaded transporter (123), while the rest of its length has various spaced claws in the form of four-tip-stars (124), which are repeated (125), however, with smaller dimensions, along all the length of the frontal axle (121), being that, a last axle (126) also with claws in the shape of four-tip-stars (127) is planned in the top side and in the same plane of the closing plate (120), where each claw's upper portion is enveloped by a semicircular protection (128), while its bottom part of said claws are exposed inside of box (9).

The axles (121), (122) and (126) have their extremities equally coupled by bearing supports to the side walls (119), passing through one of them, the left side one, where they receive gears (129), (130) and (131), all of which are synchronized by the same chain (132) and respective handling gear (133) and stretching gears (134). Said chain (132) is coupled also to the gear (98) of the traction assembly (75), in a way that the hydraulic motor (101) may actuate the two sets of anti-jam receptive boxes (9), which finally, contain a protection (135) for all the side transmission system. The receptive boxes and respective internal axles contribute to sort the material in a way that it can flow uniformly downwards and over the threshing rolls (10).

FIGS. 37 to 41 show in detail the set of threshing cylinders (10), where it can be seen that each of them is composed by a central tube (136) and axle tips (137) and (138), in which the first contains an helical thread (139) and a plurality of radial claws (140), while the axle tips (137) and (138) are coupled by bearing supports to the rear wall (26) of the body (4), where it receives that pulley (65) from the transmission system (6) and consequently, the frontal extremity of said threshing roll (10) is positioned on the inside of the reception box (30) to receive and transport the material to be processed from the anti-jam box (9), and through its opposite side or rear extremity, the other axle tip (138) of the threshing roll has its tip coupled by bearing to the corresponding wall of the double box (38), after which it receives a pulley (141) and, also, on this extremity said threshing roll ends with a stretch containing flaps (142) that are positioned on the inside of the box (38) of the double ventilation assembly (12).

The threshing roll is enveloped in all its length by a semi-circular sieve (143) and this entire assembly is set up on the inside of the corresponding cylindrical box (32) of the body (4), where said sieve (143) has its upper side open and portion (144) with a substantially larger opening and positioned inside the box (30). This way, said sieves (143) and (144) extend along the entire length above the vibrating sieve assembly (11), allowing the peanut fruits to pass through to this last mentioned assembly, while other disposable materials continue to be eliminated by the double ventilation assembly (12).

FIGS. 42 to 46 illustrate in detail the vibrating sieves double assembly (11), where it can be seen that each one of them are comprised by a rectangular structure (145), over which is positioned an actual sieve (146) surrounded by an equally rectangular frame (147), that by its upper side is open (148), and at this point, the adjacent sides of side frame are tapered (149) forming a gap (150) for positioning the bucket elevator (14) and, at this same point, is also formed a last stretch of a sieve with a larger mesh (151) for the passage of the clean grain fruits, being positioned before said stretch, various toothed strips (152), that extend longitudinally over the first sieve stretch (146), where some are positioned diagonally, as also that later stretch of a larger mesh sieve (151) is positioned over the collecting chute (13), consequently, the final part of the vibrating sieves assembly pass through the boxes (38) of the ventilation and cleaning assembly.

Both structures (145) are positioned in the same plane and receive an upper trimming that is a plate gable shaped profile (153) that is elevated sufficiently to be positioned between the semi-circular sieves (143) of the threshing rolls (10).

By their lower side, the two structures (145) articulately receive the upper end of various swinging arms, some simple ones, (154) and other double ones (155), all equally inclined, whose lower ends are equally articulated in supports (156) of the chassis (1), that in turn, along with its frontal extremity, contains a transversal axle (157) rotatably assembled in bearings (158) fixed in supports (159) integrated to the chassis (1), where said axle has an extremity equipped with an elastic coupling and a hydraulic engine (160) for rotation of said axle (157), that also has eccentric pieces (161) with their respective radial arms (162) with upper extremities articulately coupled to crossbars (163), one on each structure (145), consequently, the rotating movement of the eccentric pieces (161) is transformed in alternate rectilinear movement for the arms (162), and from these to the structures of the sieves, this way causing the process of sieving to occur, and at the same time, all the material is moved backwards, and with this, dirt and other smaller particles pass through the first sieve portion (146), while the rest continues backwards and on the second portion of sieve (151) the peanut fruits fall to the inside of the chute (13), while leaves, twigs and other disposable parts and dropped on the ground.

The double assembly of vibrating sieves (11) contains also a double anti-jam axle (164) with various lozenge helix pieces (164') that break any possible branches or bundle of twigs that could eventually cause a jam in the machine. The double anti-jam axle (163) has its ends exposed on the sides of the assembly where they receive actuation pulleys (165).

Figure 47:
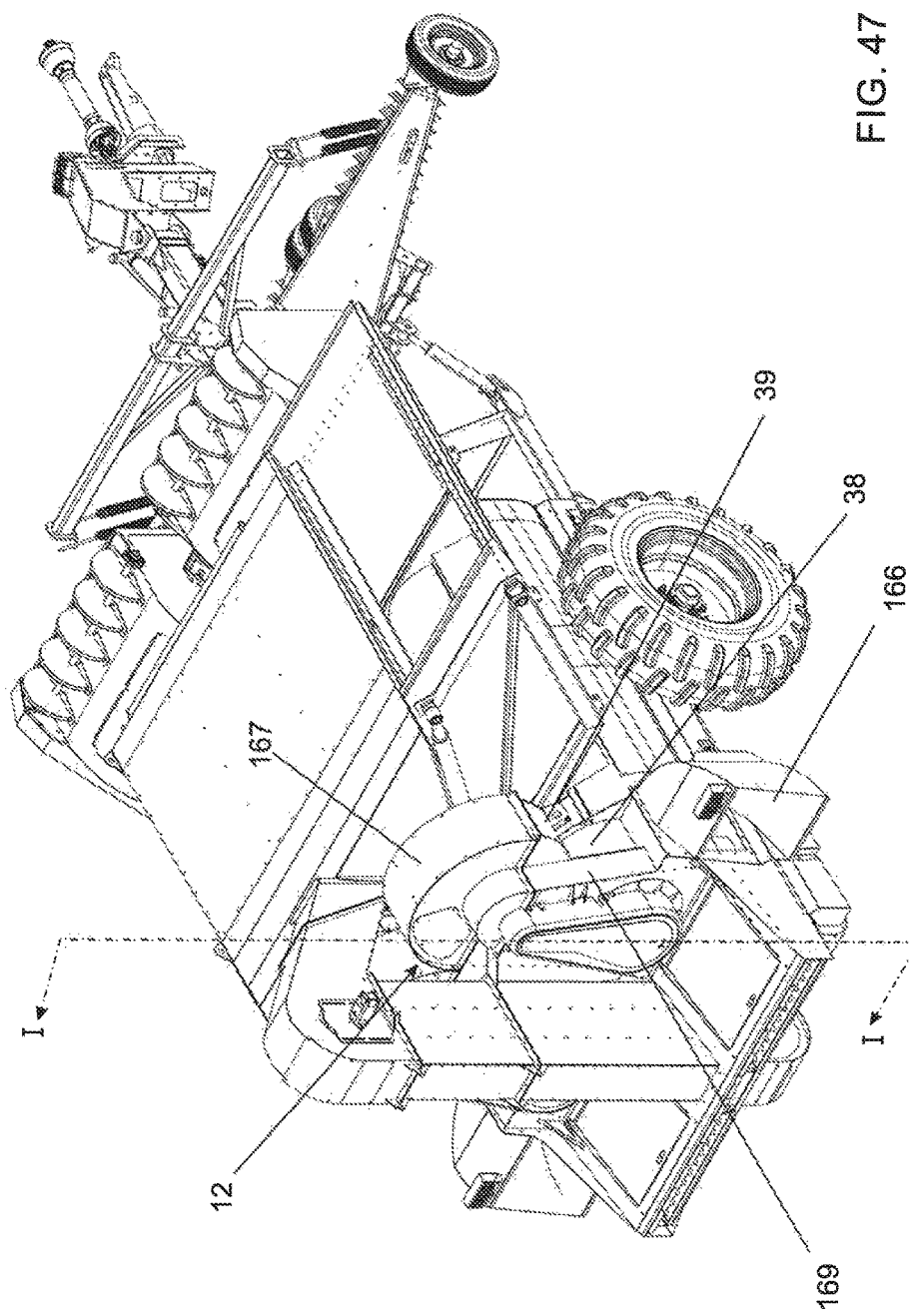
FIGS. 47 to 49 are, respectively, a perspective view of the rear part of the machine, an amplified detail in sectional view and an amplified detail in perspective, also in sectional view, showing the ventilation assembly.
Figure 48:
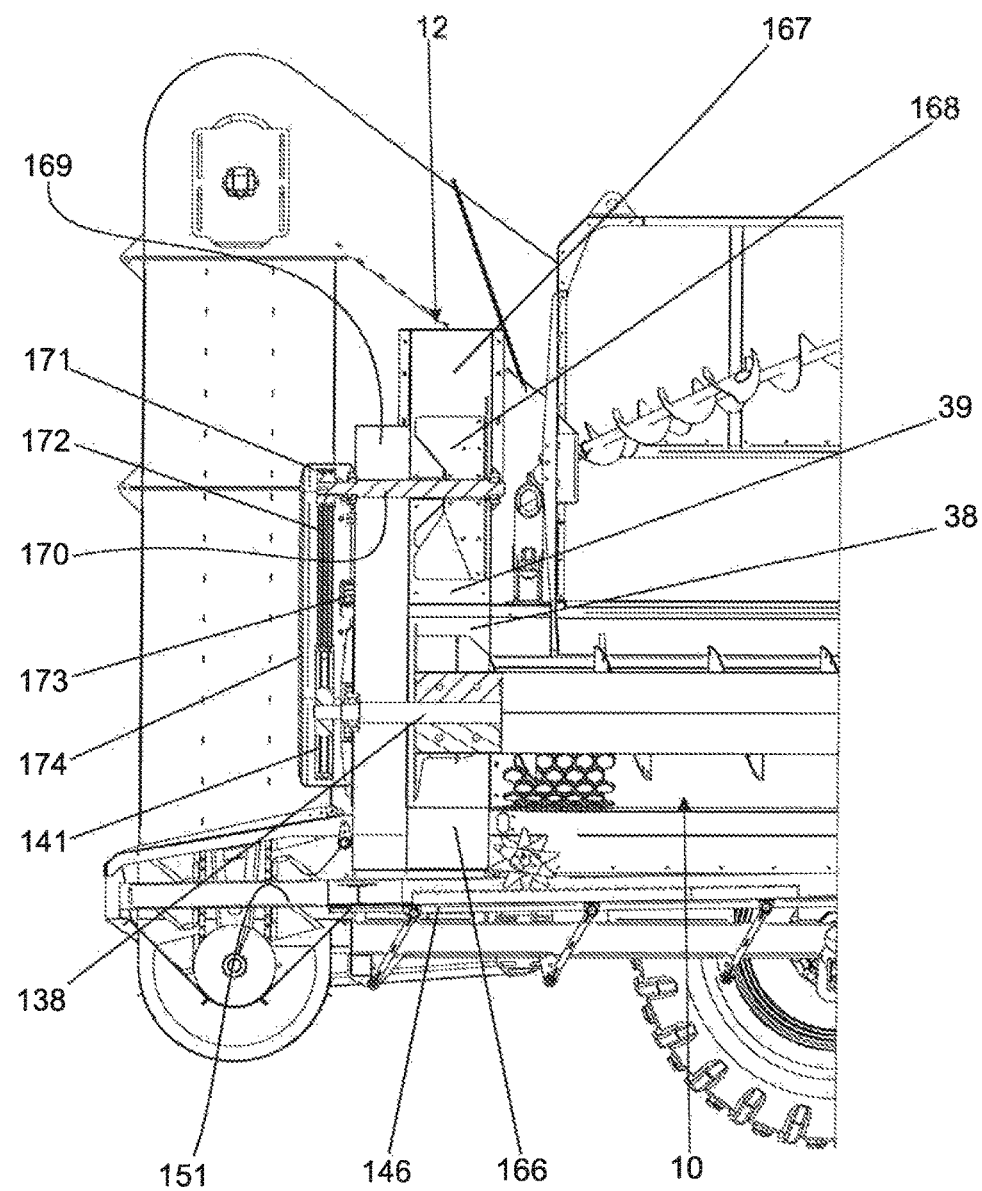
Figure 49:
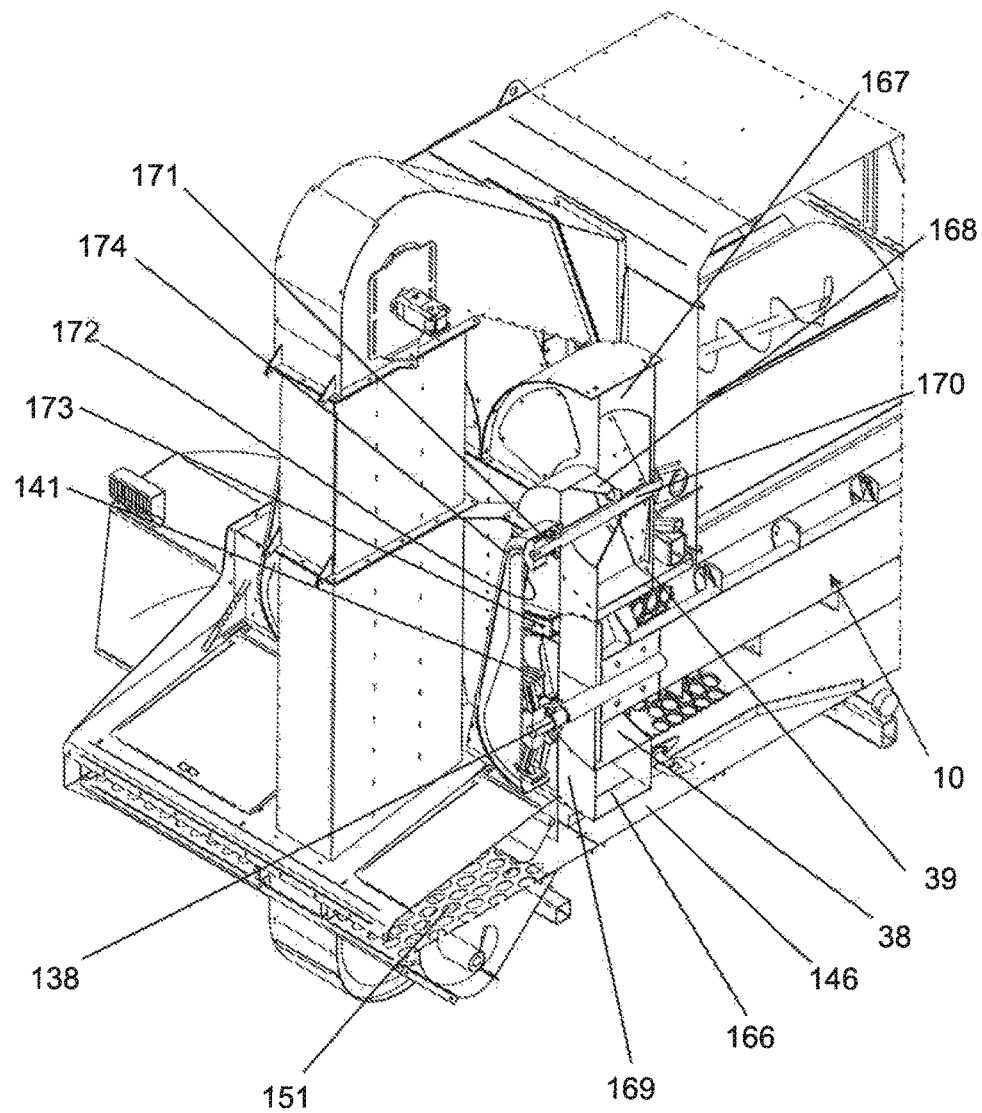
Figure 50:
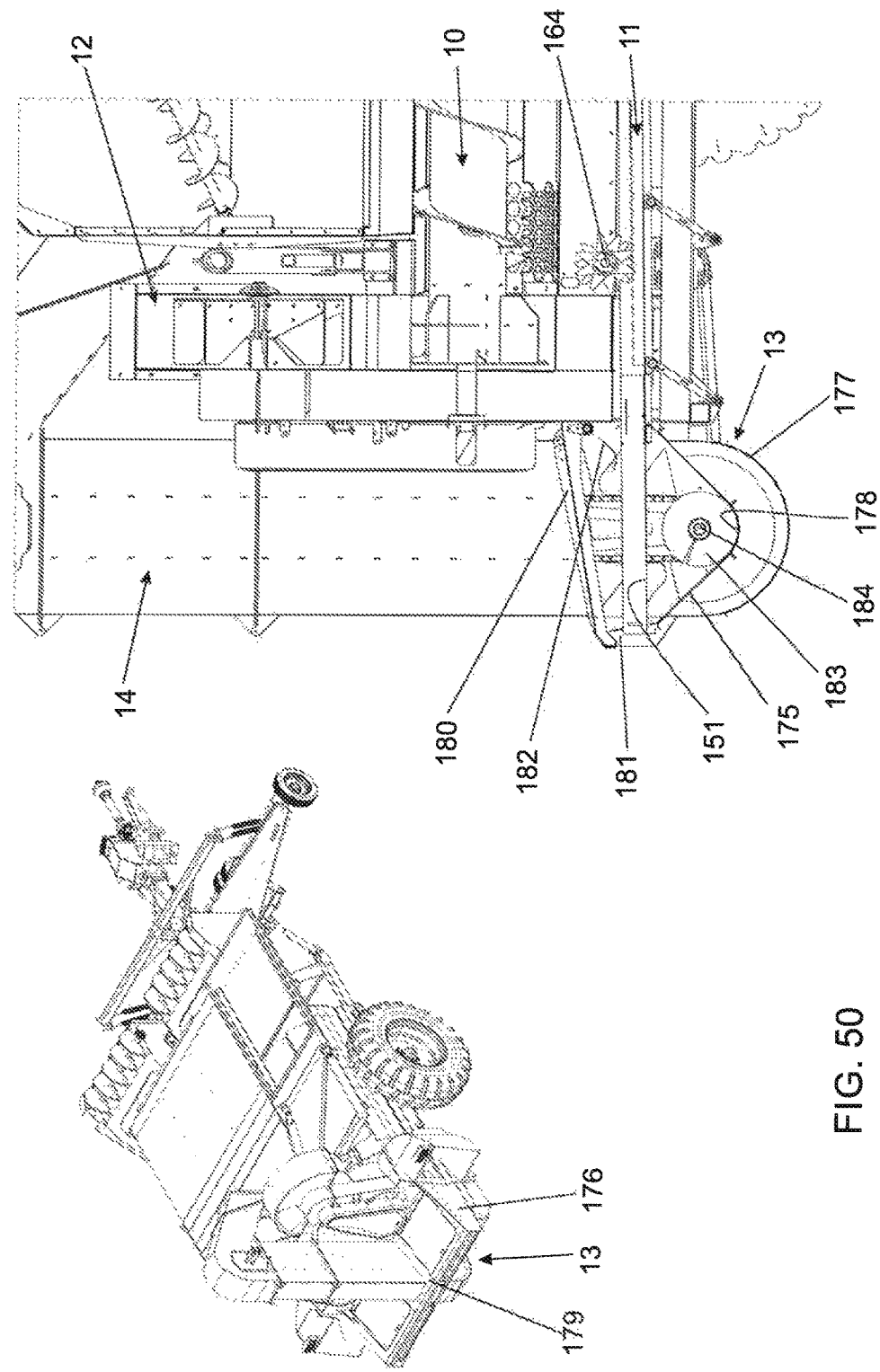
FIGS. 50 to 53 show, respectively, an isometric view of the machine in an upper rear angle, a detail in sectional view, a detail in perspective partially exploded and in a upper rear angle, and an amplified detail in transversal sectional view, showing the constructive particularities of the collecting chute for clean fruits.
Figure 51:
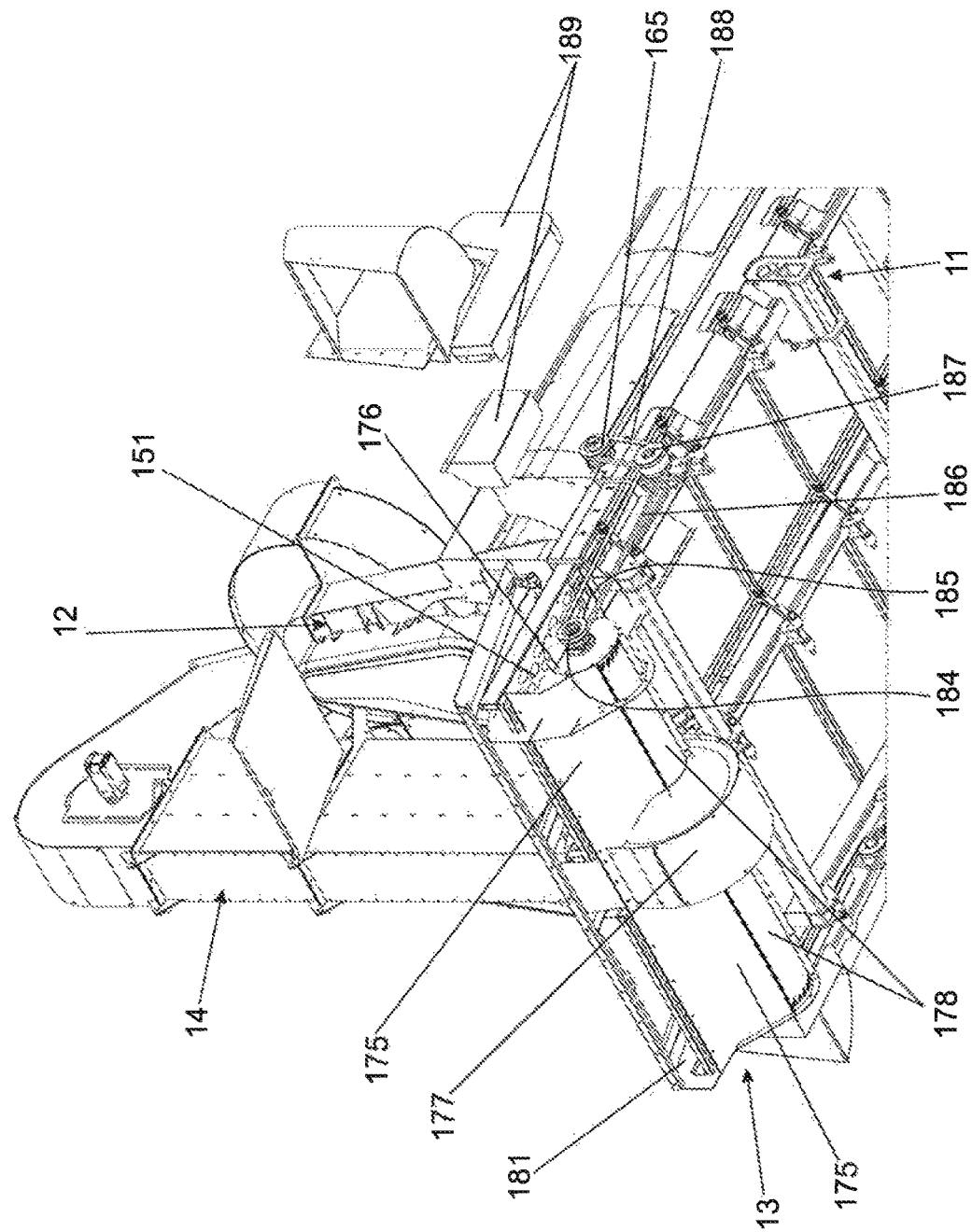
Figure 52:
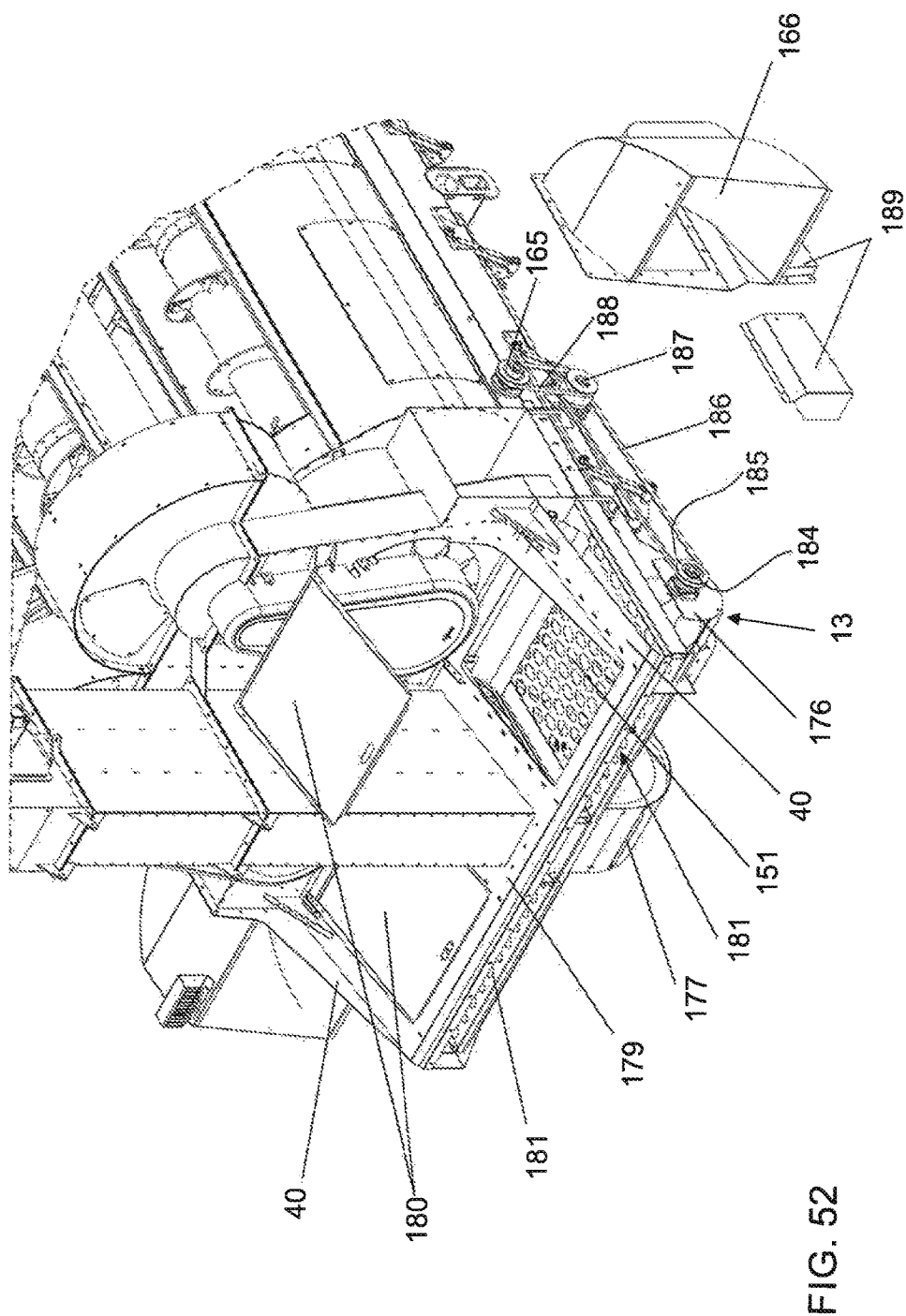
Figure 53:
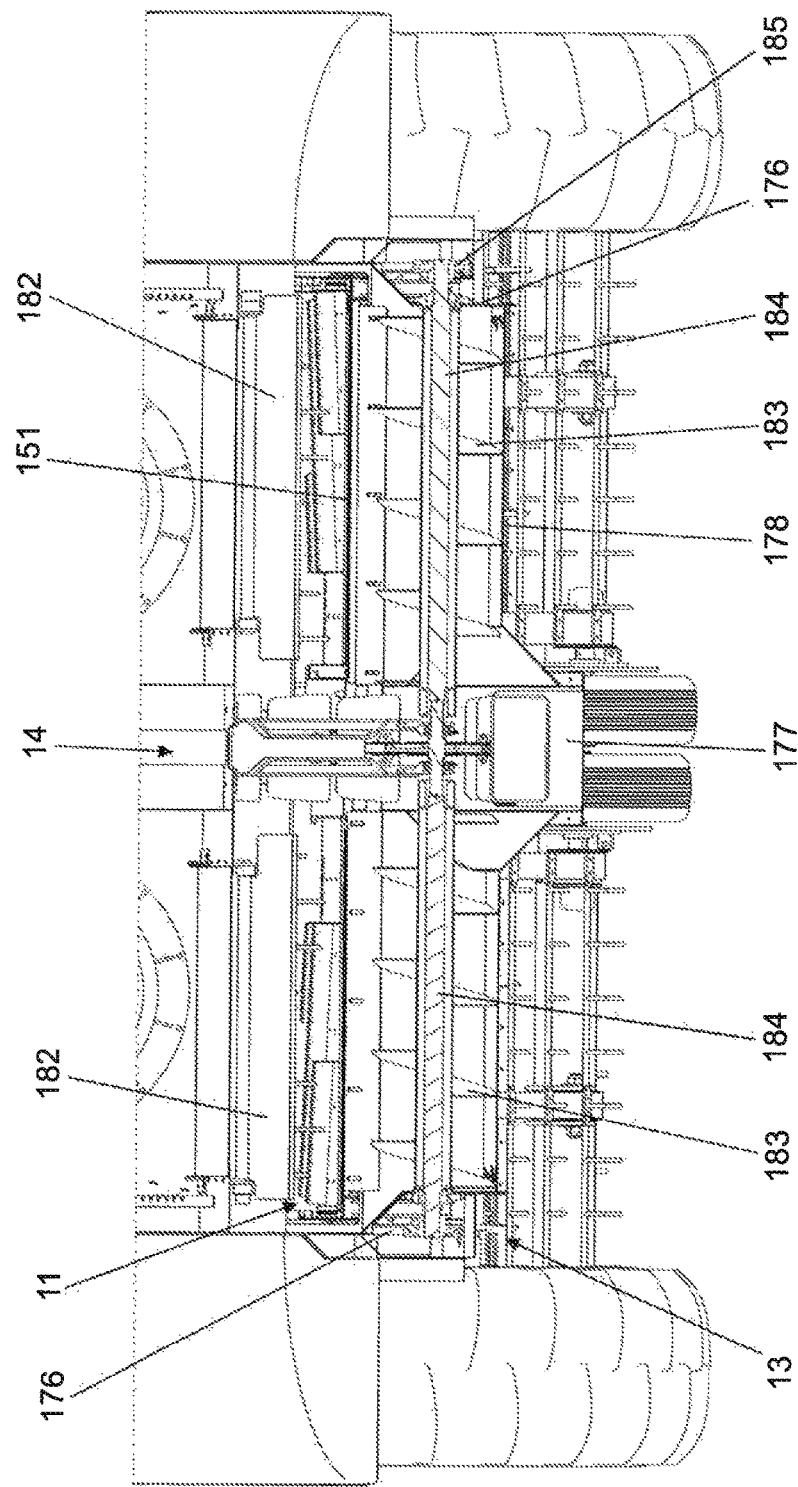

FIGS. 47 to 49 show in detail the double assembly of ventilation (12), where it can be seen that it is completed with the boxes (38) and boxes (39) of the body (4), in which the box (38), besides the air flow, has side extensions that compose a backwards facing exit (166) for disposables, and above theses boxes (38), the boxes (39) of the body (4) are completed to form circular boxes (167) that, besides having connection with those before them (38), house ventilation turbines (168), and also, these boxes (38) and (167) are preceded by a third pair of ascending air flow entrance boxes (169), each with its bottom extremity extending along the width, and with certain distance of the meeting point of the sieves (146) and (151) of the double assembly of vibrating sieves (11), while its upper extremities communicate with the ventilation turbine chambers (168), whose axles (170) pass through said ascending air flow entrance boxes (169) and receive pulleys (171), that by means of belts (172) and stretchers (173), are synchronized with the pulleys (141) of the threshing rolls (10), whose axle tips (138) equally pass through the ascending air flow entrance boxes (169), being these transmission assemblies kept in protections (174).

FIGS. 50 to 53 show in detail the receptive chute (13), where it can be seen that it is formed by two V-shaped chutes (175), closed by outer walls (176) and transversally aligned in the rear final part of the chassis (1), being in between the two chutes a semi-cylindrical box (177) for housing the bottom extremity of the bucket elevator (14), as also the bottom of said chutes (175) are formed by sieves (178) for the exit of dirt and other smaller particles, while in the upper part of both chutes are positioned the portions of larger mesh sieves (151) of the vibrating sieves assembly (11), and higher up there is a closing (179) with inspection lids (180), forming in between these the sieve portions (151) a space (181) for exiting of disposables; this exit extends under the ventilation assembly (12) until the anti-jam axle (163), where it is planned a regulating metallic curtain (182) between the ventilation assembly (12) and the sieve portion (151), curtain that serves for regulating flow rate and to ease the movement of the processed material, that from this point on is separated allowing for branches, leaves and other disposable material to pass through directly through the exit (181) to fall to the ground, while the peanut fruits pass through sieve (151) and fall inside of the chutes (175), where there are two inversed threaded transporters (183), whose axles possess extremities coupled by bearings to the outer walls (176), after which they receive pulleys (185), belts (186), handling pulleys (187), and other belts (188) to be coupled to the pulleys (165) of the anti-jam axle (163) forming a transmission set that is encased by plate protections (189), and receives traction of the bucket elevator assembly, and for this, the other extremities of said axles (184) are coupled to each other and are integrated with the said bucket elevator assembly (14).

Figure 54:
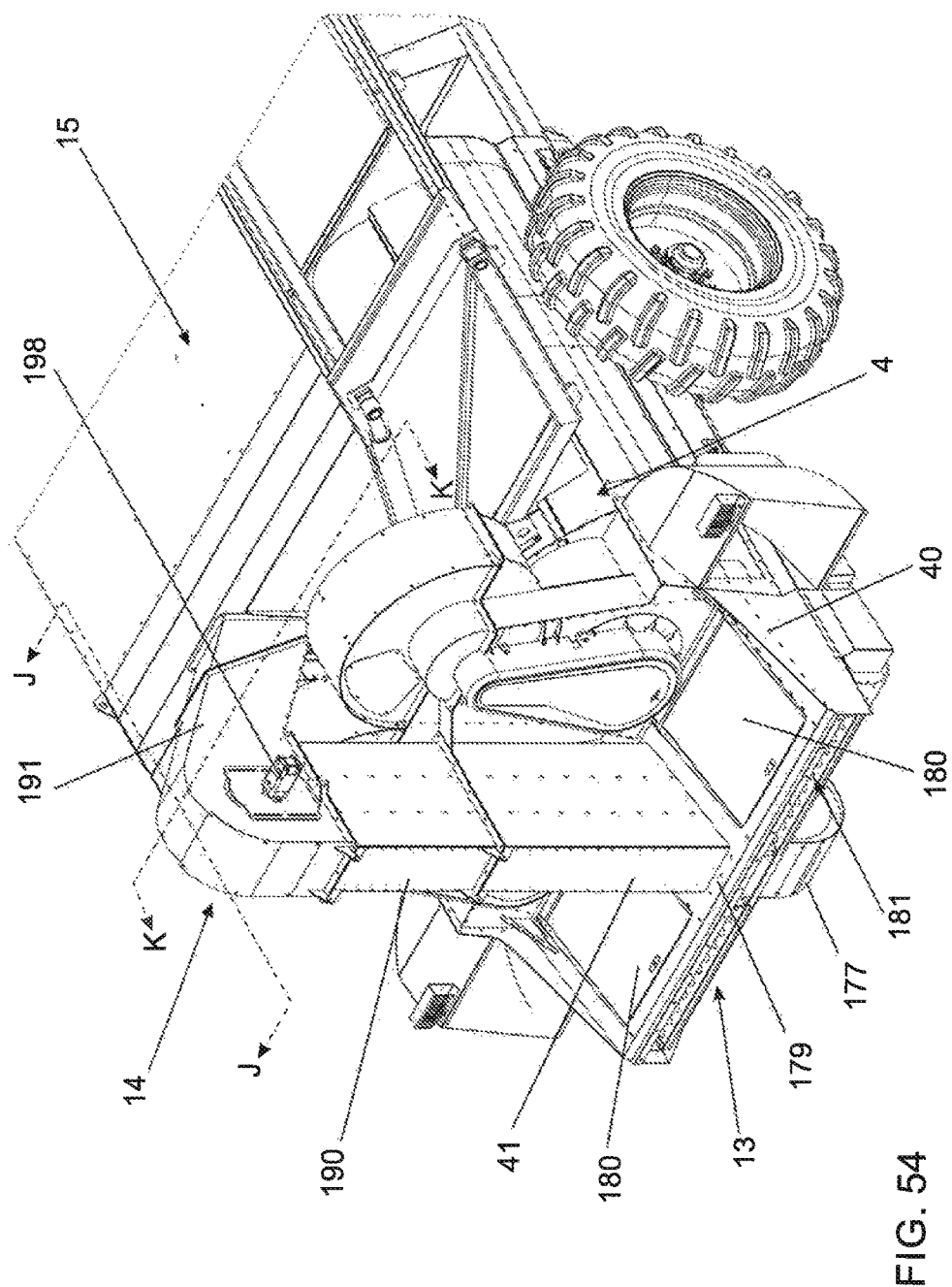
FIGS. 54 to 56 show, respectively, a perspective view of the machine showing in detail the vertical bucket elevator, a cross-sectional view along line J-J of FIG. 54, and a cross-sectional view along line K-K of FIG. 54.
Figure 55:
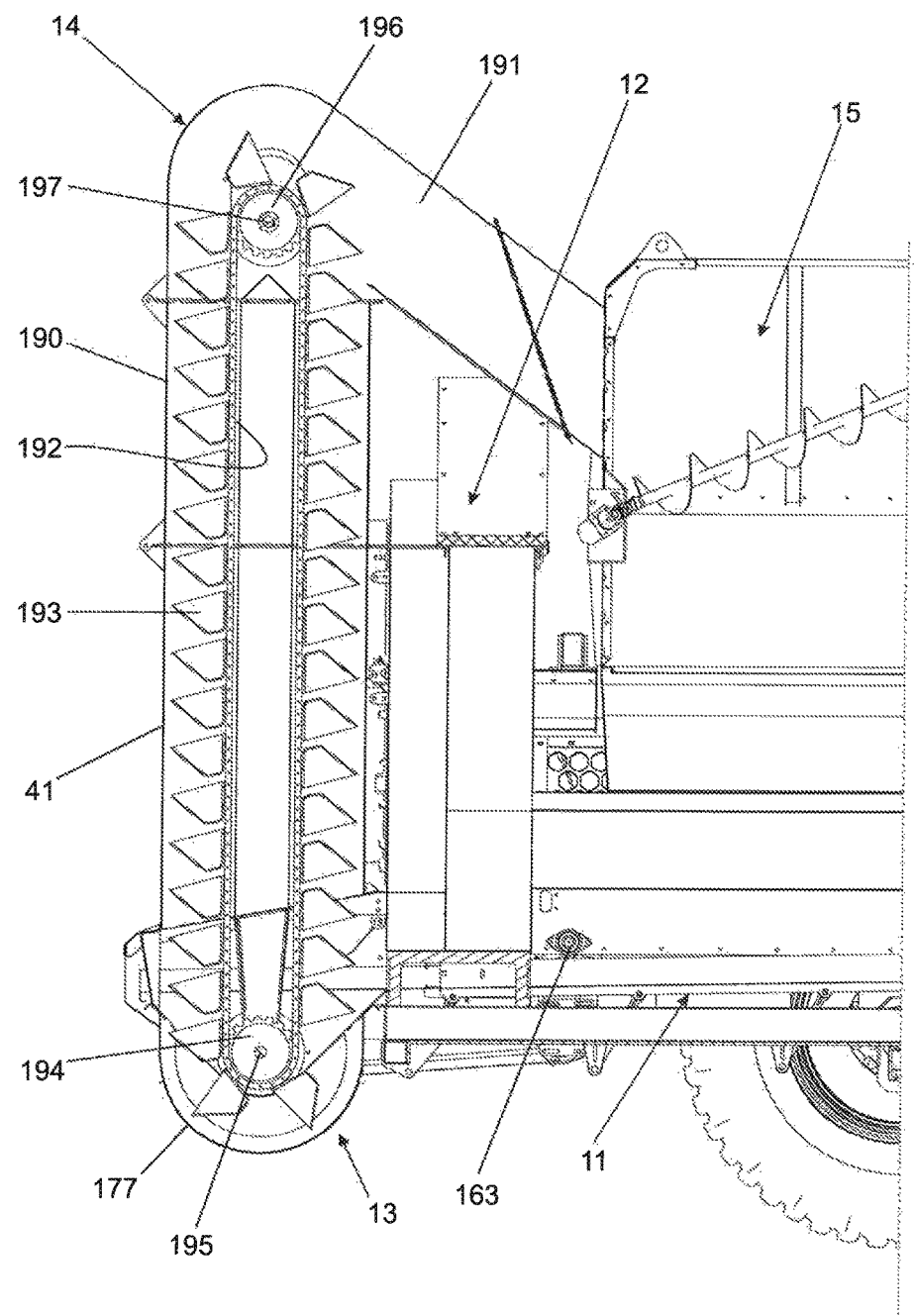
Figure 56:
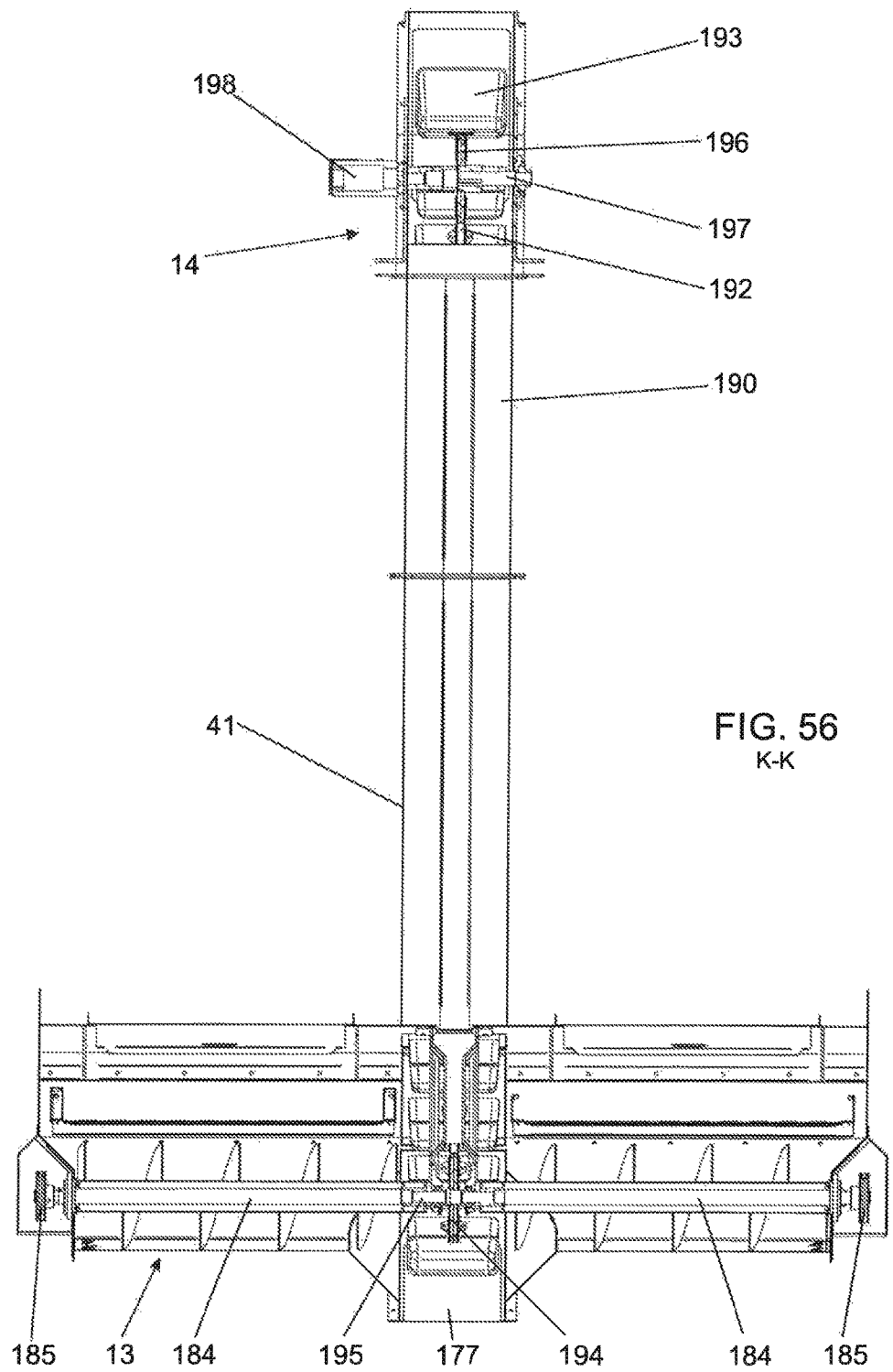

FIGS. 54 to 56 show in detail the vertical bucket elevator (14), where it can be seen that it comprises a vertical duct (190), whose bottom extremity is integrated and composes a continuity of box (41) of the body (4) and of semi-circular box (177) of the receptive chute (13), while its upper extremity is curved forward and ends in the form of an sloping unloading mouth (191) that unloads inside the tipper bucket (15), being that, also, inside the vertical duct (190) is set up a chain (192) with a plurality of buckets (193); said chain has two supporting elements: the bottom one is a gear (194) joint to an intermediate axle (195) that composes interconnection between the two axles (184) of the receptive chute (13), while the top support is planned as another gear (196) assembled in an axle (197) coupled by bearing to the top of the vertical duct (190), where said axle is connected to a hydraulic engine (198), which is responsible for the actuation of the bucket elevator (14), of the receptive chute (13) and anti-jam axle (163), and consequently, all the cleaned material, that is, the clean fruit that falls inside of the receptive chute (13), is moved in the direction of the semi-cylindrical box (177) where it is concentrated and collected by the buckets (193) and transported to the top of the vertical duct (190), where the fruits are unloaded, and by gravity, slide in the unloading mouth (191) and fall inside of the tipper bucket (15).

Figure 57:
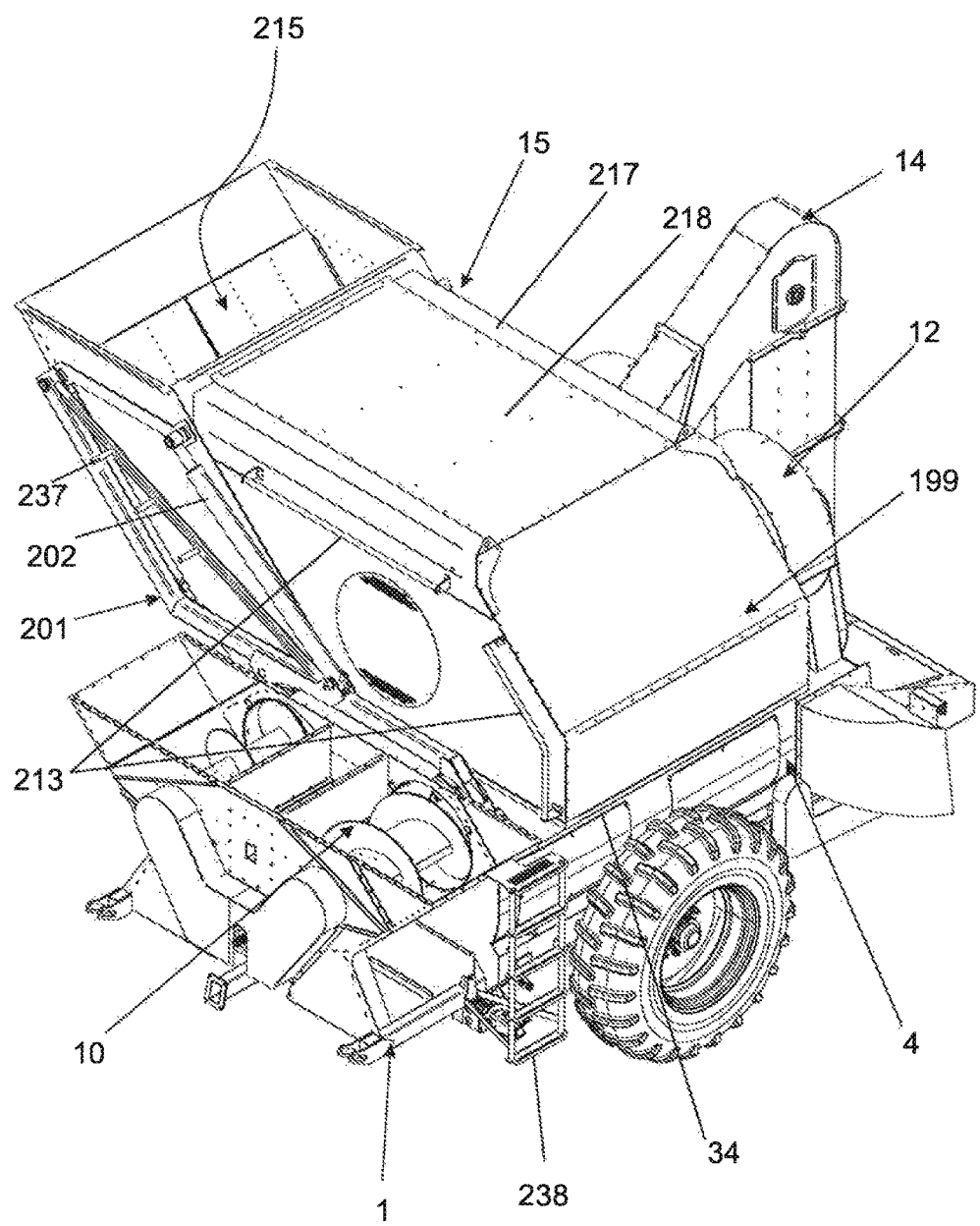
FIGS. 57 and 58 show perspectives of amplified details in different angles focusing on the tipper bucket assembly.
Figure 58:
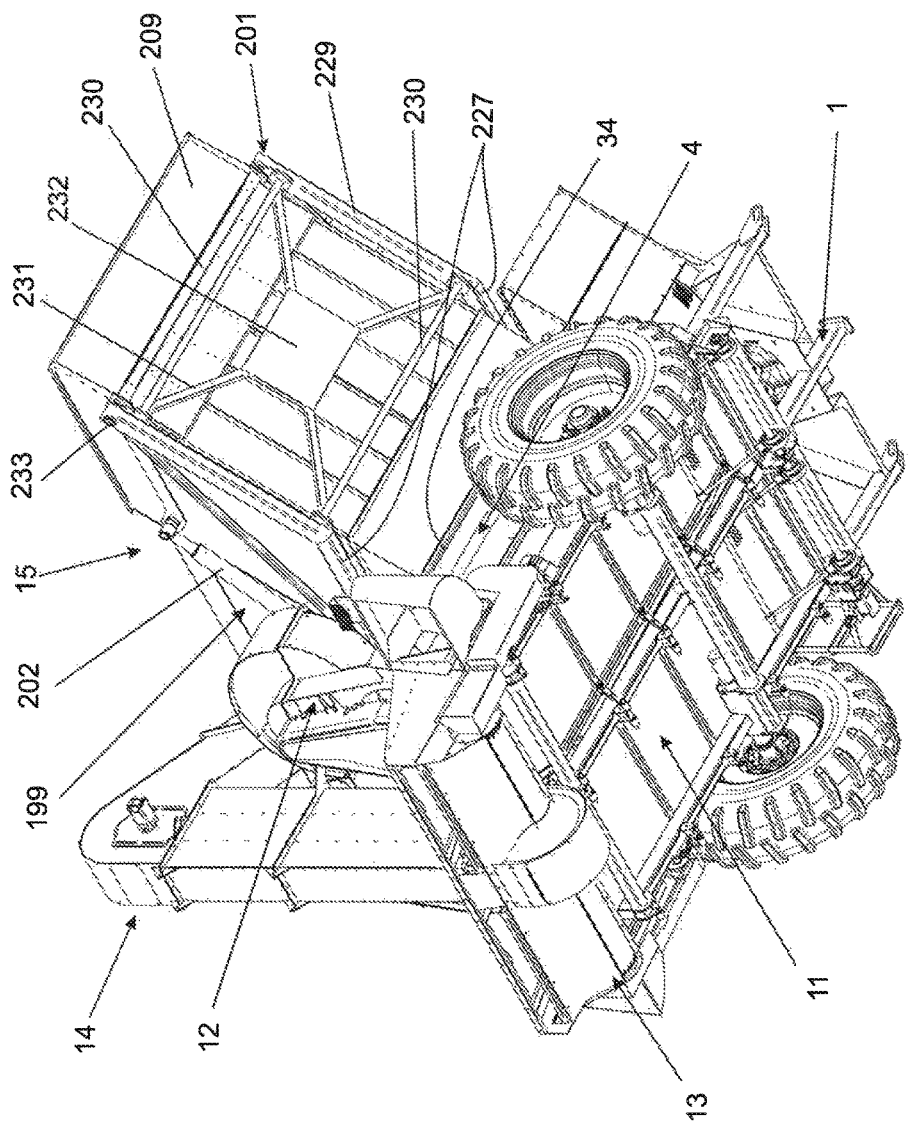
Figure 59:
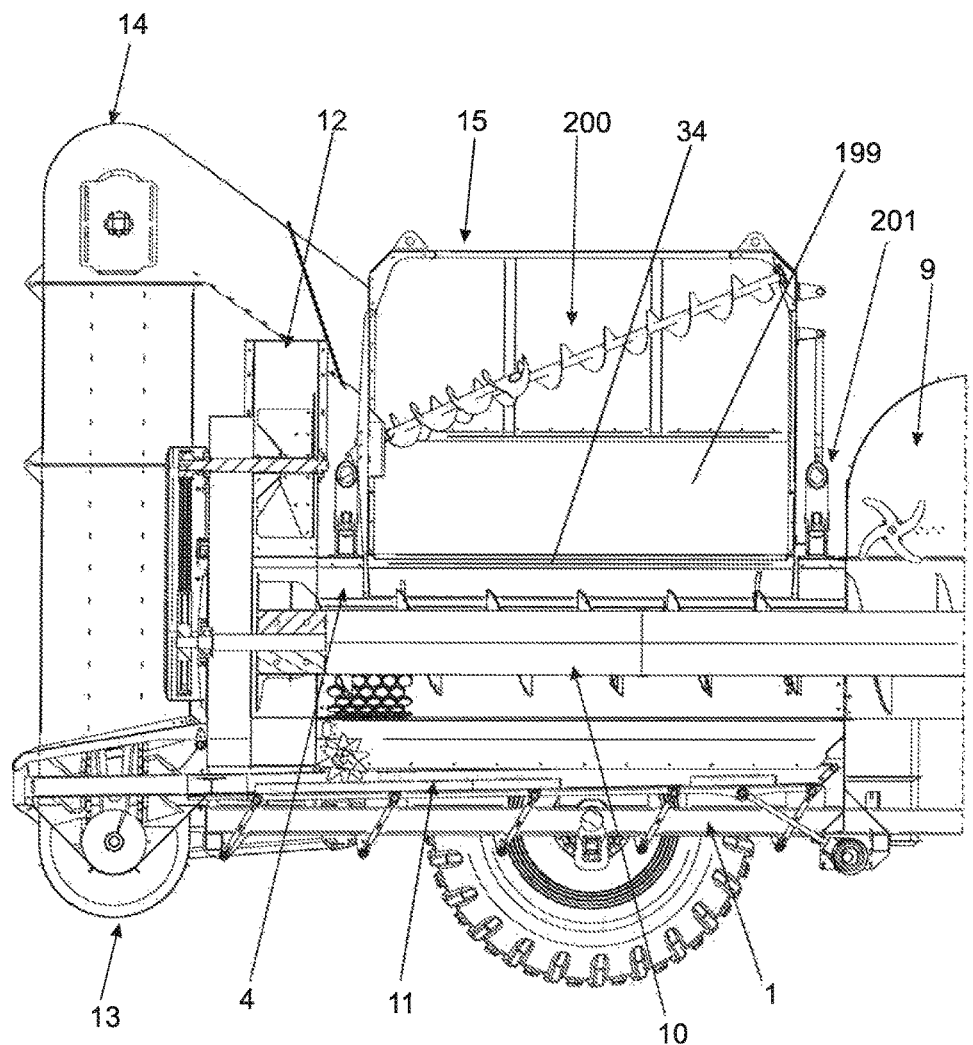
FIG. 59 illustrates an amplified detail in sectional view of the tipper bucket.

FIGS. 57 to 59 show details of the tipper bucket (15), where it can be seen that it comprises an actual bucket, which is a parallelepiped plate compartment (199) whose bottom side has details for its transversal sitting on plane (34) of the body (4), it also has internally a cargo levelling assembly (200), and also, said compartment (199) is positioned over a fixed structure (201) with which it has its right extremity connected to tilt by means of side hydraulic actuations (202).

Figure 60:
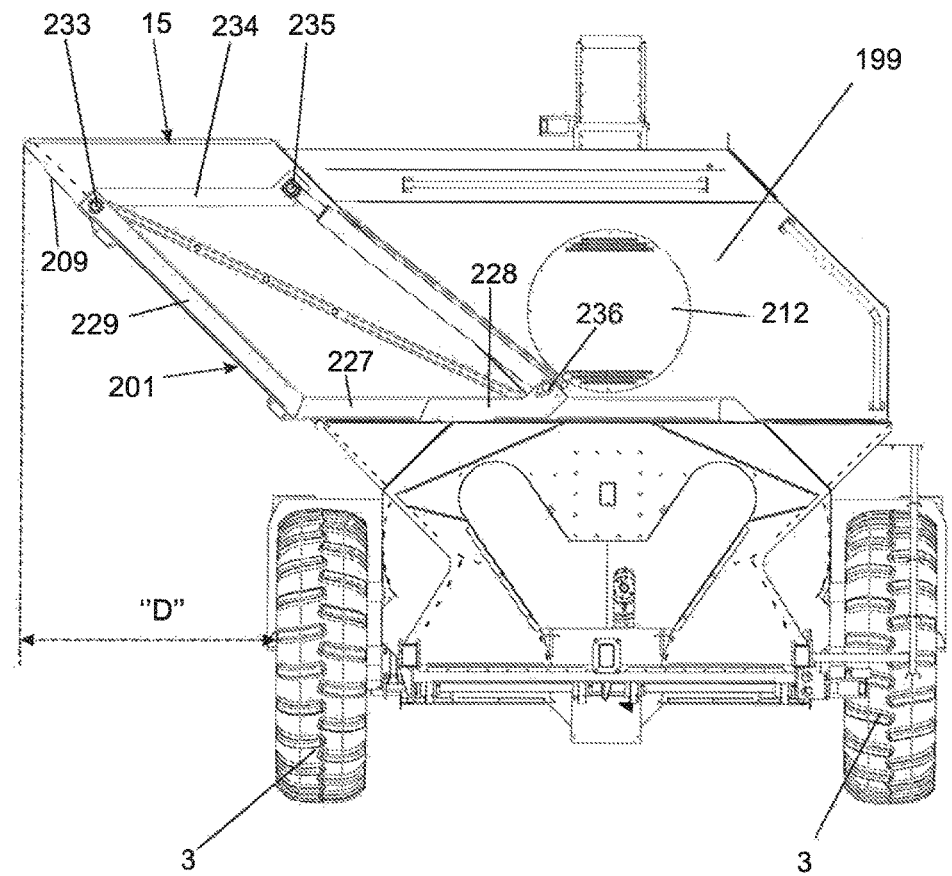
FIG. 60 is a view from the top showing the rear of the machine without some of its parts, focusing in the transversal positioning of the tipper bucket and the fact that it has a protruding side that goes beyond the set of wheels, placing its unloading mouth in position to speed up the tipping process and unloading of itself.
Figure 61:
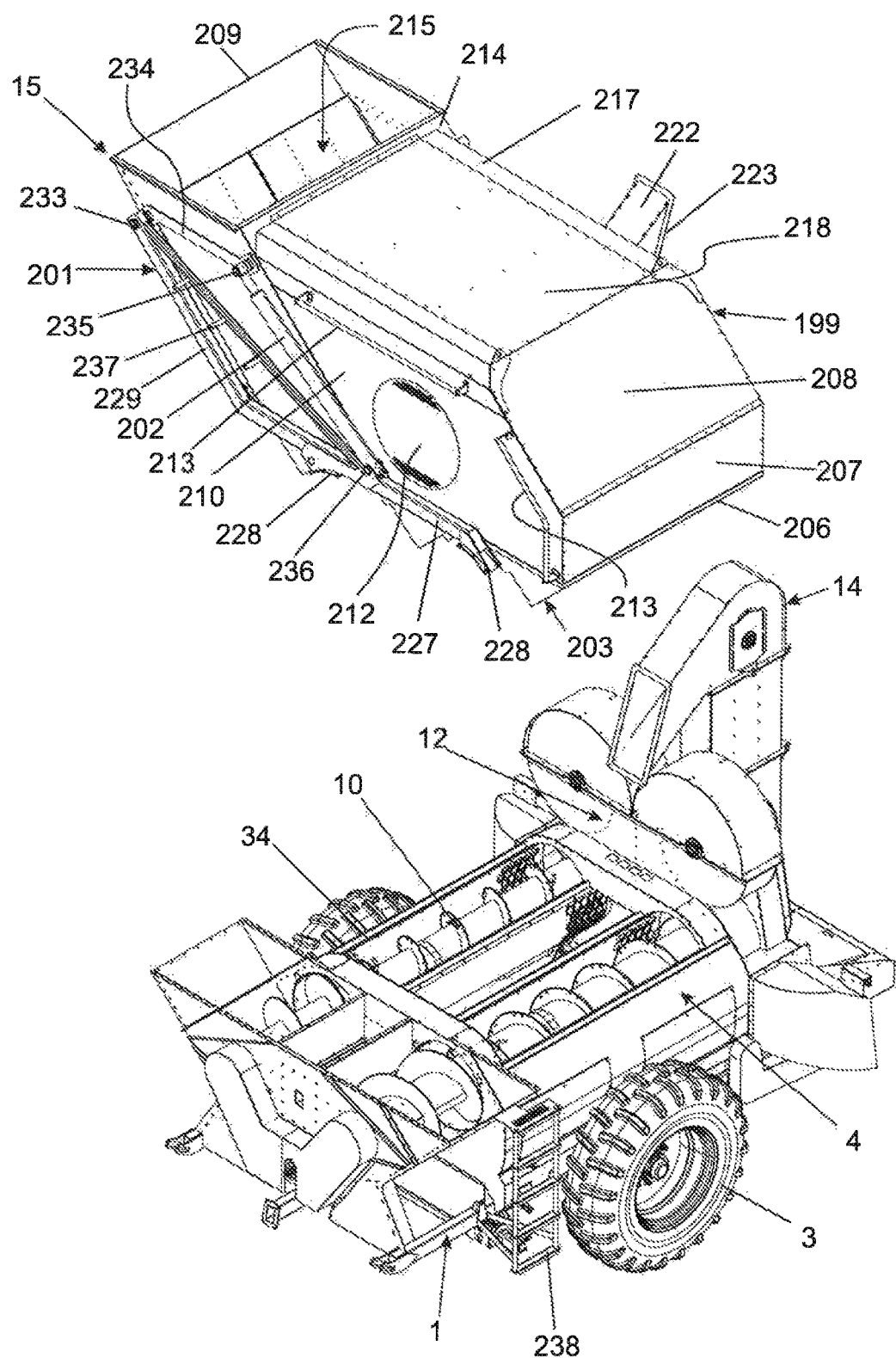
FIGS. 61 to 64 expose different isometric views, some exploded, focusing of the constructive details of the tipper bucket.
Figure 62:
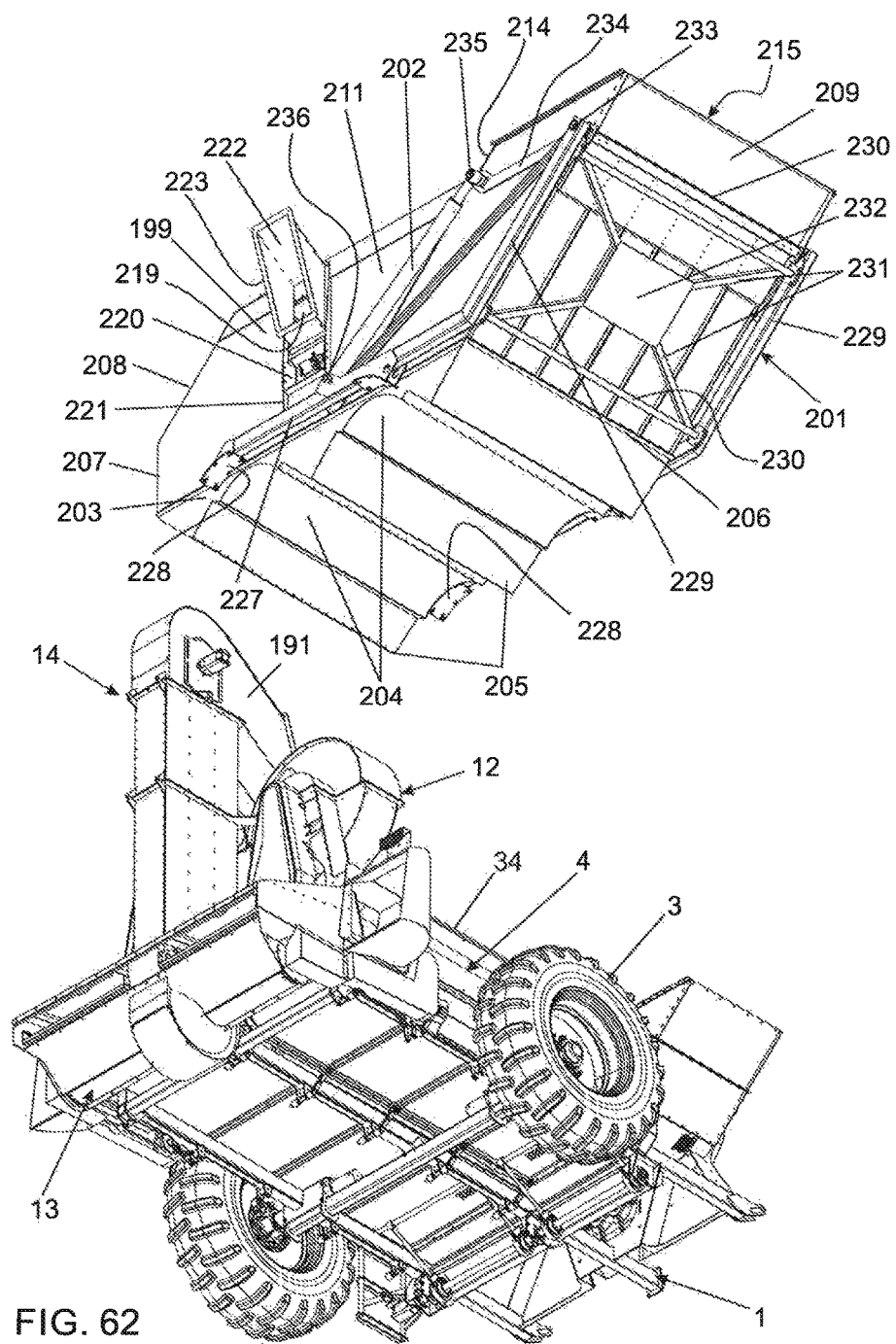
Figure 63:
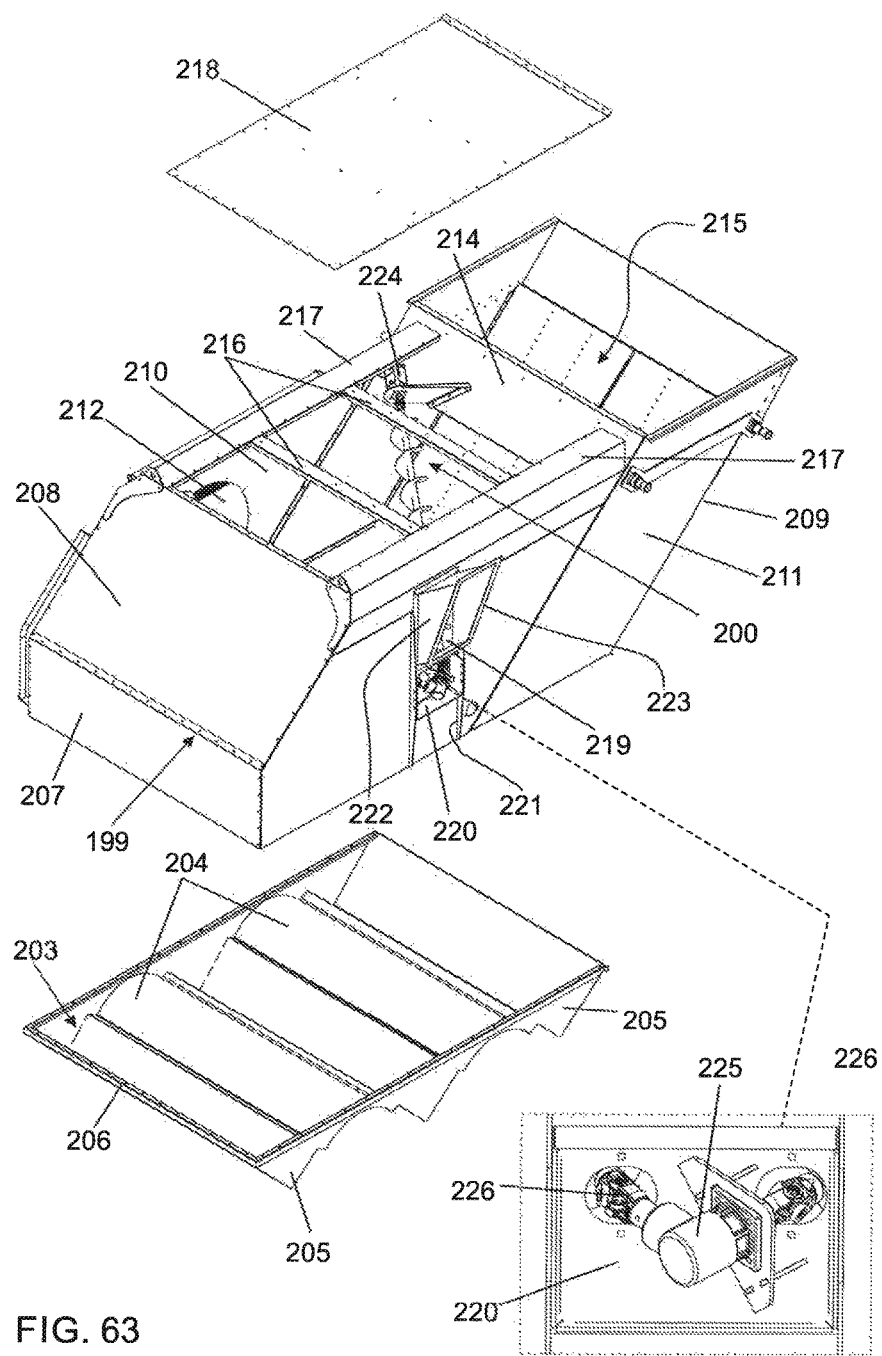
Figure 64:
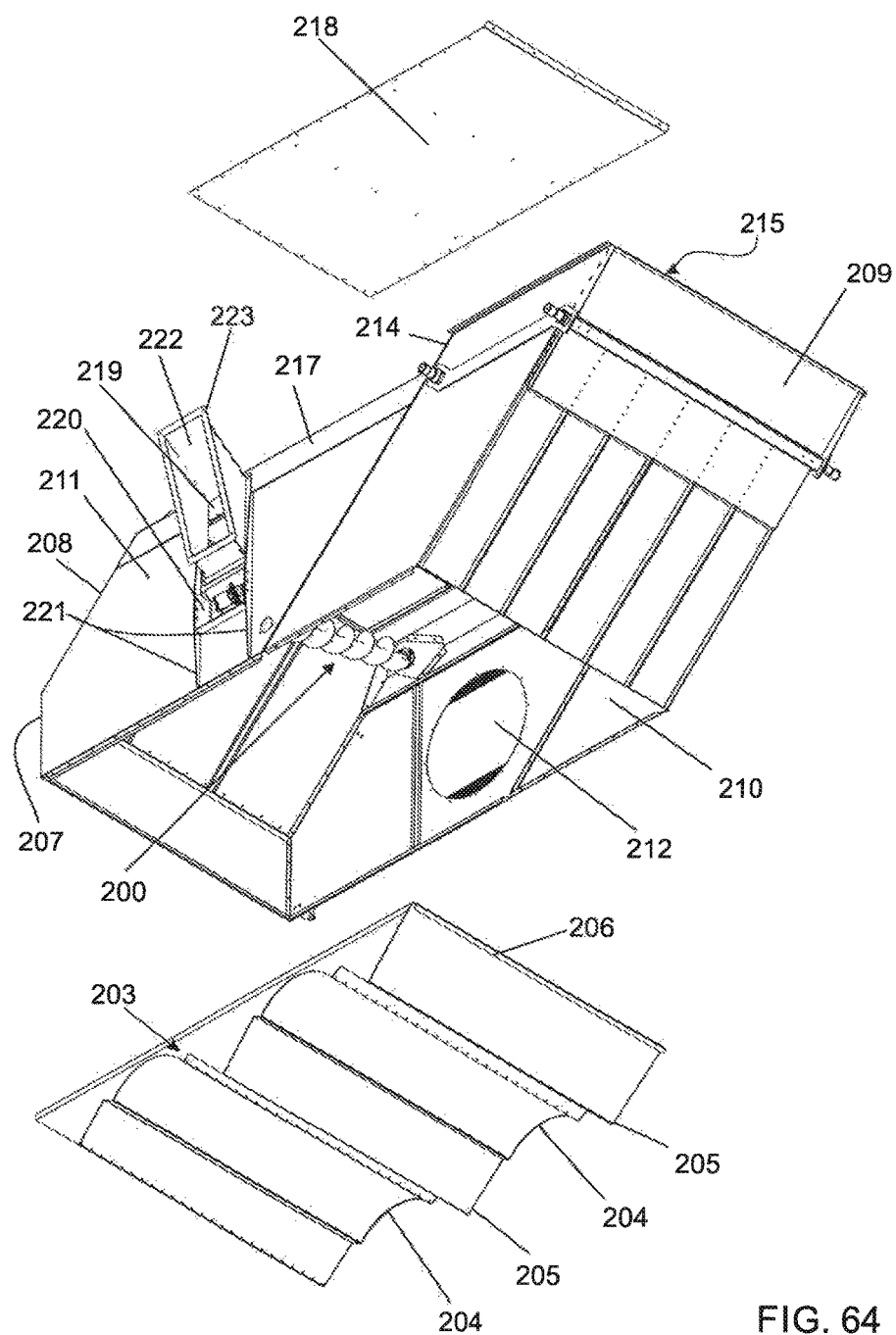

Observing FIG. 60, the bucket (199), when viewed from the front, has its base ending in the limits above the wheels (3), however, its right side is substantially inclined and exceeds the limits of said wheels (3) according to a distance "D". This side corresponds to the side of pouring, when the bucket is tilted for unloading, while the opposite side ends exactly on the median point of the corresponding wheel.

As illustrated by FIGS. 61 to 64, the bucket (199) contains a wavy bottom (203) with two semi-circular sectors (204) is accordance with three V-shaped sectors (205), setting up a profile that is adjusted on plane (34) of the body (4), where said bottom works as a closing cover of the entire upper part of the threshing rolls assembly (10), while its upper side, the bucket's bottom contains a rectangular structural frame (206) that is well adjusted on plane (34) of the body (4), as also from said frame rise all the parts the form the bucket itself, that in its left side it features a vertical portion (207) and a final portion inclined to the inside or to the right (208), while the wall on the opposite side or right side is totally inclined (209) with the same degree of inclination of the wall (208), what does not happen to the frontal (210) and rear (211) walls, because both are completely vertical, as also one of them contains a window with a ventilation screen (212) and handrails (213), being that, also, on the side of the inclined wall (209), the first one third of the bucket is marginally taller, having as its limit a dividing plate piece (214) equally inclined, forming at this point an unloading mouth (215) for the fruits in the moment that the bucket is tilted, also, the other two thirds of the top part of the bucket contain structural crossbars (216) and reinforced edges (217) bent to the inside acting as a corner bracket that receive a lid (218) that covers the entire upper part except the unloading mouth (215).

On the rear side wall (211) there is a rectangular opening (219) and a box (220), both structured (221), the opening features a duct in the form of an outward prolongation (222) that ends in an inclined form and is garnished by a flap (223) that composes a point of alignment and fixing with the exit mouth (191) of the bucket elevator (14).

The pair of threaded cargo levelers (200), positioned diagonally and inclined, has its extremities coupled by bearings to the walls (210) and (211), being that on the wall (210), said extremities are substantially spaced from each other and one of them is coupled to a hydraulic engine (224) and respective support, while on the opposite side both screw threads have its extremities coupled by bearing to the box (220) where they are interconnected by a 90° transmission (225) and universal joints (226), in a way that said hydraulic engine (224) may actuate simultaneously both threaded cargo levelers (200).

The entire assembly of the bucket itself (199) is assembled on the fixed support structure (201), seen in details in FIGS. 58 to 62, where It can be seen that it contains two tubular long plate pieces (227), one on each side, horizontal and transversally fixed to the body (4) by fork type supports (228) with its right side extremities prolonged upward with the other inclined tubular pieces (229), that in turn, are interconnected by other parallel tubes (230) and diagonal tubes (231) with a reinforcement central plate (232), forming a structural grid that is positioned almost flush with the inclined wall (209), and on this side the bucket contains two hinged articulations (233), that together with reinforcements (234), are prolonged horizontally up to about one third of the bucket's length for the assembling of other side articulations (235), that in this case, also articulately receive the upper extremities of the hydraulic cylinders (202), whose lower extremities are equally fixed by articulations (236) to the fork type supports (228) fixated to the long tubular plate pieces (227) of the fixed support structure (201). In this condition, when said hydraulic cylinders (202) are extended, the bucket executes a tilting movement that is sufficient for its complete unloading through the mouth (215).

The structure (201) contains a diagonal piece with rod steps that set up a stairs (237), that together with the other (238), and the handrails (213), offer easy access to the bucket (199) and other parts of the machine.

Figure 5:
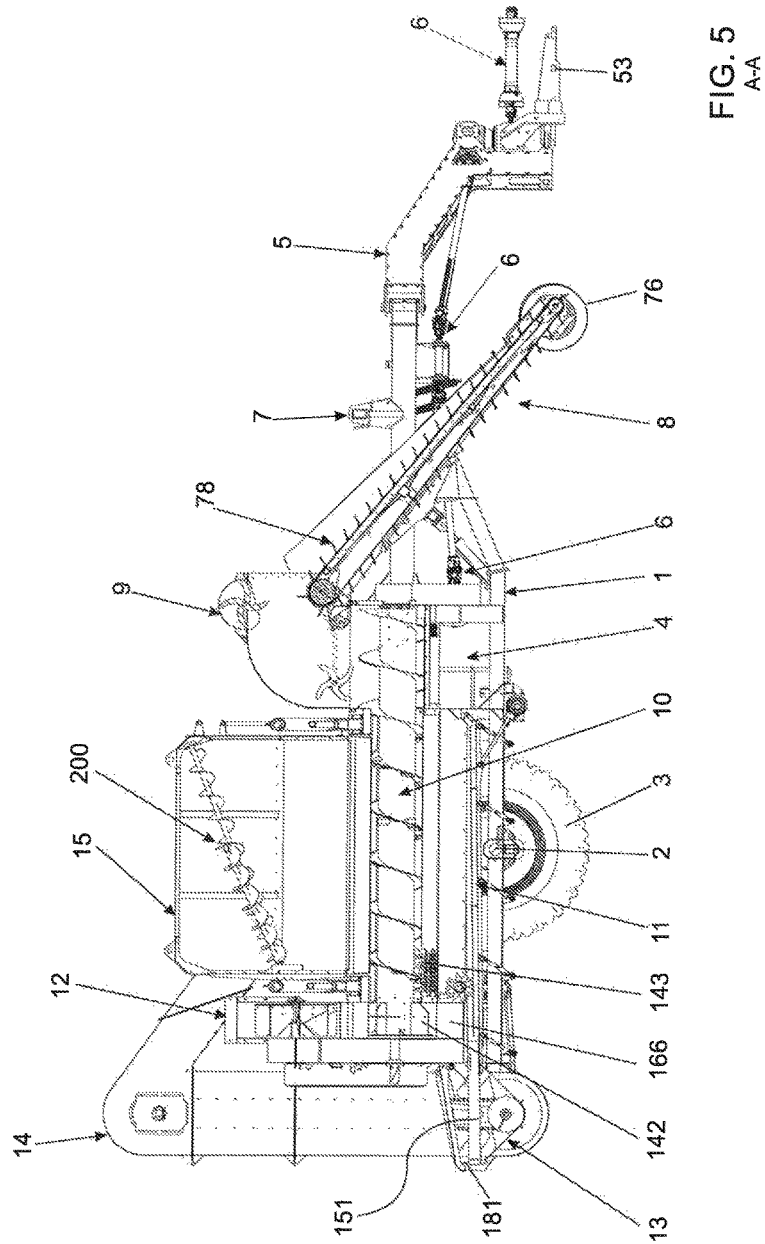
FIG. 5 exposes a view of the longitudinal not centered sectional cut A-A showing the assembling sequence of the assemblies of one side of the machine, starting with the harvesting conveyor belt, anti-jam box, threshing roll, vibrating sieve, collecting chute.
Figure 6:
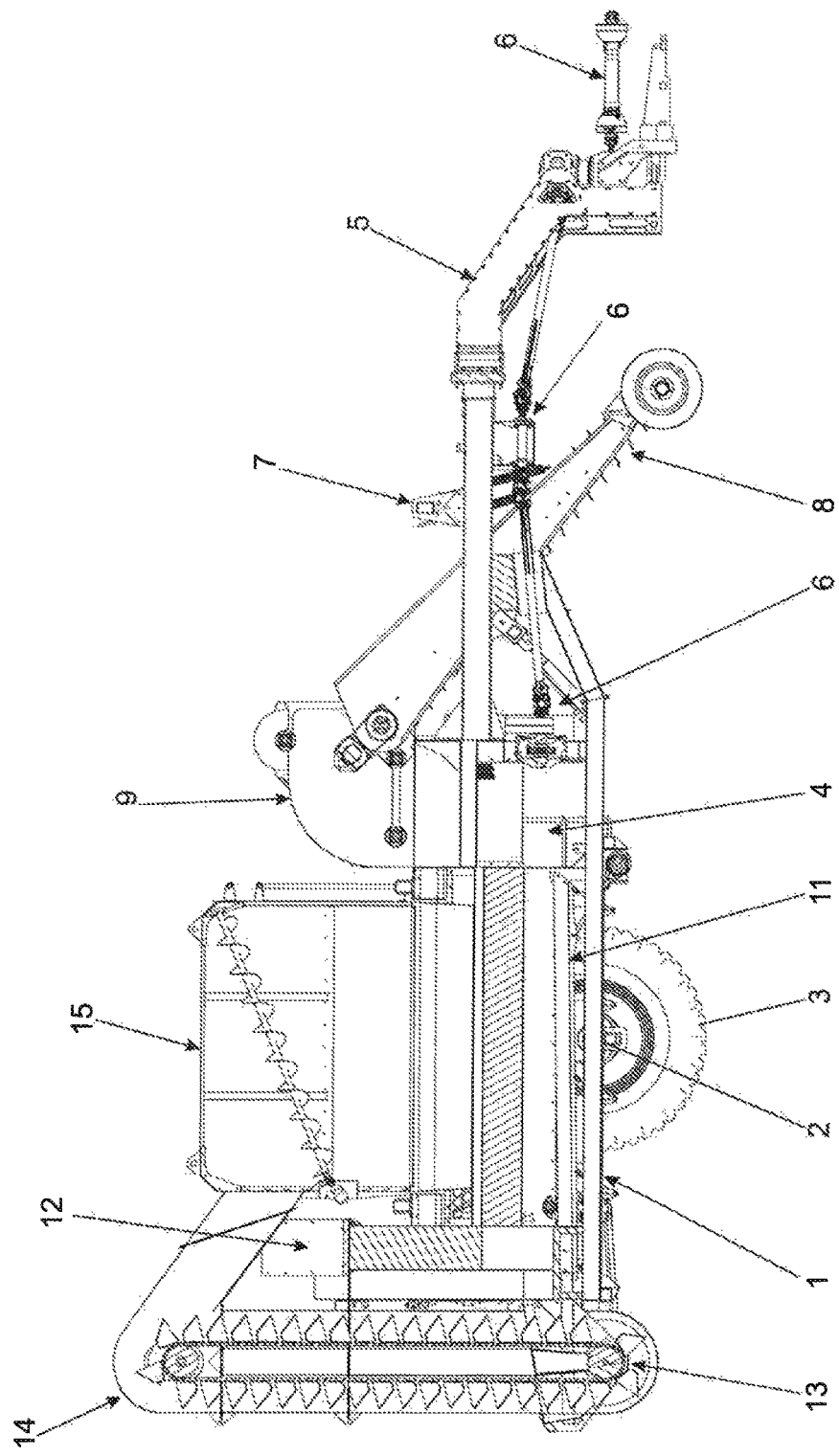
FIG. 6 produces a view of the longitudinal cut B-B in the center of the machine, focusing the parts that are unique and that are common to both sides of the machine, that is, hitch pole, transmission assembly, bucket elevator and tipper bucket.
Figure 7:
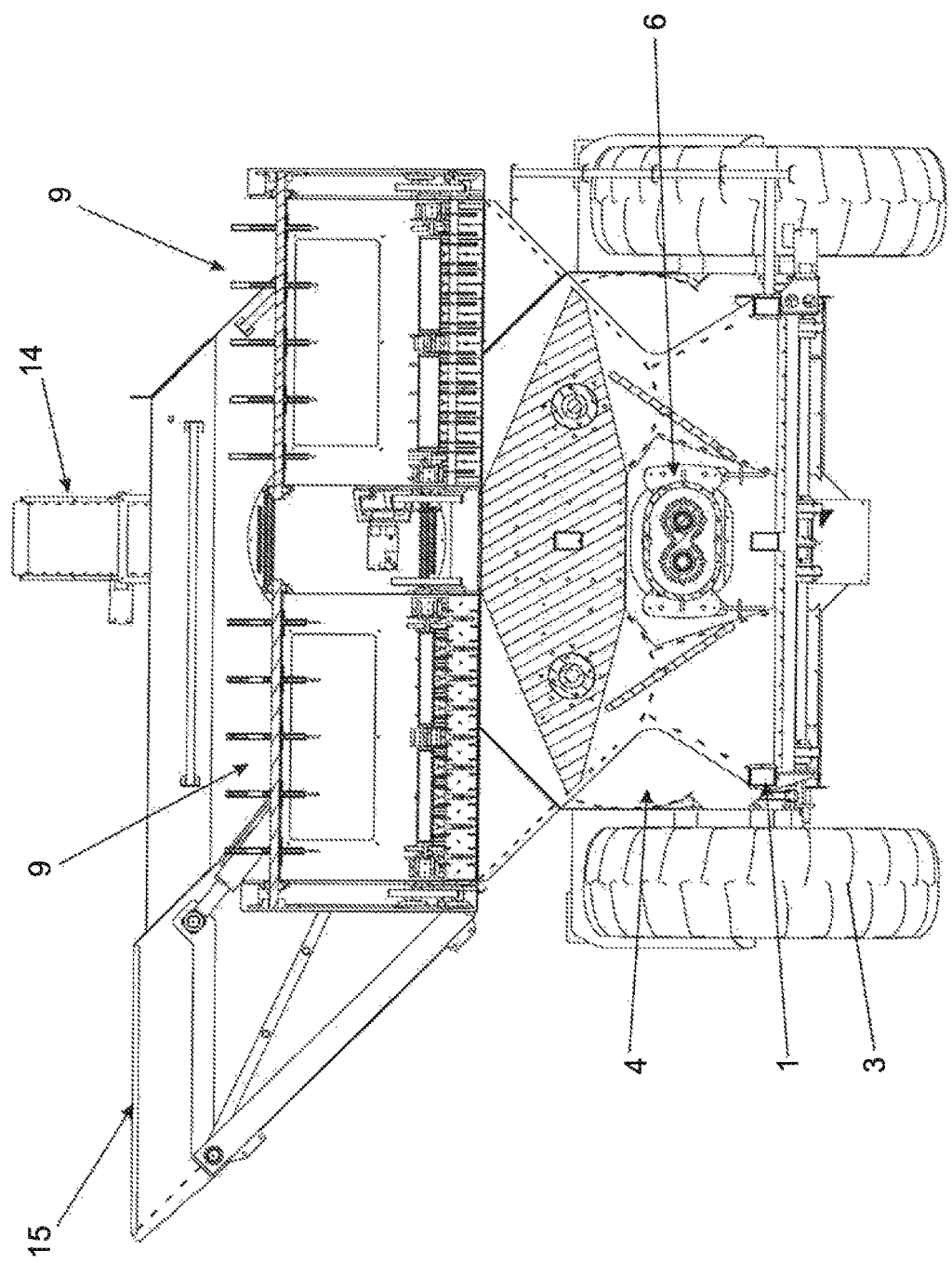
FIG. 7 is a sectional view of the cut C-C showing the inside of the anti-jam box.
Figure 8:
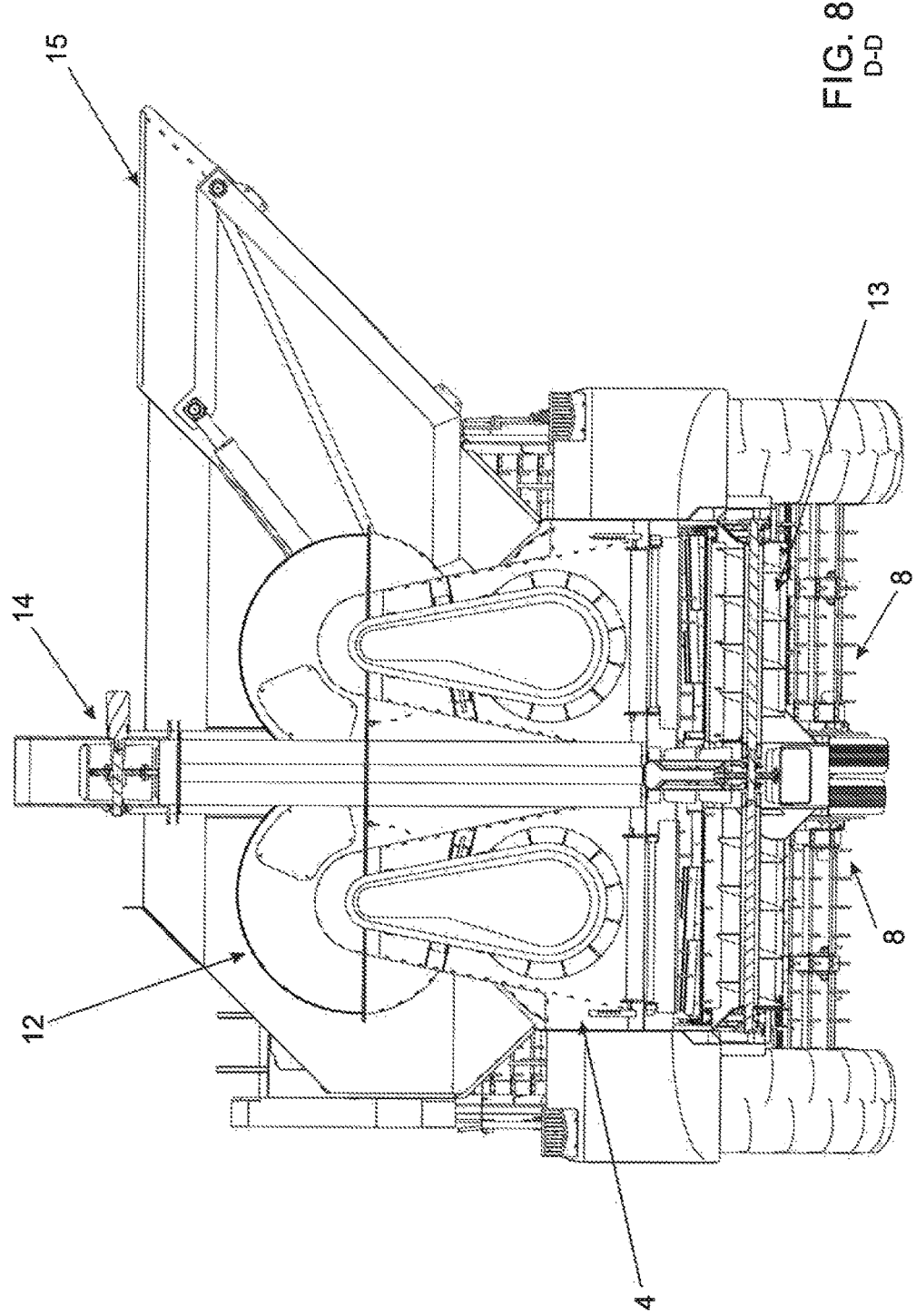
FIG. 8 is a sectional view of the cut D-D focusing the assembling the assembling of the collecting chute for clean fruits.
Figure 9:
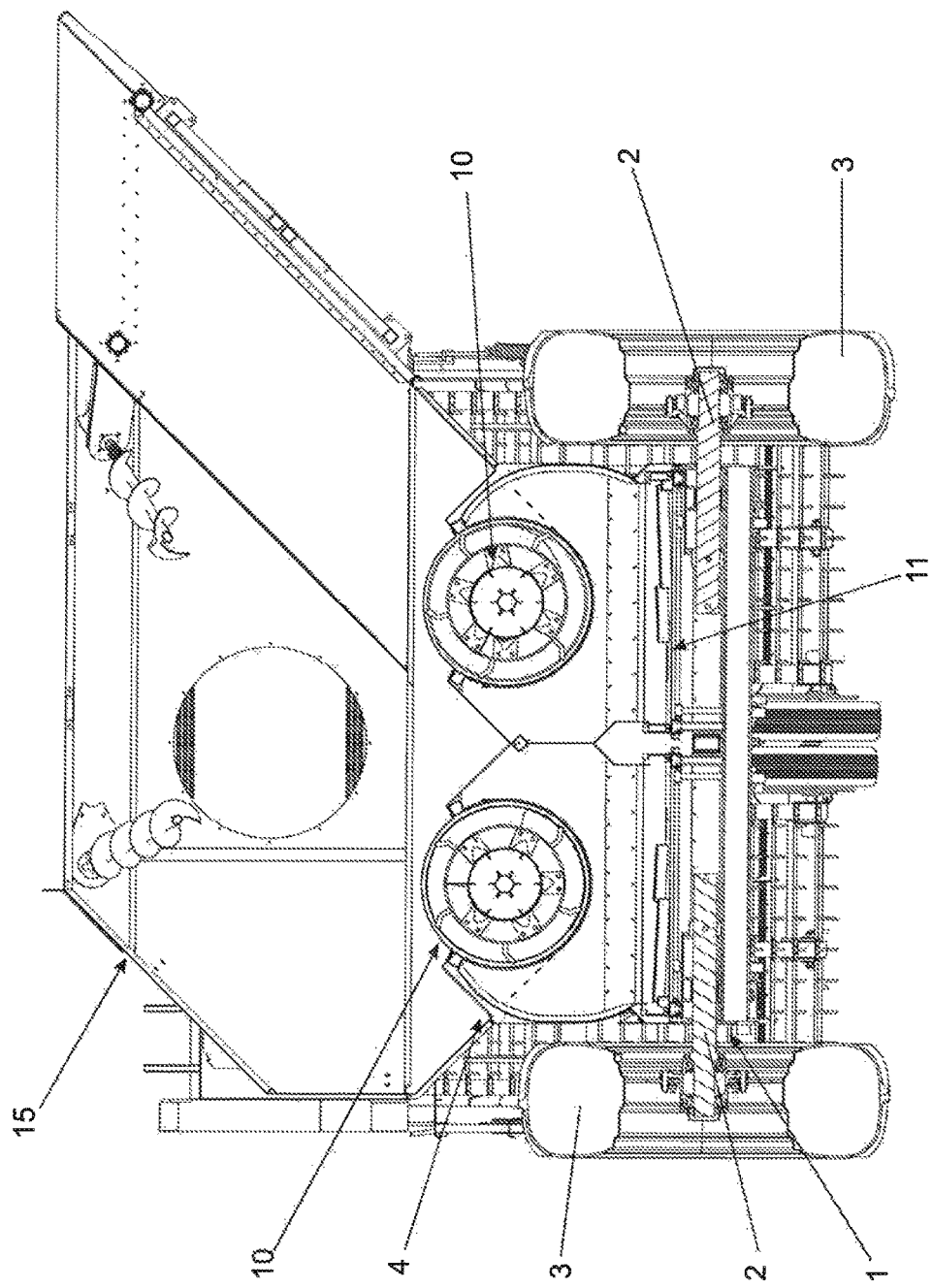
FIG. 9 represents a view of the cut E-E showing the assembling of the tipper bucket.

As it can be seen, the machine in question is compact and its functioning is simple, that is, observing FIG. 5 and considering that the hitch tip, (53) and the transmission (6) are coupled to a conventional tractor, the entire machine is simply moved along the lined up material. Logically, the hydraulic cylinder (73) allows the harvesting conveyor belts (8) to be lowered and lifted, to be put into work or to lift them, putting them away while the machine is moving but not working. The harvesting conveyor belt (8) harvests the material in a regular and continuous form. The wheels (76) allow the bottom extremity of the conveyor belts to copy the irregularities of the ground, which is done aided by the springs (70). The belt itself (78) contains a true set of claws that takes all the material to the anti-jam receptive boxes (9), and at this point, the material is distributed and dropped consistently on the initial part of the threshing cylinders (10). At this point starts the cleaning process, with the retention of branches, leaves and other materials that do not pass through the sieve (143). In this way, on this sieve the peanut fruits pass through and fall directly on the second phase of cleaning that is executed on the vibrating sieves (11), while the materials that don't pass through the first sieve (143) continue their way backwards and are dropped by the side exit mouths (166). The fruits that fall on the vibrating sieves (11) pass once again through a second cleaning phase, that consist of two different perforated meshes, the smaller openings allow the sand and other smaller particles to be eliminated and fall to the ground, while the fruits continue to move backwards and, only at the end, pass through the mesh with the larger openings (151) and fall on the chute (13), but before this, they are also cleaned by the suction assembly (12). That way, in the end of the vibrating sieves (11), dust and other light particles are suctioned, while other heavier materials that do not pass through sieve (151) continue backwards and are disposed by the exits (181), while the clean fruit pass though the mesh (151) and fall on the receptive chute, where they are collected by the bucket elevator (14) and taken to the inside of the tipper bucket (15).

The invention claimed is:

1. A harvester and processor for peanuts comprising:
   a chassis (1) having a top and a bottom;
   a structured plate body (4) received on the top of the chassis (1), the chassis (1) and the structured plate body (4) together forming a mono block support having a rear end and a front end;
   first and second semi-axles (2) arranged at the bottom of the chassis (1) and supporting the chassis (1);
   first and second wheels (3) mounted to the first and second semi-axles (2) respectively;
   an angular hitch pole (5) comprising a rear end, a rear segment, and a transmission system (6), the rear end of the angular hitch pole being fixed to the front of the chassis (1), and the angular hitch pole extending longitudinally forward from the chassis (1);
   a transversal support beam (7) mounted to the rear segment of the angular hitch pole;
   first and second inclined harvesting conveyor belt assemblies (8) arranged on opposite respective sides of the angular hitch pole (5), each of the first and second inclined harvesting conveyor belt assemblies (8) having a respective upper side that is connected by a spring to the transversal support beam (7), and having a respective high rear end;

first and second anti-jam receptive boxes (9) for receiving material to be processed from the first and second harvesting conveyor belt assemblies (8), the anti-jam receptive boxes (9) being mounted beside one another over the front of the mono block body and receiving the high rear ends of the first and second inclined harvesting conveyor belt assemblies (8) respectively, the material to be processed comprising peanut plants;

first and second threshing cylinder assemblies (10) arranged longitudinally inside the mono block body, each of the first and second threshing cylinder assemblies having a respective front end portion and a respective rear end portion, the mono block body and the first and second threshing cylinder assemblies (10) forming first and second sorting and cleaning tunnels for the material received from the inclined harvesting conveyor belt assemblies (8), thereby forming a first cleaning phase, each of the front end portions of the threshing cylinder assemblies being positioned under a respective one of the first and second anti-jam receptive boxes (9);

a double set of vibrating sieve assemblies (11) comprising first and second vibrating sieve assemblies (11) that form a receiving platform for receiving and further cleaning the material sorted and cleaned by the threshing cylinder assemblies (10), thereby forming a second cleaning phase, the material sorted and cleaned by the threshing cylinder assemblies comprising peanut pods and disposable parts of the peanut plants each of the first and second vibrating sieve assemblies (11) having a respective rear end;

a double ventilation assembly (12) comprising first and second vertical ventilation assemblies (12) arranged at the rear of the mono block body, each of the first and second vertical ventilation assemblies (12) comprising a respective bottom part that receives a respective one of the rear end portions of the threshing cylinder assemblies (10) and a respective one of the vibrating sieve assemblies (11) to form a respective ventilation chamber with an ascending air flow that passes through the peanut pods, thereby forming a third cleaning phase for removing small and light disposable parts of the peanut plants;

a collecting chute (12) for collecting the peanut pods, thus cleaned, from the first and second vibrating sieve assemblies (11), the collecting chute being arranged transversally at a rear of the chassis (1), the collecting chute comprising first and second transverse transporters for the peanut pods that each move the peanut pods in a converging manner to a central part of the chute, each of the first and second transverse transporters receiving a respective one of the rear ends of the first and second vibrating sieve assemblies (11), the rear ends of the of the first and second vibrating sieve assemblies (11) each occupying equally the respective transporter;

a vertical bucket transporter (14) assembled vertically in the rear part of the chassis (1), the vertical bucket transporter (14) comprising an upper extremity and a bottom extremity, the bottom extremity of the vertical bucket transporter (14) being positioned in the central part of the collecting chute (13) to receive peanut pods that accumulate in the central part of the chute from the transverse transporters; and a tipper bucket assembly (15) arranged on the mono block body and comprising an upper part, the upper extremity of said vertical bucket transporter (14) comprising an exit for the peanut pods and being arranged in the upper part of the tipper bucket assembly (15).

2. The harvester and processor according to claim 1, wherein:

the chassis (1) comprises three longitudinal long plate pieces and cross bars, the three longitudinal pieces including a middle longitudinal plate piece (16) and two side longitudinal plate pieces (17), the cross bars including a frontal crossbar (18), a rear cross bar (19) and a middle cross bar (20), the three longitudinal long plate pieces being interconnected by crossbars;

the middle cross bar (20) comprises two ends and bearings on each of the two ends, the bearings serving as supports for the semi axles (2) with the wheels (3);

the longitudinal long plate pieces have a bottom side, and the chassis (1) comprises inverted "U" shaped bearings (22) and frontal bearings (23), the inverted "U" shaped bearings and frontal bearings being distributed in the bottom side of the longitudinal long plate pieces and supporting corresponding parts of the first and second vibrating sieve assemblies (11);

the middle longitudinal plate piece (16) comprising a frontal extremity, the frontal extremity of the middle longitudinal plate piece comprising a coupling terminal (24) for the angular hitch pole (5);

the side longitudinal plate pieces (17) each comprising a respective fork-shaped rear terminal (25) for articulated coupling that serves as support for corresponding parts of a respective one of the first and second inclined harvesting conveyor belt assemblies (8).

3. The harvester and processor according to claim 1, wherein the structured plate body (4) of the mono block support comprises:

a frontal region and first and second housings arranged in the frontal region, the first and second housings collectively comprising: two transversal plates including a front transversal plate (26) and a first rear transversal plate (27); inclined side closings (29); and intermediate longitudinal plates (28) spaced between the inclined side closings, the first and second housings forming two frontal receptive boxes (30) for the materials to be processed, the receptive boxes being equal and each receptive box defining a respective circular opening (31) in the first rear transversal plate (27);

a second rear transversal plate (33), and first and second ordinarily longitudinal cylindrical boxes (32), each said first and second ordinarily longitudinal cylindrical box (32) aligned with a respective one of the circular openings in the first rear transversal plate (27), limited in length by the front transversal plate (26) and the second rear transversal plate (33), an open horizontal support plane (34) for the tipper bucket assembly (15) being formed between the front transversal plate (26) and the second rear transversal plate (33), said longitudinal cylindrical boxes defining bottom openings for the exit of the processed material (35) and defining side openings for inspections (36), the first and second longitudinal cylindrical boxes further comprising respective lids and defining rear passage openings (37) for the disposable parts of the peanut plants, the rear passage openings being circular and positioned in alignment with the circular openings (31) in the first rear transversal plate (27), the first and second longitudinal cylindrical boxes forming assembling compartments for the first and second threshing cylinder assemblies (10) respectively;

a double box (38) arranged behind the circular openings (37) and, above the double box, first and second upwardly extending semi-circular box portions (39), the double box forming an assembling structure for the first and second vertical ventilation assemblies (12);

a lower transversal box (40) and, above the lower transversal box, a vertical box (41), the lower transversal box and the vertical box being arranged behind the double box and forming an assembling structure for the collecting chute (13) and the vertical bucket transporter (14).

4. The harvester and processor according to claim 3, wherein:

the rear segment of the angular hitch pole (5) comprises a first horizontal and longitudinal tube (42) and a generally L-shaped piece (48), the first tube comprising a rear extremity in the form of a socket (43), the socket being attached in the front transversal plate (26) of the structured plate body (4);

said chassis (1) further comprises a terminal, said first tube (42) of the angular hitch pole (5) further comprises, below the socket and for fixation to the terminal, a first support (44) with a passage tube (45), and an inclined tube (46) extending and having an extremity fixed to the terminal (24) of the chassis (1);

the first tube (42) of the angular hitch pole (5) further comprises a front extremity opposite to the rear extremity of the angular hitch pole (5), the front extremity being articulately (47) coupled to the L-shaped piece, the L-shaped piece (48) extending forward and is then being directed downwards;

the angular hitch pole (5) further comprises a second support (49) and a third support (50) that are interconnected by a hydraulic piston (51) between the first tube (42) and the L-shaped piece (48) for angle adjusting; and the L-shaped piece (48) comprises a distal terminal comprising an articulation directed frontward (52), the angular hitch pole (5) further comprising a prolonged hitch tip (53) that is received on the articulation if the L-shaped piece.

5. The harvester and processor according to claim 4, wherein:

the transmission system (6) of the angular hitch pole (5) comprises a first cardan axle (57), a second cardan axle (59), a third cardan axle (60), a fourth cardan axle (61) and a double box of articulated transmission (54A and 54B) including a top transmission box (54A) and a bottom transmission box (54B);

the angular hitch pole (5) comprises flaps (55), the top transmission box (54A) is solidly fixed between flaps (55) of the angular hitch pole (5), while the bottom transmission box (54B) is free to rotate both ways and comprises a fork (56) turned downwards, the prolonged hitch tip (53) passing by the fork (56) such that the said bottom transmission box follows the movement of the prolonged hitch tip (53);

the bottom transmission box (54B) comprises an entrance axle, and the first cardan axle (57) is coupled to the entrance axle and positioned above and aligned with the prolonged hitch tip (53) of the angular hitch pole (5), the first cardan axle (57) comprising a free extremity facing frontwards for coupling to a power outlet of a conventional tractor and for transmitting rotation to the bottom transmission box (54B), and thereby transmitting rotation to the top transmission box (54A);

the top transmission box (54A) comprising an exit axle with elastic coupling (58) is coupled to the second cardan axle (59), which is telescopic and extends under the L-shaped piece (48) of the angular hitch pole (5), and at the first tube (42) of the angular hitch pole (5), the second cardan axle (59) is coupled to the third cardan axle (60), which is assembled in the second support (49) of the angular hitch pole;

the third cardan axle (60) is coupled to the fourth cardan axle (61), which is telescopic, the fourth cardan axle (61) passing freely through an inside of the passage tube (45) of the first support (44) of the angular hitch pole (5) and extending up to the first transversal plate (26) of the structured plate body (4); and the fourth cardan axle (61) is coupled to another transmission box (62) at the structured plate body (4), the another transmission box comprising further axles, belts (64) and pulleys (63), the further axles being equally equipped with the pulleys (63) that, through the belts (64), are connected to further pulleys (65), that in turn, are coupled to the first and second threshing cylinder assemblies (10).

6. The harvester and processor according to claim 1, wherein:

the transversal support beam (7) comprises a tubular bar (66) with middle reinforcements (67) and a support (68) fixed on top of the first tube (42) of the angular hitch pole (5), the first tube being straight;

the inclined harvesting conveyor belt assemblies each have a respective edge, the transversal support beam (7) further comprises two helical springs (70), each helical spring having respective upper and lower ends, and the said tubular bar (66) comprises two opposite ends, each said end of the tubular bar having a respective terminal (69) that is attached to the upper end of a respective one of the helical springs (70), the lower ends of the helical springs each being coupled to a corresponding edge of a respective one of the inclined harvesting conveyor belt assemblies (8).

7. The harvester and processor according to claim 2, further comprising first and second hydraulic cylinders, each coupled to a respective one of the forks (25) of the chassis (1), each said hydraulic cylinder having respective upper and lower extremities, wherein:

each of the first and second inclined harvesting conveyor belt assemblies (8) comprises a respective rectangular structure (71), conveyor belt (78), side walls (79), and pair of skis (80);

each said rectangular structure comprises a lower side and an upper side, the lower side being integrated with a median transversal support (72) for articulated coupling to the upper extremity of a respective one of the hydraulic cylinders (73), the lower extremity of each of the first and second hydraulic cylinders being equally articulated in the corresponding fork (25) of the chassis (1);

the upper side of each said rectangular structure (71) comprises respective first and second ends and receives a plate closing in the form of a sieve (74), the first end of the upper side of each said rectangular structure receives a respective an upper traction assembly (75), and the second end of the upper side of each said rectangular structure receives a respective lower wheel assembly (76) comprising conveyor belt assembly wheels;

a set of free rollers (77) is arranged between the conveyor belt assembly wheels, the free rollers (77) and the upper traction assembly (75) together forming a point of assembly for the conveyor belt (78), the conveyor belt comprising an upper part and a bottom part, the upper part of the conveyor belt moving upwards over the sieve (74) and in between the side walls (79), while the bottom part of the conveyor belt moves downwards over the rectangular structure (71) and is guided over the pair of skis (80).

8. The harvester and processor according to claim 7, wherein the rectangular structure (71) of each said inclined harvesting conveyor belt assemblies (8) comprises long plate pieces (81), outer crossbars (82 and 83), intermediate crossbars (84 and 85), and plate strips (86), the long plate pieces (81) being interconnected by the outer crossbars (82 and 83) and the intermediate crossbars (84 and 85), the outer crossbars and the intermediate crossbars having extremities integrated in plate strips (86), the plate strips being fixed against the side faces of the said long plate pieces (81) and having lower extremities and upper extremities, the lower extremities of the plate strips (86) presenting widened stretches (87) for fixation of the conveyor belt assembly wheels of the respective inclined harvesting conveyor belt assembly (8), while the upper extremities of the plate strips (86) are widened with a circular shape (88) and are axially aligned with other two pairs of semi-circular pieces (89) positioned in the outer crossbars (82), forming a set of passage and bearing pieces of the upper traction assembly (75).

9. The harvester and processor according to claim 7, wherein the plate closing in the form of the sieve (74) comprises two longitudinal segments, each longitudinal segment having respective upper and lower extremities that extend forming an upper downward curved stretch (90) and a lower downward curved stretch with a first spacing (91) between the upper downward curved stretches of the two longitudinal segments and a second spacing (91) between the lower downward curved stretches of the two longitudinal segments, and the traction assembly (75) and the set of free rollers (77) comprise parts that are positioned in the first and second spacings.

10. The harvester and processor according to claim 7, wherein the median transversal support (72) of each inclined harvester belt comprises two respective projections (92) and a support tube having two ends, the projections develop perpendicularly downward, on respective plate strips (86), where said projections each receive a respective end of the transversal support tube (93), the transversal support tube (93) comprising with a middle point for articulated coupling (94) to the corresponding upper extremity of the respective hydraulic cylinder (73), the lower extremity of each hydraulic cylinder (73) being equally articulated to the corresponding fork (25) of the chassis (1).

11. The harvester and processor according to claim 1, wherein each said upper traction assembly (75) comprises:

an upper traction assembly axle (95) having opposite first and second extremities, each comprising respective bearings (96), wherein each anti-jam receptive box comprises respective first and second side walls, the first extremity of the upper traction axle passes through the first side wall of the corresponding anti-jam receptive box (9), after which said extremities receives a first gear (97) and second gear (98) respectively;

a hydraulic engine (101) comprising a cage type support (102), a hydraulic engine axle assembled in the cage type support (102), and a third gear (100) assembled on the axle of a hydraulic engine (101), the cage type support (102) being fixed to the side wall of the corresponding anti-jam receptive box (9); and a gear chain (99) coupled to the third gear (100), the gear chain pulling the first gear (97), while the second gear (98) is a continuity of the traction force of said hydraulic engine (101);

fourth, fifth and sixth gears distributed on the traction assembly axle (95) comprising, the fourth gear being in a middle (103) of the traction assembly axle (95), and the fifth and sixth gears being outer gears (104) with respect to the fourth gear, in which the fourth gear comprises an outer diameter set by a chain of cylindrical pins (105) equally distant from each other, wherein the fifth and sixth gears are each formed by respective first and second spaced discs (106 and 107), equally with teeth (108) and recesses (109) between the teeth (108), and each tooth (108) of the first disc (106) of each of the fifth and sixth gears has three axial cylindrical pins (110) forms a uniform circular sequence of pins, the pins of the fourth, fifth and sixth gears together forming a support for the traction for the conveyor belt (78) of the respective inclined harvesting conveyor belt assembly (8).

12. The harvester and processor according to claim 11, wherein each conveyor belt (78) comprises three parallel spaced belts (111), interconnected by a plurality of transversal bars (112), each transversal bar having equal radial rods (113) with which are formed various transversal combs (114) that are meshed in the recesses (109) of the fifth and sixth gears (104) of the upper traction assembly (75), the three parallel spaced belts (111) being supported on the cylindrical pins (105) of the fourth, fifth and sixth gears (103) of the upper traction assembly (75), and the three parallel spaced belts (111) also being supported by the set of free rollers (77).

13. The harvester and processor according to claim 7, wherein each ski (80) of said pair of skis, for each said inclined harvester conveyor belt assembly (8), comprises: a T-shaped plate body (115); upper and lower extremities; in the lower extremity, a fixation brace (116) to the transversal support tube (93) of the median transversal support (72); and, a contact plate (117) made of sliding material by the upper extremity.

14. The harvester and processor according to claim 7, further comprising a universal joint that is positioned between the anti-jam receptive boxes and interconnects the traction assemblies (75) of the first and second inclined harvesting conveyor belt assemblies (8).

15. The harvester and processor according to claim 11, wherein each of the first and second anti-jam receptive box (9) comprises:

an upper side wall, a rear side wall, an open front side, an open bottom side, the first and second side walls (119) and a closing curved wall (120), the closing curved wall (120) comprising a removable window for inspection and repair (121) and extending to close the upper side wall and the rear side wall, with the bottom side of each anti-jam receptive box arranged over a respective one of the frontal reception boxes (30) of the structured plate body (4) and above the front end portion of the respective threshing cylinder assembly (10), the upper extremity of the corresponding inclined harvesting conveyor belt assembly (8) being in the open front side of the respective anti-jam receptive box and coupled, by a further bearing support, to lower front corners of the side walls through the respective traction assembly (75);

a frontal receptive box axle (121) and a rear receptive box axle (122), in a same horizontal plane, the frontal receptive box axle (121) being positioned very close to the traction assembly (75) and the rear receptive box axle (122) being positioned very close to lower rear corners of the side walls (119), the rear receptive box axle (122) comprising a threaded transporter (123) arranged along a part of its length and a first plurality of spaced claws in the form of four-tip-stars (124) arranged along a remainder of its length, a second plurality of spaced claws (125), also in the form of four-tip-stars, being arranged along a length of the frontal receptive box axle (121), the second plurality of spaced claws (125) having smaller dimensions than the first plurality of spaced claws;

an upper receptive box axle (126) comprising a third plurality of claws in the shape of four-tip-stars (127), the upper receptive box axle being arranged near the upper side of the anti-jam receptive box, in a same plane as the closing curved wall (120), the upper side wall of the anti-jam receptive box comprising a plurality of semicircular protections (128) enveloping upper portions of the third plurality of claws, bottom portions of said claws being exposed inside of the anti-jam receptive box (9);

receptive box axle bearing supports, wherein the frontal receptive box axle (121), the rear receptive box axle (122) and the upper receptive box axle (126) each having first and second extremities that are equally coupled by said receptive box axle bearing supports to the first and second side walls (119) of the anti-jam receptive box (8), the first extremities being coupled to the first side wall and the second extremities being coupled to the second side wall; and a first receptive box gear (129), a second receptive box gear (130) and a third receptive box gear (131), a receptive box gear chain (132), handling gears (133) and stretching gears (134), wherein the first extremities of the frontal receptive box axle (121), the rear receptive box axle (122) and the upper receptive box axle (126) pass through the first side wall (119) to receive the first receptive box gear (129), the second receptive box gear (130) and the third receptive box gear (131), and wherein the first receptive box gear (129), second receptive box gear (130) and third receptive box gear (131) being synchronized by the receptive box gear chain (132), the handling gears (133) and the stretching gears (134), said receptive box chain (132) being coupled also to the second gear (98) of the traction assembly (75), wherein the anti-jam receptive box further comprises a protective cover (135) over: the first extremities of the frontal receptive box axle (121), the rear receptive box axle (122) and the upper receptive box axle (126); the first receptive box gear (129); the second receptive box gear (130); the third receptive box gear (131); the receptive box gear chain (132); the handling gears (133); and the stretching gears (134).

16. The harvester and processor according to claim 3, wherein:

each of the threshing cylinder assemblies (10) comprise a respective threshing roll, central tube (136), front axle tip (137) and rear axle tip (138) opposite to the front axle tip, and bearing supports, wherein the central tube (136) comprises a helical thread (139) and a plurality of radial claws (140);

the front axle tip (137) of each said threshing cylinder assembly is coupled by a respective one of the bearing supports of the threshing cylinder assemblies (10) to the front transversal plate (26) of the structured plate body (4), where the front axle tip (137) receives a pulley (65) from the transmission system (6) and consequently, the front end portion of each threshing cylinder assembly (10) is positioned on the inside of the frontal threshing reception box (30);

the double box (38) of the of the double ventilation assembly (12) comprises a wall, and the rear axle tip (138) of each said threshing cylinder assembly is coupled by a respective other one of the bearing supports of the threshing cylinder assemblies (10) to the wall of the double box (38);

each of the threshing cylinder assemblies (10) comprises a respective semi-circular sieve (143) enveloping an entire length of each said threshing roll, the threshing roll and the semi-circular sieve (143) being set up on an inside of a respective one of the cylindrical boxes (32) of the structured plate body (4), where said sieve (143) comprises an open upper side and a portion (144) with a substantially larger opening and positioned inside the frontal receptive box (30).

17. The harvester and processor according to claim 3, wherein:

each of the first and second vibrating sieve assemblies (11) comprise a respective sieve (146), rectangular structure (145), and equally rectangular frame (147), the sieve being positioned over the rectangular structure and surrounded by the rectangular frame (147);

each said rectangular frame having an upper side (148) that is open and a longitudinal side that is adjacent to the longitudinal side of the other rectangular frame, and, at a point near the upper sides of the rectangular frames, the longitudinal sides of the rectangular frames are tapered (149) forming a gap (150) for positioning the vertical bucket transporter (14) and;

each sieve comprising a first stretch and a second stretch, the second stretch being positioned between the point near the upper side and the upper side of the respective rectangular frame, and the second stretch having a large mesh (151) for the passage of the clean peanut pods, the first stretch being positioned before the second stretch, and each said sieve further comprising various respective toothed strips (152) extending longitudinally over the first sieve stretch (146), where some of the toothed strips (152) are positioned diagonally, and the second stretch having the large mesh (151) is positioned over the collecting chute (13);

each of the vibrating sieve assemblies comprising an end part and a respective upper trimming, the end parts passing through the double box (38) of the ventilation and cleaning assembly;

both said rectangular structures (145) are positioned in a same plane, and each said rectangular structure receives the respective upper trimming, each said upper trimming having a plate gable shaped profile (153) that is elevated sufficiently to be positioned between the semi-circular sieve (143) of the respective threshing cylinder assembly (10);

each rectangular structure further comprising a respective lower side articulately receiving upper ends of various swinging arms, where some of the swinging arms are simple arms (154) and other swinging arms are double arms (155), the chassis (1) comprising supports for the swinging arms, and all of the swinging arms being equally inclined and having lower ends that are equally articulated in said supports of the chassis (1);

the chassis (1) further comprising a front end, axle supports integrated at the front end of the chassis, the harvester and processor further comprising a transversal axle assembled in bearings (158) fixed in the axle supports (159) of the chassis, where said transversal axle has an extremity; and wherein the harvester and processor further comprises:
- an elastic coupling and a hydraulic engine (160), equipped at said extremity of the transversal axle, for rotation of said transversal axle (157);
- cross bars (163), one on each rectangular structure of the vibrating sieve assemblies; and
- eccentric pieces (161), each comprising a respective radial arm with an upper extremity, and having the respective radial arm (162) articulately coupled to crossbars (163), one on each structure (145); wherein each said vibrating sieve assemblies (11) further comprises a respective anti-jam axle (164), a respective actuation pulley (165), and various lozenge helix pieces (164') on the respective anti-jam axle, the anti-jam axles each having a respective extremity that is exposed on a respective longitudinal side of the vibrating sieve assembly where the extremities each receive the respective actuation pulley (165).

18. The harvester and processor according to claim 3, wherein the double ventilation assembly (12) comprises:
    the double box (38) of the mono block structure (4), including the first and second upwardly extending semi-circular box portions (39), the double box (38) having air flow and also comprising first and second opposite side extensions that each comprise a respective backwards facing exit (166) for disposables;
    above each of the first and second upwardly extending semi-circular box portions (39), a respective upper semi-circular cover, the upper semi-circular covers and the first and second upwardly extending semi-circular box portions (39) together forming first and second circular boxes (167) that are in communication with the double box (38);
    first and second ventilation turbines (168) housed within the first and second circular boxes (167) respectively, the first and second circular boxes (167) and the first and second ventilation turbines (168) thereby forming first and second ventilation turbine chambers, the first and second ventilation turbines each comprising a respective turbine axle (170);
    a pair of ascending air flow entrance boxes (169) behind the double box (38) and the first and second circular boxes (167), each of the pair of ascending air flow entrance boxes having a respective bottom extremity that extends along a width of the ascending air flow entrance box, and the bottom extremities of the pair of ascending air flow entrance boxes having a certain distance from the meeting point of the sieves (146 and 151) of the first and second vibrating sieve assemblies (11), each of the pair of ascending air flow entrance boxes having a respective upper extremity that communicates with a respective one of the ventilation turbine chambers;
    first and second turbine pulleys;
    first and second turbine belts; and
    first and second stretchers, wherein
    each of the threshing cylinder assemblies (10) comprise a respective a rear axle tip (138) and a respective threshing cylinder pulley (141) at the rear axle tip (138), and
    the turbine axle (170) of each of the first and second ventilation turbines passes through a the respective ascending air flow entrance box (169) and receives a respective one of the first and second turbine pulleys (171), that by means of the respective first and second turbine belts (172) and the respective first and second stretchers (173), are each synchronized with a respective one of the pulleys (141) of the threshing cylinder assemblies (10), the rear axle tips (138) each equally pass through a respective one of the pair of ascending air flow entrance boxes (169),
    and the double ventilation assembly (12) further comprises first and second plate protections (174), the first protection covering the first turbine pulley, the first turbine belt, the first turbine stretcher and the respective threshing cylinder pulley, while the second protection covers the second turbine pulley, the second turbine belt, the second turbine stretcher and the other respective threshing cylinder pulley.

19. The harvester and processor according to claim 17, wherein the collecting chute (13) comprises:
    outer walls (176);
    first and second V-shaped chutes (175) closed by the outer walls (176) and transversally aligned in the rear of the chassis (1);
    a semi-cylindrical box (177), positioned between the first and second V-shaped chutes (175), for housing the bottom extremity of the vertical bucket transporter (14), wherein said first and second V-shaped chutes (175) each comprise a respective bottom formed by a respective chute sieve (178) for the exit of dirt and other small particles, and wherein the first and second V-shaped chutes each comprise a respective upper portion, the large mesh (151) of each the respective vibrating sieve assemblies (11) being positioned in the upper portion of a respective one of the V-shaped chutes; and
    an upper chute closing (179) arranged on the first and second V-shaped chutes above the large mesh (151), the upper chute closing (179) comprising inspection lids (180);
    first and second spaces (181), for exiting of disposables, formed between the upper chute closing the large mesh (151) of first and second vibrating sieve assemblies (11) respectively, wherein for each of the respective first and second vibrating sieve assemblies, the respective space (181) extends under said vibrating sieve assembly (12) until the cross bar (163), said cross bar functioning as a further anti-jam axle;
    first and second regulating metallic curtains (182), each arranged between a respective one of the first and ventilation assemblies (12) and the respective large mesh (151), said first and second V-shaped chutes (175) comprising respective first and second inversed threaded transporters (183), each of the first and second inversed threaded transporters (183) comprising a respective collecting chute axle having an extremity, the extremities of each collecting chute axle being coupled by respective collecting chute axle bearings to a respective one of the outer walls (176);
    a collecting chute transmission set and plate protections (189), the transmission set comprising chute transmission receive pulleys (185), first chute transmission belts (186), chute transmission handling pulleys (187), and second chute transmission belts (188) to be coupled to the actuation pulleys (165) of the cross bar (163), the collecting chute transmission being encased by the plate protections (189).

20. The harvester and processor according to claim 19, wherein the vertical bucket transporter (14) comprises:
a vertical duct (190) having a bottom extremity and an upper extremity, the bottom extremity of the vertical duct being integrated with and comprises a continuity of the vertical box (41) of the structured plate body and of semi-cylindrical box (177) of the receptive chute (13), while the upper extremity of the vertical duct is curved forward and ends in the form of a sloping unloading mouth (191) that unloads inside the tipper bucket assembly (15);
a transporter chain (192) and a plurality of buckets (193) arranged on the transporter chain set up inside the vertical duct (190); and
two supporting elements for the transporter chain comprising:
a bottom supporting element that comprises an intermediate axle (195) and a lower transporter gear (194) on the intermediate axle (195), the intermediate axle (195) forming an interconnection between the two collecting chute axles (184); and
a top supporting element that comprises an upper transporter axle (197) and an upper transporter gear (196) on the upper transporter axle and coupled by a transporter bearing to an upper portion of the vertical duct (190); and
the vertical bucket transporter further comprising a hydraulic engine (198) connected to said upper transporter axle.

21. The harvester and processor according to claim 1, wherein the tipper bucket assembly (15) comprises:
an actual bucket (199), which is a parallelepiped plate compartment comprising a bottom side with details for its transversal sitting on the horizontal support plane (34) of the structured plate body (4), the bucket further comprising, internally, a cargo leveling assembly (200);
a fixed structure (201) having a right extremity; and
side hydraulic actuations (202), wherein said bucket (199) is positioned over the fixed structure (201), and the right extremity of the fixed structure (201) is connected to tilt by means of the side hydraulic actuations (202).

22. The harvester and processor according to claim 21, wherein the bucket (199) comprises a front and a base having a width that is less than a width between the first and second wheels (3), the bucket (199) further comprising, when viewed from the front, a right side wall at a right side of the bucket (199), the right side wall being substantially inclined and extending outwardly beyond the corresponding first wheel (3) on said right side wall by a distance "D", and the bucket is tiltable for unloading by pouring out of the right side, the bucket (199) further comprising a left side wall, opposite to the right side wall, the left side wall meeting the base of the bucket at a median point of the second wheel (3).

23. The harvester and processor according to claim 21, wherein the bucket (199) comprises:
a wavy bucket bottom (203), the bucket bottom defining two semi-circular sectors (204) between three V-shaped sectors (205), the two semi-circular sectors (204) and the three V-shaped sectors providing a profile that is adjusted on the horizontal plane (34) of the structured plate body (4), where said bucket bottom functions as a complete upper closing cover for the threshing cylinder assemblies (10), wherein the bucket bottom contains a rectangular structural frame (206) that is well adjusted on the horizontal plane (34) of the structured plate body (4), the bucket extending upward from the rectangular structural frame (206);
an upper bucket side;
the left side wall, which comprises a vertical portion (207) and a final inclined portion that is inwardly inclined;
the right side wall (209), which is totally inclined with the same degree of inclination as the left side wall (208);
a front wall (210) and a rear wall (211), which are both substantially vertical, the front wall (210) comprising a window with a ventilation screen (212) and handrails (213),
an upper bucket portion comprising: a first upper bucket part and a second upper bucket part, the first upper bucket part being approximately one third of the upper bucket portion and being positioned at the right side wall (209), the second upper bucket part being approximately a remaining two thirds of the upper bucket portion, the first upper bucket part being marginally taller than the second upper part, the second upper bucket part, the first upper bucket part being defined, in part, by the right side wall and a dividing plate piece (214) equally inclined and opposite to the right side wall, the first upper bucket part an unloading mouth (215) for unloading the peanut pods when the bucket is tilted;
a bucket lid (218), the second upper bucket part comprising structural crossbars (216) and reinforced edges (217) bent to an inside of the bucket and acting as a corner bracket that receive the bucket lid (218), which covers the entire upper bucket portion except the unloading mouth (215); and
a rectangular opening (219) positioned on the rear wall (211), and a rear box (220) also on the rear wall, the rectangular opening (219) and the rear box both being structured (221), wherein the rectangular opening comprises a duct in the form of an outward prolongation (222) that ends in an inclined form and is garnished by a flap (223) that functions as a point of alignment and fixing with the unloading mouth (191) of the vertical bucket transporter (14),
wherein said threaded cargo assembly comprises first and second threaded cargo levelers (200) that are positioned diagonally and are inclined and each have respective first and second extremities coupled by respective cargo assembly bearings to the front and rear walls (210 and 211) of the bucket (199),
the first extremities of the first and second threaded cargo levelers are coupled to the front wall (210) and substantially spaced from each other, the tipper bucket assembly further comprises a hydraulic engine and a cargo leveler support, and one of the first extremities of the first and second threaded cargo levelers is also coupled to the hydraulic engine (224) and the cargo leveler support,
the tipper bucket assembly (15) further comprises a 90° transmission (225) and universal joints (226), the second extremities of the first and second threaded cargo levelers being coupled by the corresponding bearing to the rear box (220) at the front wall, where the first and second threaded cargo levelers are interconnected by the 90° transmission (225) and the universal joints (226).

24. The harvester and processor according to claim 22, wherein the fixed support structure (201) comprises:

- two tubular long plate pieces (227), each arranged on a respective one of the front and rear walls of the bucket (199);
- two fork-type supports (228), each of the first and second tubular long plate pieces being horizontal and transversally fixed to the structured plate body (4) by a respective one of the fork type supports (228);
- a structural grid that is positioned almost flush with the right side wall (209) of the bucket (199), the structural grid comprising parallel inclined tubular pieces (229), parallel horizontal tubular pieces interconnecting the inclined tubular pieces (229), a reinforcement central plate, and diagonal tubular pieces (229) interconnecting the reinforcement central plate and the inclined and horizontal tubular pieces, wherein the fork type supports each have a respective right side extremity that is prolonged upward with the inclined tubular pieces;
- first and second articulations (233), which are each hinged and are arranged on the front and rear walls, respectively, of the bucket (199) and located at said right side of the bucket (199);
- first and second reinforcements (234) coupled to said first and second hinged articulations (233) respectively,
- side articulations (235), said first and second reinforcements (234) being prolonged horizontally to about one third of a length of the bucket for assembly of the side articulations (235), the length of the bucket being between the right side wall and the left side wall, wherein said side hydraulic actuations (202) each have a respective upper extremity and a lower extremity, the side articulations (235) articulately receiving the upper extremities of the hydraulic cylinders (202), the lower extremities of said side hydraulic actuations (202) being equally fixed by further articulations (236) respectively to a respective one of the fork type supports (228) fixated to the long tubular plate pieces (227) of the fixed support structure (201); and
- a diagonal piece with rod steps forming first stairs (237), wherein the harvester and processor further comprises second stairs (238) and handrails (213), the second stairs (238) and the handrails (213) together with the first stairs (237) offering easy access to the bucket (199) and other parts of the harvester and processor.

\* \* \* \* \*